US008927070B2

(12) United States Patent
Iwahashi et al.

(10) Patent No.: US 8,927,070 B2
(45) **Date of Patent: *Jan. 6, 2015**

(54) DICHROIC DYE COMPOSITION, LIGHT ABSORPTION ANISOTROPIC FILM, AND POLARIZING ELEMENT

(75) Inventors: Nobutaka Iwahashi, Kanagawa (JP); Masashi Ogiyama, Kanagwa (JP); Shinichi Morishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 791 days.

This patent is subject to a terminal disclaimer.

(21) Appl. No.: 13/121,803

(22) PCT Filed: Sep. 3, 2009

(86) PCT No.: PCT/JP2009/067108

§ 371 (c)(1), (2), (4) Date: Mar. 30, 2011

(87) PCT Pub. No.: WO2010/038817

PCT Pub. Date: Apr. 8, 2010

(65) Prior Publication Data

US 2011/0177315 A1 Jul. 21, 2011

(30) Foreign Application Priority Data

Sep. 30, 2008 (JP) ................................ 2008-254575

(51) Int. Cl.
*C09B 31/30* (2006.01)
*C09B 31/28* (2006.01)

(Continued)

(52) U.S. Cl.
CPC .............. *G02B 5/3033* (2013.01); *C09B 31/04* (2013.01); *C09B 31/08* (2013.01); *C09B 31/18* (2013.01); *C09B 31/28* (2013.01); *C09B 31/30* (2013.01); *C09B 56/02* (2013.01); *C09B 56/08* (2013.01); *G02B 5/223* (2013.01); *G02B 5/3016* (2013.01); *G02F 2202/40* (2013.01)
USPC ..................... 428/1.31; 428/220; 252/299.68; 349/183; 534/754; 534/756; 534/757; 534/761; 534/795; 534/805; 534/816

(58) Field of Classification Search
CPC .................. C09B 31/04–31/047; C09B 31/08; C09B 31/18; C09B 31/28; C09B 31/30; C09B 56/005–56/20
USPC ................. 252/299.01–299.1, 299.6–299.68; 428/1.31; 534/761, 763, 757, 577, 575, 534/660, 670, 795, 816–821
See application file for complete search history.

(56) References Cited

U.S. PATENT DOCUMENTS 4,959,172 A * 9/1990 Miura et al. ............... 252/299.1
5,739,296 A 4/1998 Gvon et al.

(Continued)

FOREIGN PATENT DOCUMENTS

JP 02-012104 1/1990
JP 08-248225 9/1996

(Continued)

OTHER PUBLICATIONS

Machine Translation of JP 08-278409. Retrieved Dec. 4, 2013.*

(Continued)

*Primary Examiner* — Prashant J Khatri
(74) *Attorney, Agent, or Firm* — Young & Thompson

(57) ABSTRACT

A light absorption anisotropic film, having at least one dichroic dye, in which the light absorption anisotropic film shows a diffraction peak derived from a periodic structure in a direction in a plane of the light absorption anisotropic film in X-ray diffraction measurement and the diffraction peak has a half width of 1.0 Å or less.

10 Claims, 3 Drawing Sheets

(51) Int. Cl.

| | |
|---|---|
| *B05D 3/06* | (2006.01) |
| *B05D 5/06* | (2006.01) |
| *G02B 5/30* | (2006.01) |
| *C09B 31/04* | (2006.01) |
| *C09B 31/08* | (2006.01) |
| *C09B 31/18* | (2006.01) |
| *C09B 56/02* | (2006.01) |
| *C09B 56/08* | (2006.01) |
| *G02B 5/22* | (2006.01) |

(56) References Cited

U.S. PATENT DOCUMENTS

| | | | | |
|---|---|---|---|---|
| 6,039,893 | A * | 3/2000 | Arakawa et al. | 252/299.01 |
| 6,404,472 | B1 | 6/2002 | Andreatta et al. | |
| 8,623,476 | B2 * | 1/2014 | Morishima et al. | 428/1.31 |
| 2006/0182902 | A1 | 8/2006 | Yoneyama et al. | |
| 2010/0134726 | A1 * | 6/2010 | Morishima et al. | 349/97 |

FOREIGN PATENT DOCUMENTS

| | | |
|---|---|---|
| JP | 08-278409 | 10/1996 |
| JP | 8-511109 | 11/1998 |
| JP | 11-101964 | 4/1999 |
| JP | 2002-180052 | 6/2002 |
| JP | 2002-528758 | 9/2002 |
| JP | 2002-338838 | 11/2002 |
| JP | 2003-255328 | 9/2003 |
| JP | 2005-140986 | 6/2005 |
| JP | 2005-284260 | 10/2005 |
| JP | 2006-079030 | 3/2006 |
| JP | 2007-233162 | 9/2007 |
| JP | 2008-203752 | 9/2008 |

OTHER PUBLICATIONS

CN Office Action dated Oct. 25, 2011, with English translation; Application No. 200980138782.2.

JP Office Action dated Jul. 23, 2013, with English translation; Application No. 2009-228645.

International Search Report—PCT/JP2009/067108—Dec. 8, 2009.

* cited by examiner

DICHROIC DYE COMPOSITION, LIGHT ABSORPTION ANISOTROPIC FILM, AND POLARIZING ELEMENT

TECHNICAL FIELD

The present invention relates to a dichroic dye composition containing at least one kind of dichroic dye for forming a novel light absorption anisotropic film. Further, the present invention relates to a light absorption anisotropic film, which employs the composition and has a periodic structure in the direction vertical to an alignment axis in a plane of the film. Further, the present invention relates to a polarizing element and a display device, each employing the light absorption anisotropic film.

BACKGROUND ART

When an attenuating function, a polarizing function, a scattering function, a light-shielding function, or the like is required for an irradiated light such as laser light and natural light, apparatuses have conventionally been adapted, which operate based on principles different from each other, depending on the functions. Thus, the products corresponding to the functions have been prepared by the production processes different from each other, depending on the functions.

For example, in LCD (Liquid Crystal Display), in order to control optical rotary power or birefringent property in display, a linear polarizing plate or a circular polarizing plate is used. Also in OLED (organic electroluminescence element), the circular polarizing plate is used to prevent the reflection of light from outside. Heretofore, for such polarizing plates (polarizing elements), iodine has been widely used as a dichroic material. However, in the case where iodine is used for the polarizing element, heat resistance and light fastness thereof are not sufficient since iodine has a large sublimation property. Further, the extinction color becomes deep blue, and an ideal achromatic color polarizing element in the entire visible spectral region cannot necessarily be obtained.

Thus, a polarizing element has been studied, in which an organic dye has been employed as the dichroic material. However, in employing the organic dyes, there is a problem, for example, that only polarizing elements are obtained, which is distinctly inferior in dichroic property to those employing iodine. Particularly, in LCD using optical rotation or birefringent property of light as the principle of display, the polarizing element is an important constituent. In recent years, in order to improve the performance of display or the like, the development of a novel polarizing element has been preceded.

As a method of forming such polarizing element, a method has been proposed, in which, in the same manner as in the case of a polarizing element containing iodine, an organic dye having dichroism (dichroic dye) is dissolved in or adsorbed to a polymer material such as polyvinyl alcohol, and the film thereof is stretched in one direction to be a film shape so that the dichroic dye is oriented. However, in this method, there is a problem, for example, that time and effort are required for steps such as a stretching treatment.

Thus, in recent years, other methods have attracted an attention. As such method, Non-Patent Literature 1 describes a method, in which a dichroic dye is aligned on a substrate such as a glass or a transparent film by utilizing the intermolecular interaction of organic dye molecules or the like, to form a polarizing film (anisotropic dye film). However, it has been known that there has been a problem in the heat resistance in the method described in the literature.

Further, a wet film-forming method achieves orienting a dichroic dye on the substrate such as a glass or a transparent film by utilizing the intermolecular interaction of organic dye molecules or the like. In the case where an anisotropic dye film is prepared by the wet film-forming method, the dye to be used in the dye film are required not only to have the high dichroism of the dye molecules but also to be a dye suitable for the process of the wet film-forming method. Examples of the process in the wet film-forming method include the process of disposing and orientating the dye on the substrate or the process of controlling the orientation. Accordingly, there are many cases that even the conventional dyes, that may be used in the polarizing elements underwent the above-mentioned stretching treatment, are not suitable for the wet film-forming method. On the other hand, Patent Literatures 1 to 3 propose materials suitable for the above-described process. However, although such materials are suitable for the process, they have had a problem that they have not been able to show high dichroism.

Further, Patent Literature 4 proposes a dye represented by chromogen $(SO_3M)_n$ as a material suitable for the process. In the literature, the achromatic color is shown by combining several kinds of dichroic dyes. However, in the case where an anisotropic dye film is obtained by combining the several kinds of dichroic dyes, there is a problem that since different molecules are mixed, the orientation of the molecules is disturbed and obtaining a high dichroism is difficult.

Further, Patent Literature 5 describes that a light absorption anisotropic film prepared by the wet film-forming method is prepared, and also describes a dichroic dye represented by the following structural formula as an example of the dichroic dye that can be used.

(I-31)

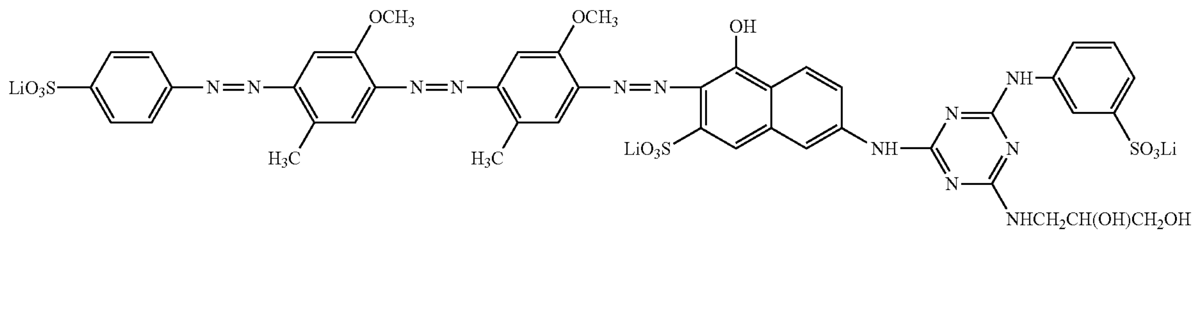

However, the compound has a problem that the dichroism and the absorbance at a long-wavelength region are insufficient.

CITATION LIST

Patent Literatures

Patent Literature 1: JP-A-2002-180052 ("JP-A" means unexamined published Japanese patent application)
Patent Literature 2: JP-T-2002-528758 ("JP-T" means published searched patent publication)
Patent Literature 3: JP-A-2002-338838
Patent Literature 4: JP-T-8-511109
Patent Literature 5: JP-A-2006-79030

Non-Patent Literature

Non-Patent Literature 1: Dreyer, J. F., Journal de Physique, 1969, 4, 114., "Light Polarization From Films of Lyotropic Nematic Liquid Crystals"

DISCLOSURE OF INVENTION

Technical Problem

The present invention is contemplated for providing a novel light absorption anisotropic film having high dichroism, and a polarizing element containing the light absorption anisotropic film, which is excellent in heat resistance, light fastness and polarization performance. Further, the present invention is contemplated for providing a novel dichroic dye composition that can realize a light absorption anisotropic film that functions as a light absorption anisotropic film having heat resistance and light resistance.

Solution to Problem

The present inventors have intensively studied and found that a light absorption anisotropic film having a high dichroism exhibits a highly-ordered periodic structure in a direction in a plane of the film and shows a diffraction peak derived from the periodic structure in X-ray diffraction measurement, and they have made the present invention.

That is, the novel light absorption anisotropic film of the present invention is characterized by that it shows a diffraction peak derived from the periodic structure in the direction in the plane of the film in the X-ray diffraction measurement, and the diffraction peak has a half width of 1.0 Å or less.

Further, the present inventors have studied on a novel dichroic azo dye so as to realize such light absorption anisotropic film, and found that a dichroic azo dye having a specific structure represented by formula (I) described below is in a highly-ordered association state. Further, they have also found that the dichroic azo dye shows a high level of molecular alignment state, that is, it is possible to form a dye film that can have high dichroism and the dye film can become the aimed light absorption anisotropic film, by dissolving a composition containing such dye in an organic solvent, coating the thus-obtained solution on an alignment film, drying to form a film, and heating the film. Further, they have found that an achromatic light absorption anisotropic film that shows absorption in the broad range of a visible area and shows a hue of fine black can be obtained, by the association of the dye in the film.

The present invention has been achieved based on such findings found by the present inventors.

According to the present invention, there is provided the following means:

(1) A light absorption anisotropic film, comprising at least one dichroic dye, wherein the light absorption anisotropic film shows a diffraction peak derived from a periodic structure in a direction of a plane inside the light absorption anisotropic film in X-ray diffraction measurement and the diffraction peak has a half width of 1.0 Å or less.

(2) The light absorption anisotropic film as described in the above item (1), wherein the diffraction peak is derived from a periodic structure in a direction vertical to an alignment axis.

(3) The light absorption anisotropic film as described in the above item (1) or (2), wherein the diffraction peak shows a period from 3.5 to 10.0 Å.

(4) The light absorption anisotropic film as described in any one of the above items (1) to (3), having a film thickness from 0.01 to 30 μm.

(5) The light absorption anisotropic film as described in any one of the above items (1) to (4), wherein the light absorption anisotropic film is formed on an alignment film.

(6) A dichroic dye composition for forming the light absorption anisotropic film as described in any one of the above items (1) to (5), comprising an azo dye represented by formula (I) as the dichroic dye and has a liquid crystallinity, Formula (I)

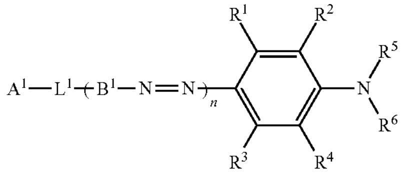

wherein $R^1$ to $R^4$ each independently represent a hydrogen atom or a substituent; $R^5$ and $R^6$ each independently represent a hydrogen atom or an alkyl group which may have a substituent; $L^1$ represents —N═N—, —CH═N—, —N═CH—, —C(═O)O—, —OC(═O)—, or —CH═CH—; $A^1$ represents a phenyl group which may have a substituent, a naphthyl group which may have a substituent, or an aromatic heterocyclic group which may have a substituent; $B^1$ represents a divalent aromatic hydrocarbon group which may have a substituent or a divalent aromatic heterocyclic group which may have a substituent; n represents an integer of 1 to 5; and when n is 2 or more, $B^1$'s may be the same as or different from each other.

(7) The dichroic dye composition as described in the above item (6), wherein the azo dye represented by formula (I) is a compound represented by formula (Ia):

Formula (Ia)

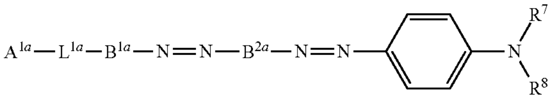

wherein $R^7$ and $R^8$ each independently represent a hydrogen atom, a methyl group, or an ethyl group; $L^{1a}$ represents —N═N—, —CH═N—, —N═CH—, —C(═O)O—, —OC(═O)—, or —CH═CH—; $A^{1a}$ represents a group represented by formula (IIa) or (IIIa); and $B^{1a}$ and $B^{2a}$ each independently represent a group represented by formula (IVa), (Va) or (VIa);

(IIa)

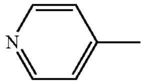

(IIIa)

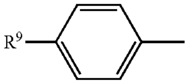

wherein $R^9$ represents an alkyl group which may have a substituent, an aryl group which may have a substituent, an alkoxy group which may have a substituent, an oxycarbonyl group which may have a substituent, or an acyloxy group which may have a substituent; and (IVa)

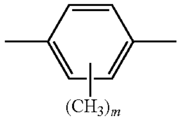

(Va)

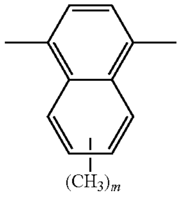

(VIa)

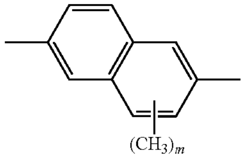

wherein m represents an integer of 0 to 2.

(8) The dichroic dye composition as described in the above item (6) or (7), wherein the azo dye having nematic liquid crystallinity represented by formula (I) is an azo dye represented by formula (Ib) or (Ic):

Formula (Ib)

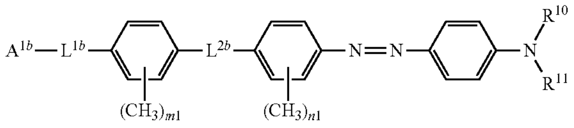

wherein $R^{10}$ and $R^{11}$ each independently represent a hydrogen atom, a methyl group, or an ethyl group; $L^{1b}$ represents —N═N— or —C(═O)O—; $L^{2b}$ represents —CH═N—, —N═CH—, —C(═O)O—, or —OC(═O)—; $A^{1b}$ represents a group represented by formula (IIa) or (IIIa); and m1 and n1 each independently represent an integer of 0 to 2;

(IIa)

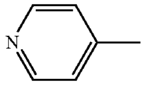

-continued (IIIa)

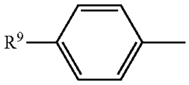

wherein $R^9$ represents an alkyl group which may have a substituent, an aryl group which may have a substituent, an alkoxy group which may have a substituent, an oxycarbonyl group which may have a substituent, or an acyloxy group which may have a substituent;

Formula (Ic)

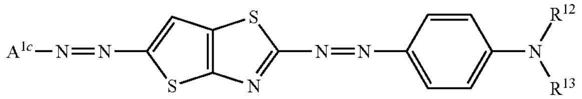

wherein $R^{12}$ and $R^{13}$ each independently represent a hydrogen atom, a methyl group, or an ethyl group; and $A^{1c}$ represents a group represented by formula (IIa) or (IIIa); and (IIa)

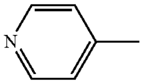

(IIIa)

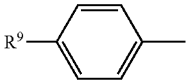

wherein $R^9$ represents an alkyl group which may have a substituent, an aryl group which may have a substituent, an alkoxy group which may have a substituent, an oxycarbonyl group which may have a substituent, or an acyloxy group which may have a substituent.

(9) A polarizing element, comprising the light absorption anisotropic film as described in any one of the above items (1) to (5).

(10) A display device, comprising the polarizing element as described in the above item (9).

(11) A method of producing the polarizing element as described in the above item (9), comprising the steps of:

[1] rubbing a substrate or an alignment film formed on the substrate, or irradiating the substrate or the alignment film with light;

[2] coating the dichroic dye composition as described in any one of the above items (6) to (8) on the substrate or the alignment film; and

[3] aligning the dichroic dye in the dichroic dye composition.

Advantageous Effects of Invention

According to the present invention, an achromatic novel light absorption anisotropic film high in dichroism can be provided. Further, by using the light absorption anisotropic film high in dichroism, an achromatic polarizing element can be provided, which is excellent in heat resistance and light fastness, and is also excellent in polarization performance.

Other and further features and advantages of the invention will appear more fully from the following description, taking the accompanying drawing into consideration.

MODE FOR CARRYING OUT INVENTION

Figure 1:
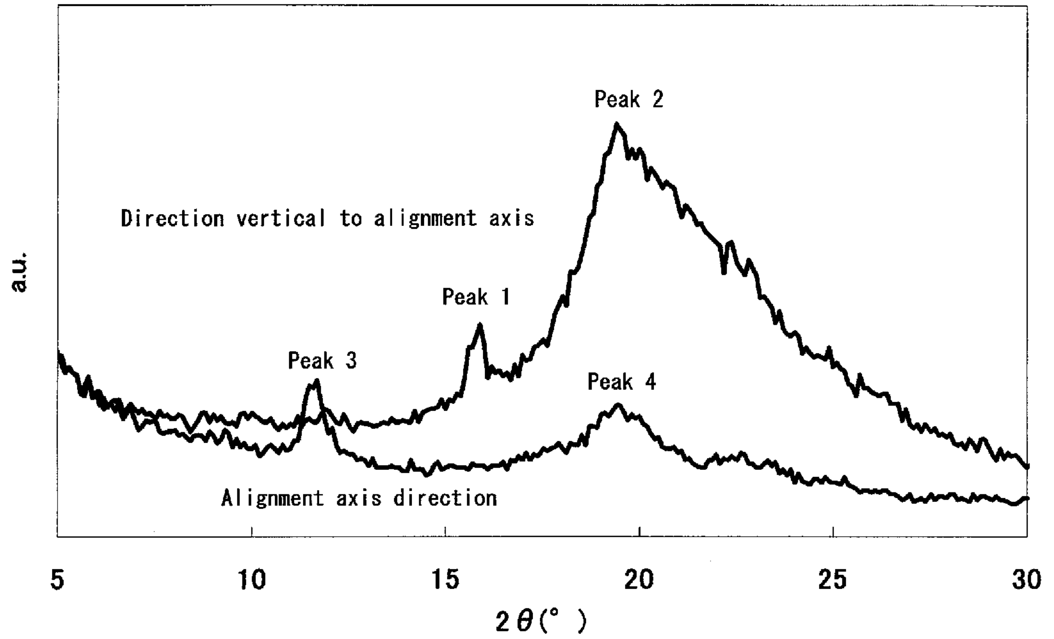
FIG. 1 is an X-ray diffraction pattern of the light absorption anisotropic film prepared in example 1.

The novel light absorption anisotropic film of the present invention is formed from a dichroic dye composition that contains at least one kind of the specific dichroic dye mentioned below and has liquid crystallinity.

(Dichroic Dye)

The dichroic dye in the dichroic dye composition of the present invention is not particularly limited as long as it has liquid crystallinity, and examples of the dichroic dye include an azo series dye, a cyanine series dye, an azo metal complex, a phthalocyanine series dye, a pyrylium series dye, a thiopyrylium series dye, an azulenium series dye, a squarylium series dye, a quinone series dye, a triphenylmethane series dye, and a triallyl methane series dye. Among them, an azo series dye and an azo metal complex are preferable. In the present invention, the term "dichroic dye" means a dye whose absorbance varies, depending on a direction.

Further, "dichroism" and "dichroic ratio" are calculated as the ratio of the absorbance of polarization in an absorption axis direction with respect to the absorbance of polarization in a polarization axis direction when the dichroic dye composition is used for the light absorption anisotropic film.

It is particularly preferable that the dichroic dye composition of the present invention contains at least one kind of the azo dye represented by formula (I).

Formula (I)

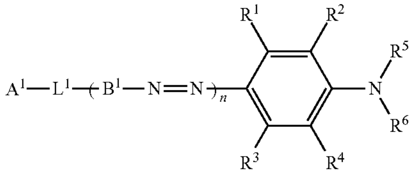

(In formula (I), $R^1$ to $R^4$ each independently represent a hydrogen atom or a substituent; $R^5$ and $R^6$ each independently represent a hydrogen atom or an alkyl group which may have a substituent; $L^1$ represents —N═N—, —CH═N—, —N═CH—, —C(═O)O—, —OC(═O)—, or —CH═CH—; $A^1$ represents a phenyl group which may have a substituent, a naphthyl group which may have a substituent, or an aromatic heterocyclic group which may have a substituent; $B^1$ represents a divalent aromatic hydrocarbon group which may have a substituent or a divalent aromatic heterocyclic group which may have a substituent; n represents an integer of 1 to 5; and when n is 2 or more, $B^1$'s may be the same with or different from each other.)

The azo dye is a novel dye that shows dichroism, is excellent in color tone and solubility in a solvent, and has high stability in a solution. Therefore, it can be used for various applications, and a particular high effect can be obtained when it is used for a light absorption anisotropic film. Namely, the light absorption anisotropic film of the present invention containing this dye shows high dichroism, and has higher heat resistance, light fastness, and moist heat resistance, compared to those of conventional iodine-based polarizing films.

Particularly, as mentioned above, since the dye has high solubility in a solvent and high stability in a solution, the dichroic dye composition containing the dye has high storage stability. Therefore, it is preferable that the azo dye of the present invention is applied to the formation of a light absorption anisotropic film by coating and drying the organic solvent solution as mentioned below. According to the film forming method, it is possible to form a light absorption anisotropic film on a support having high heat resistance such as glass, and a polarizing element having high heat resistance can be obtained. Therefore, the method is preferable in that it can be used for applications such as liquid crystal projectors and display panels mounted in vehicles, to which high heat resistance is required.

Examples of the substituents represented by $R^1$ to $R^4$ in formula (I) include an alkyl group (preferably an alkyl group having 1 to 20 carbon atoms, more preferably 1 to 12 carbon atoms, and particularly preferably 1 to 8 carbon atoms, e.g., a methyl group, an ethyl group, an iso-propyl group, a tert-butyl group, an n-octyl group, an n-decyl group, an n-hexadecyl group, a cyclopropyl group, a cyclopentyl group, a cyclohexyl group), an alkenyl group (preferably an alkenyl group having 2 to 20 carbon atoms, more preferably 2 to 12 carbon atoms, and particularly preferably 2 to 8 carbon atoms, e.g., a vinyl group, an allyl group, a 2-butenyl group, a 3-pentenyl group), an alkynyl group (preferably an alkynyl group having 2 to 20 carbon atoms, more preferably 2 to 12 carbon atoms, and particularly preferably 2 to 8 carbon atoms, e.g., a propargyl group, a 3-pentynyl group), an aryl group (preferably an aryl group having 6 to 30 carbon atoms, more preferably 6 to 20 carbon atoms, and particularly preferably 6 to 12 carbon atoms, e.g., a phenyl group, 2,6-diethylphenyl group, 3,5-di(trifluoromethyl)phenyl group, a naphthyl group, a biphenyl group), a substituted or unsubstituted amino group (preferably an amino group having 0 to 20 carbon atoms, more preferably 0 to 10 carbon atoms, and particularly preferably 0 to 6 carbon atoms, e.g., an unsubstituted amino group, a methylamino group, a dimethylamino group, a diethylamino group, an anilino group), an alkoxy group (preferably an alkoxy group having 1 to 20 carbon atoms, more preferably 1 to 10 carbon atoms, and particularly preferably 1 to 6 carbon atoms, e.g., a methoxy group, an ethoxy group, a butoxy group), an oxycarbonyl group (preferably an oxycarbonyl group having 2 to 20 carbon atoms, more preferably 2 to 15 carbon atoms, and particularly preferably 2 to 10 carbon atoms, e.g., a methoxycarbonyl group, an ethoxycarbonyl group, a phenoxycarbonyl group), an acyloxy group (preferably an acyloxy group having 2 to 20 carbon atoms, more preferably 2 to 10 carbon atoms, and particularly preferably 2 to 6 carbon atoms, e.g., an acetoxy group, a benzoyloxy group), an acylamino group (preferably an acylamino group having 2 to 20 carbon atoms, more preferably 2 to 10 carbon atoms, and particularly preferably 2 to 6 carbon atoms, e.g., an acetylamino group, a benzoylamino group), an alkoxycarbonylamino group (preferably an alkoxycarbonylamino group having 2 to 20 carbon atoms, more preferably 2 to 10 carbon atoms, and particularly preferably 2 to 6 carbon atoms, e.g., a methoxycarbonylamino group), an aryloxycarbonylamino group (preferably an aryloxycarbonylamino group having 7 to 20 carbon atoms, more preferably 7 to 16 carbon atoms, and particularly preferably 7 to 12 carbon atoms, e.g., a phenyloxycarbonylamino group), a sulfonylamino group (preferably a sulfonylamino group having 1 to 20 carbon atoms, more preferably 1 to 10 carbon atoms, and particularly preferably 1 to 6 carbon atoms, e.g., a methanesulfonylamino group, a benzenesulfonylamino group), a sulfamoyl group (preferably a sulfamoyl group having 0 to 20 carbon atoms, more preferably 0 to 10 carbon atoms, and particularly preferably 0 to 6 carbon atoms, e.g., a sulfamoyl group, a methylsulfamoyl group, a dimethylsulfamoyl group, a phenylsulfamoyl group), a carbamoyl group (preferably a carbamoyl group having 1 to 20 carbon atoms, more preferably 1 to 10 carbon atoms, and particularly preferably 1 to 6 carbon atoms, e.g., an unsubstituted carbamoyl group, a methylcarbamoyl group, a diethylcarbamoyl group, a phenylcarbamoyl group), an alkylthio group (preferably an alkylthio group having 1 to 20 carbon atoms, more preferably 1 to 10 carbon atoms, and particularly preferably 1 to 6 carbon atoms, e.g., a methylthio group, an ethylthio group), an arylthio group (preferably an arylthio group having 6 to 20 carbon atoms, more preferably 6 to 16 carbon atoms, and particularly preferably 6 to 12 carbon atoms, e.g., a phenylthio group), a sulfonyl group (preferably a sulfonyl group having 1 to 20 carbon atoms, more preferably 1 to 10 carbon atoms, and particularly preferably 1 to 6 carbon atoms, e.g., a mesyl group, a tosyl group), a sulfinyl group (preferably a sulfinyl group having 1 to 20 carbon atoms, more preferably 1 to 10 carbon atoms, and particularly preferably 1 to 6 carbon atoms, e.g., a methanesulfinyl group, a benzenesulfinyl group), an ureido group (preferably an ureido group having 1 to 20 carbon atoms, more preferably 1 to 10 carbon atoms, and particularly preferably 1 to 6 carbon atoms, e.g., an unsubstituted ureido group, a methylureido group, a phenylureido group), a phosphoric acid amido group (preferably a phosphoric acid amido group having 1 to 20 carbon atoms, more preferably 1 to 10, and particularly preferably 1 to 6 carbon atoms, e.g., a diethylphosphoric acid amido group, a phenylphosphoric acid amido group), a hydroxy group, a mercapto group, a halogen atom (e.g., a fluorine atom, a chlorine atom, a bromine atom, or an iodine atom), a cyano group, a nitro group, a hydroxamic acid group, a sulfino group, a hydrazino group, an imino group, an azo group, a heterocyclic group (preferably a heterocyclic group having 1 to 30 carbon atoms, more preferably 1 to 12 carbon atoms, a heterocyclic group containing a hetero atom such as a nitrogen atom, an oxygen atom, or a sulfur atom, e.g., an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably a silyl group having 3 to 40 carbon atoms, more preferably 3 to 30 carbon atoms, and particularly preferably 3 to 24 carbon atoms, e.g. a trimethylsilyl group, a triphenylsilyl group).

These substituents may further be substituted by these substituents. When two or more substituents are present, the substituents may be the same as or different from each other. They may bind to each other to form a ring, if possible.

The groups represented by $R^1$ to $R^4$ each are preferably a hydrogen atom, an alkyl group, an alkoxy group or a halogen atom; particularly preferably a hydrogen atom, an alkyl group or an alkoxy group; and most preferably a hydrogen atom or a methyl group.

The alkyl group represented by $R^5$ or $R^6$ which may have a substituent is preferably an alkyl group having preferably 1 to 20 carbon atoms, more preferably 1 to 12 carbon atoms and particularly preferably 1 to 8 carbon atoms, for example, a methyl group, an ethyl group, and an n-octyl group. The substituent of the alkyl group represented by $R^5$ or $R^6$ has the same meaning as the substituent represented by the above $R^1$ to $R^4$. When $R^5$ and $R^6$ represent alkyl groups, they may be combined with each other to form a cyclic structure. When $R^5$ or $R^6$ represents an alkyl group, it may be combined with $R^2$ or $R^4$ to form a cyclic structure. $R^5$ and $R^6$ each are particularly preferably a hydrogen atom or an alkyl group; and most preferably a hydrogen atom, a methyl group or an ethyl group.

$A^1$ represents a substituted or unsubstituted phenyl group, a substituted or unsubstituted naphthyl group, or a substituted or unsubstituted aromatic heterocyclic group.

The substituent, which may be possessed by the phenyl group or the naphthyl group, is preferably a group which is introduced to enhance the solubility of the azo compound or nematic mesomorphism, a group having an electron donative property or an electron withdrawing property which is introduced to adjust color tone as a dye, or a group having a polymerizable group which is introduced to fixate alignment. Specific examples have the same meaning as the substituents represented by $R^1$ to $R^4$. Preferred examples of the substituent include a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted oxycarbonyl group, a substituted or unsubstituted acyloxy group, a substituted or unsubstituted acylamino group, a substituted or unsubstituted amino group, a substituted or unsubstituted alkoxycarbonylamino group, a substituted or unsubstituted sulfonylamino group, a substituted or unsubstituted sulfamoyl group, a substituted or unsubstituted carbamoyl group, a substituted or unsubstituted alkylthio group, a substituted or unsubstituted sulfonyl group, a substituted or unsubstituted ureido group, a nitro group, a hydroxy group, a cyano group, an imino group, an azo group and a halogen atom. Among them, particularly preferable are a substituted or unsubstituted alkyl group, a substituted or unsubstituted alkenyl group, a substituted or unsubstituted aryl group, a substituted or unsubstituted alkoxy group, a substituted or unsubstituted oxycarbonyl group, a substituted or unsubstituted acyloxy group, a nitro group, an imino group, and an azo group. With regard to the substituents having a carbon atom among these substituents, the preferable range of the number of a carbon atom is the same as that of the substituent represented by $R^1$ to $R^4$.

The number of the substituents which the phenyl group or the naphthyl group may have is 1 to 5, preferably 1. The phenyl group more preferably has one substituent at the para-position with respect to $L^1$.

The aromatic heterocyclic group is preferably a group derived from a one-ring or two-ring heterocycle. Examples of the atom other than a carbon atom which composes the aromatic heterocyclic group include a nitrogen atom, a sulfur atom, and an oxygen atom. When the aromatic heterocyclic group has a plurality of atoms other than the carbon atom, these atoms may be the same as, or different from each other. Specific examples of the aromatic heterocyclic group include a pyridyl group, a quinolyl group, a thiophenyl group, a thiazolyl group, a benzothiazolyl group, a thiadiazolyl group, a quinolonyl group, a naphthalimidoyl group, a thienothiazolyl group, and a group derived from a heterocycle represented by the following formulae.

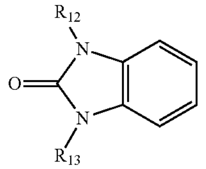

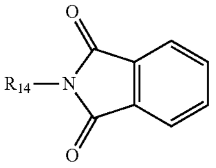

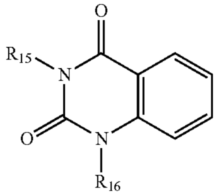

In formulae, $R_{12}$, to $R_{16}$ each independently represent a hydrogen atom, a substituted or unsubstituted alkyl group, or a substituted or unsubstituted phenyl group. The substituents are same as the substituents which may be substituted on the alkyl group and the preferable examples are also the same.

The aromatic heterocyclic group is preferably a pyridyl group, a quinolyl group, a thiazolyl group, a benzothiazolyl group, a thiadiazolyl group or a thienothiazolyl group, particularly preferably a pyridyl group, a benzothiazolyl group, a thiadiazolyl group or a thienothiazolyl group, and most preferably a pyridyl group, a benzothiazolyl group, or a thienothiazolyl group.

$A^1$ is particularly preferably a phenyl group, a pyridyl group, a benzothiazolyl group, or a thienothiazolyl group, each of which may have a substituent.

$B^1$ represents a divalent substituted or unsubstituted aromatic hydrocarbon group or a divalent substituted or unsubstituted aromatic heterocyclic group. n denotes an integer from 1 to 5. When n is 2 or more, plural $B^1$s may be the same as or different from each other.

The aromatic hydrocarbon group is preferably a phenylene group or a naphthylene group. Examples of the substituent which the aromatic hydrocarbon group may have include a substituted or unsubstituted alkyl group, a substituted or unsubstituted alkoxy group, a hydroxy group, a nitro group, a halogen atom, a substituted or unsubstituted amino group, a substituted or unsubstituted acylamino group, and a cyano group. The substituent which the aromatic hydrocarbon group may have is preferably a substituted or unsubstituted alkyl group, a substituted or unsubstituted alkoxy group, a hydroxyl group, and a halogen atom, particularly preferably a substituted or unsubstituted alkyl group, a substituted or unsubstituted alkoxy group, and a halogen atom, and most preferably a methyl group and a halogen atom.

The aromatic heterocyclic group is preferably a group derived from a one-ring or two-ring heterocycle. Examples of the atoms constituting the aromatic heterocyclic group other than the carbon atom include a nitrogen atom, a sulfur atom and an oxygen atom. When the aromatic heterocyclic group has a plurality of atoms constituting the ring other than the carbon atom, these atoms may be the same as, or different from each other. Specific examples of the divalent aromatic heterocyclic group include a divalent group derived from pyridine, quinoline, isoquinoline, benzothiadiazole, phthalimide, thienothiazole, and the like. Among them, a divalent group derived from thienothiazole is particularly preferable.

Examples of the substituent which may be possessed by the aromatic heterocyclic group include an alkyl group such as a methyl group and an ethyl group, an alkoxy group such as a methoxy group and an ethoxy group, an unsubstituted amino group, an alkylamino group such as a methylamino group, an acylamino group such as an acetylamino group, a nitro group, a hydroxy group, a cyano group, and a halogen atom. Among these substituents, with respect to those having carbon atoms, the preferable range of the number of carbon atoms is the same as that of the substituent represented by $R^1$ to $R^4$.

n represents an integer of 1 to 5, and preferably an integer of 1 or 2.

Preferable examples of the azo dye represented by formula (I) include azo dyes represented by any one of formulae (Ia) to (Ic).

Formula (Ia)

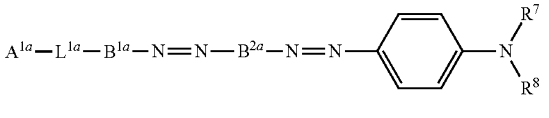

In formula (Ia), $R^7$ and $R^8$ each independently represent a hydrogen atom, a methyl group, or an ethyl group; $L^{1a}$ represents —N═N—, —CH═N—, —N═CH—, —C(═O)O—, —OC(═O)— or —CH═CH—; $A^{1a}$ represents a group represented by formula (IIa) or (IIIa); and $B^{1a}$ and $B^{2a}$ each independently represent a group represented by formula (IVa), (Va) or (VIa).

(IIa)

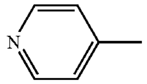

(IIIa)

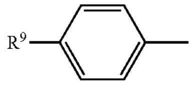

In (IIIa), $R^9$ represents an alkyl group which may have a substituent, an aryl group which may have a substituent, an alkoxy group which may have a substituent, an oxycarbonyl group which may have a substituent, or an acyloxy group which may have a substituent.

(IVa)

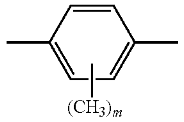

(Va)

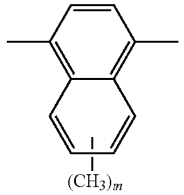

(VIa)

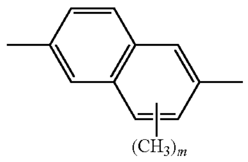

In formulae (IVa), (Va) and (VIa), m represents an integer of 0 to 2.

Formula (Ib)

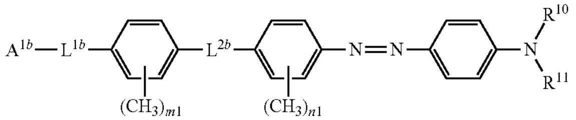

In formula (Ib), $R^{10}$ and $R^{11}$ each independently represent a hydrogen atom, a methyl group, or an ethyl group; $L^{1b}$ represents —N═N— or —C(═O)O—; $L^{2b}$ represents —CH═N—, —N═CH—, —C(═O)O— or —OC(═O)—; $A^{1b}$ represents a group represented by formula (IIa) or (IIIa); and m1 and n1 each independently represent an integer of 0 to 2.

Formula (Ic)

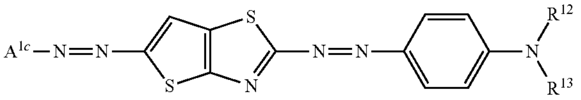

In formula (Ic), $R^{12}$ and $R^{13}$ each independently represent a hydrogen atom, a methyl group or an ethyl group; and $A^{1c}$ represents a group represented by formula (IIa) or (IIIa).

Examples of the substituent which each group has in formulae (Ia), (Ib) and (Ic) are the same as the examples of the substituent represented by $R^1$ to $R^4$ in formula (I). Also, with regard to the groups having a carbon atom such as an alkyl group, the preferable range of the number of carbon atoms is the same as that of the substituent represented by $R^1$ to $R^4$.

The compound represented by formula (I), (Ia), (Ib) or (Ic) may have a polymerizable group as the substituent. It is preferable that the polymerizable group is contained in those compounds, since the fixation of alignment of liquid crystal (or film hardening ability) is improved. Further, improved heat resistance is also imparted.

The polymerizable group is not particularly limited, but a polymerization reaction is preferably addition polymerization (including ring opening polymerization) or condensation polymerization. In other words, the polymerizable group is preferably a polymerizable group capable of addition polymerization reaction or condensation polymerization reaction.

Specific examples of the polymerizable group are shown below, but the present invention is not limited to these. Note that the term "Et" means an ethyl group, and the term "Pr" means a propyl group, in the specific examples.

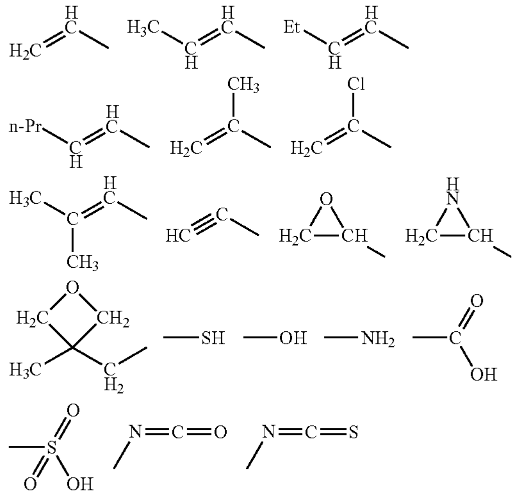

The polymerizable group is preferably a polymerizable group capable of a radical polymerization or a cationic polymerization. General radical polymerizable group can be used as the radical polymerizable group and a (meta)acrylate group is preferable. General cationic polymerizable group can be used as the cationic polymerizable group. Specific examples of the cationic radical group include an alicyclic ether group, a cyclic acetal group, a cyclic lactone group, a cyclic thioether group, a Spiro orthoester group, and a vinyloxy group. Among those, an alicyclic ether group and a vinyloxy group are preferred; and an epoxy group, an oxetanyl group, and a vinyloxy group are particularly preferable.

In the present invention, as the polymerizable group, the radical polymerizable group is particularly preferable.

The polymerizable group is preferably positioned at the terminal of a molecule, and specifically preferably exists as the substituent of $R^5$ and/or $R^6$ or as the substituent of $A^1$ in formula (I).

The specific examples of the compound represented by formula (I) are shown below. However, the present invention is not limited to these specific examples.

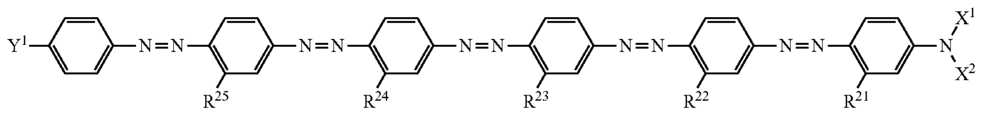

| No. | $X^1$ | $X^2$ | $R^{21}$ | $R^{22}$ | $R^{23}$ | $R^{24}$ | $R^{25}$ | $Y^1$ |
|---|---|---|---|---|---|---|---|---|
| A-1 | $—C_2H_5$ | $—C_2H_5$ | —H | $—CH_3$ | —H | —H | —H | $—C_4H_9$ |
| A-2 | $—C_2H_5$ | $—C_2H_5$ | —H | $—CH_3$ | $—CH_3$ | $—CH_3$ | —H | $—C_4H_9$ |
| A-3 | $—CH_3$ | $—CH_3$ | —H | $—CH_3$ | —H | —H | —H | $—C_4H_9$ |

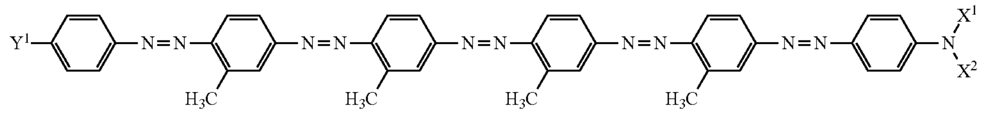
| No. | $X^1$ | $X^2$ | $Y^1$ |
|---|---|---|---|
| A-4 | $—C_2H_5$ | $—C_2H_5$ | 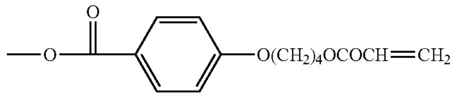 |
| A-5 | $—C_2H_5$ | $—C_2H_5$ | 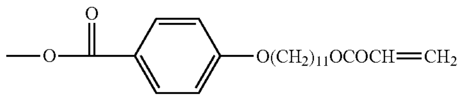 |
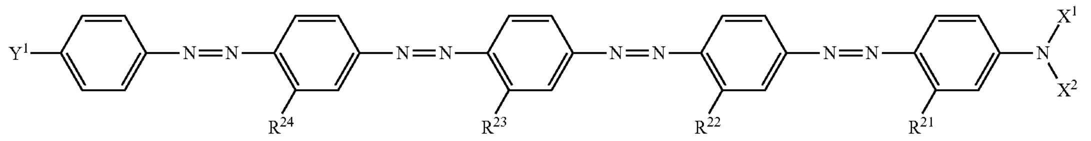
| No. | $X^1$ | $X^2$ | $R^{21}$ | $R^{22}$ | $R^{23}$ | $R^{24}$ | $Y^1$ |
|---|---|---|---|---|---|---|---|
| A-9 | $—C_2H_5$ | $—C_2H_5$ | —H | $—CH_3$ | —H | —H | $—C_4H_9$ |
| A-10 | $—C_2H_5$ | $—C_2H_5$ | $—CH_3$ | $—CH_3$ | —H | —H | $—C_4H_9$ |
| A-11 | $—C_2H_5$ | $—C_2H_5$ | —H | $—CH_3$ | $—CH_3$ | $—CH_3$ | $—C_4H_9$ |
| A-15 | $—C_2H_5$ | $—C_2H_5$ | —H | $—CH_3$ | $—CH_3$ | $—CH_3$ | 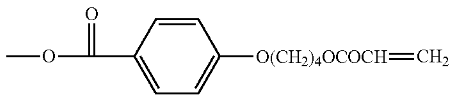 |
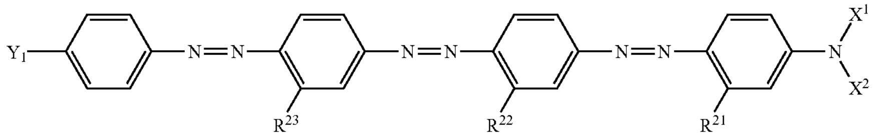
| No. | $X^1$ | $X^2$ | $R^{21}$ | $R^{22}$ | $R^{23}$ | $Y^1$ |
|---|---|---|---|---|---|---|
| A-16 | $—C_2H_5$ | $—C_2H_5$ | —H | $—CH_3$ | —H | $—C_4H_9$ |
| A-17 | $—C_2H_5$ | $—C_2H_5$ | —H | $—CH_3$ | $—CH_3$ | $—C_4H_9$ |
| A-18 | $—C_2H_5$ | $—C_2H_5$ | —H | $—CH_3$ | —H | 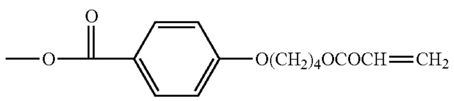 |
| A-19 | $—C_2H_5$ | $—C_2H_5$ | —H | $—CH_3$ | —H | 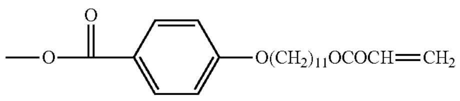 |
| A-24 | $—C_2H_5$ | $—C_2H_5$ | $—OCH_3$ | $—CH_3$ | —H | $—C_4H_9$ |
| A-25 | $—C_2H_5$ | $—C_2H_5$ | —H | $—CH_3$ | $—CH_3$ | 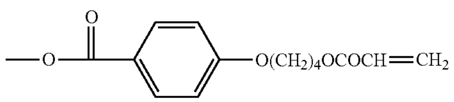 |

A-27
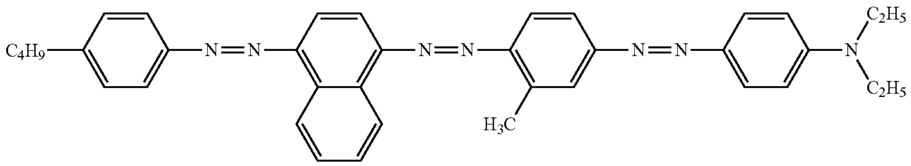
A-28
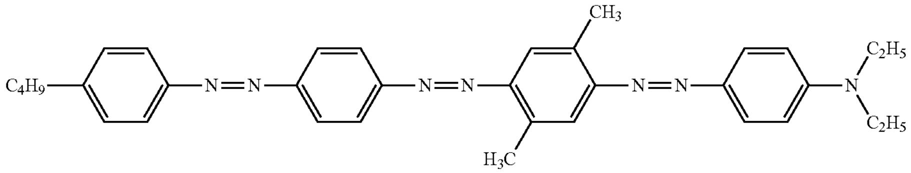
A-29
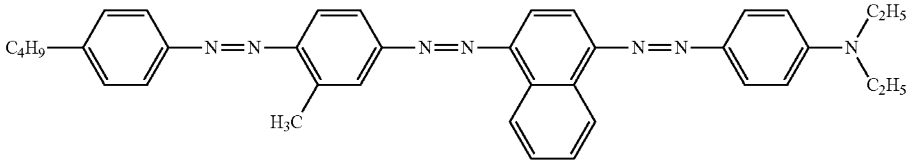
A-30
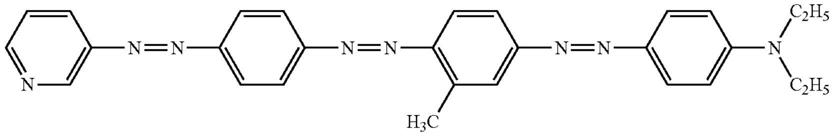
A-31
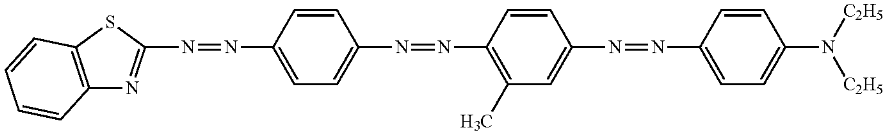
A-32
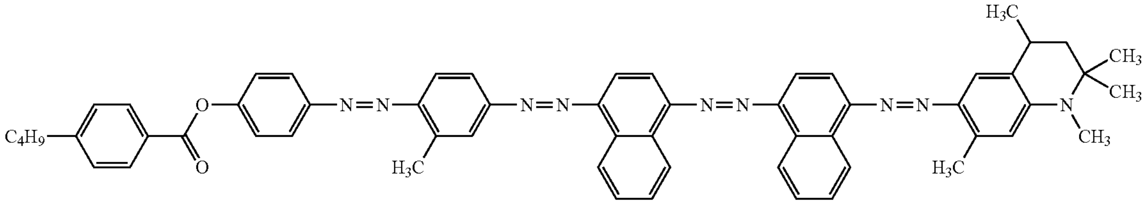
A-33
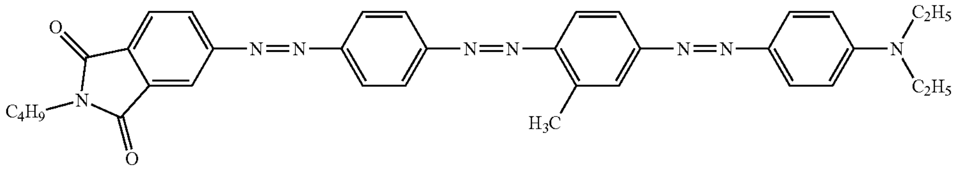
A-34
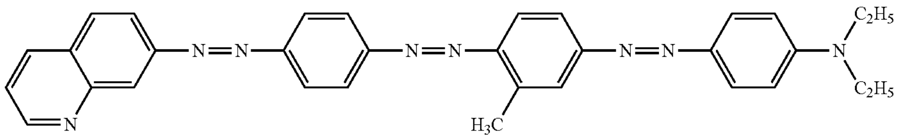
A-35
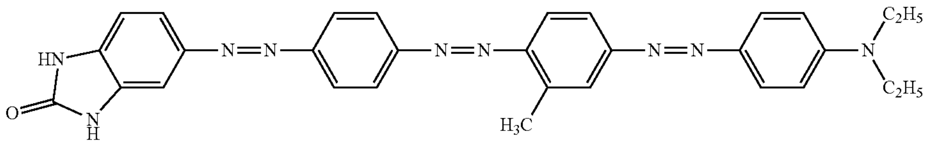

-continued
A-36
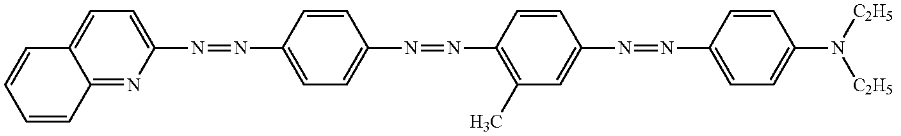
A-37
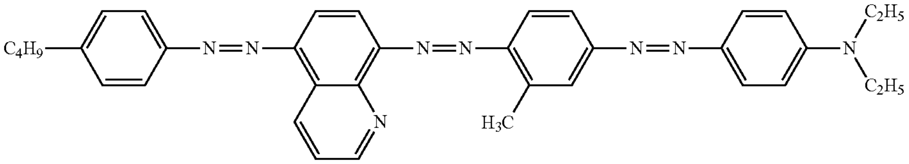
A-38
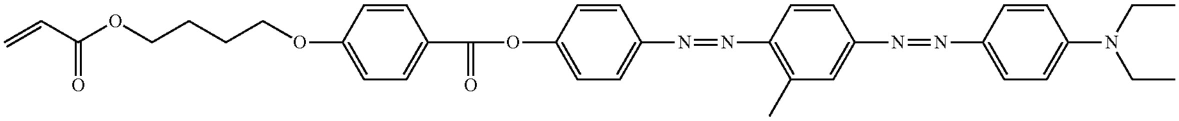
A-40
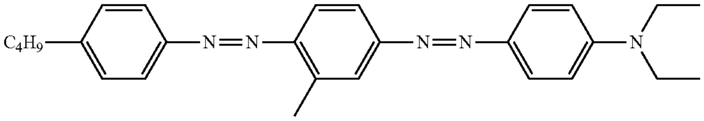
A-41
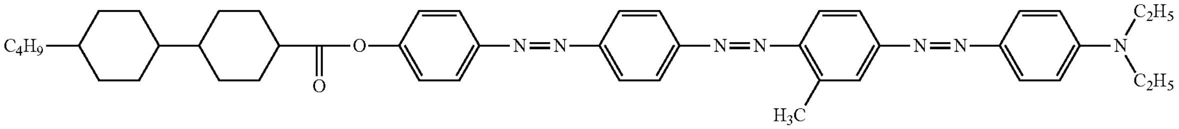
A-42
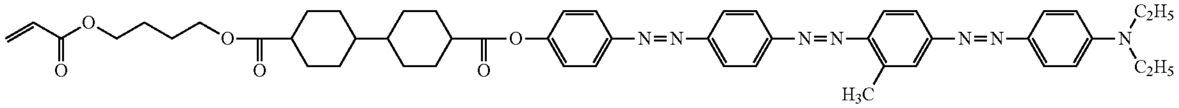
A-45
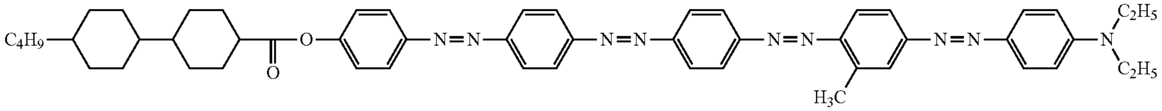
A-46
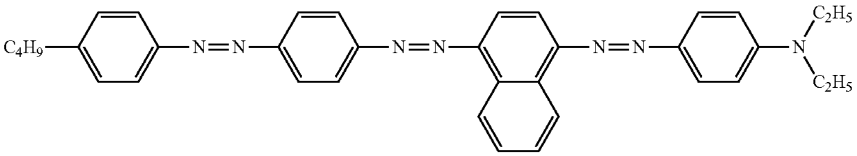
A-47
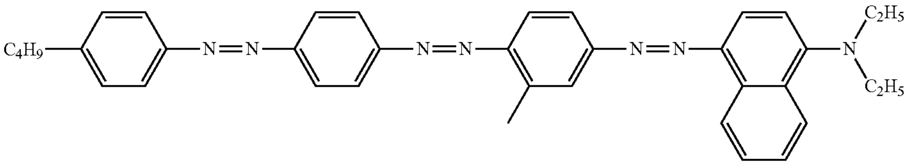
A-48
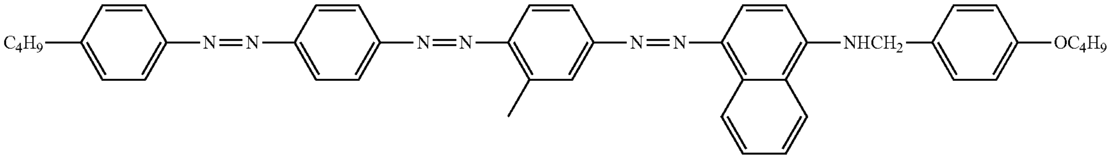
A-50
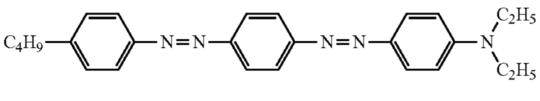
A-51
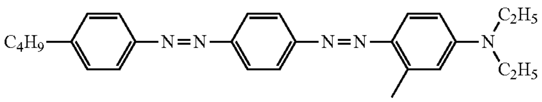

-continued
A-52
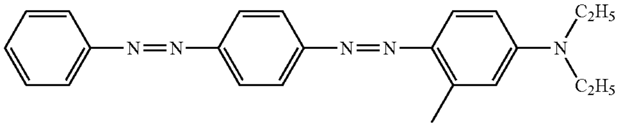
A-53
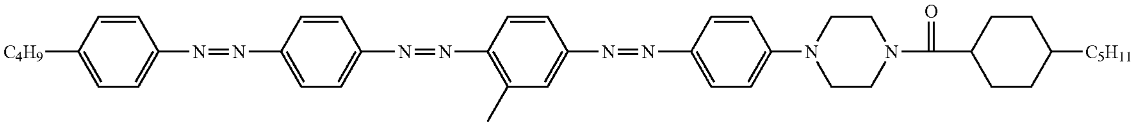
A-54
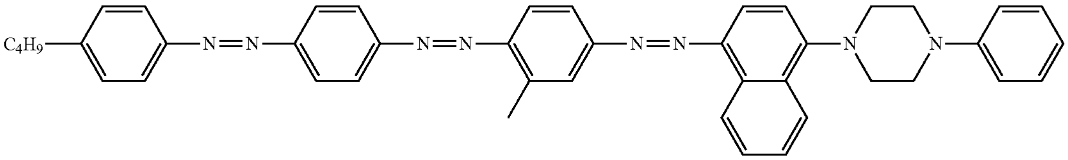
A-55
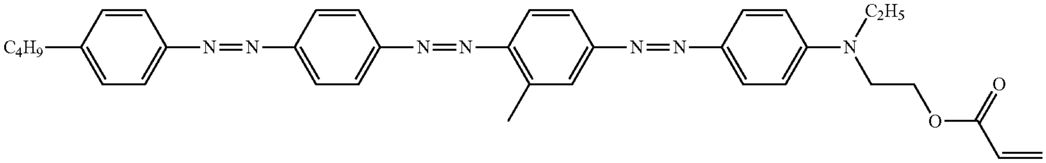
A-56
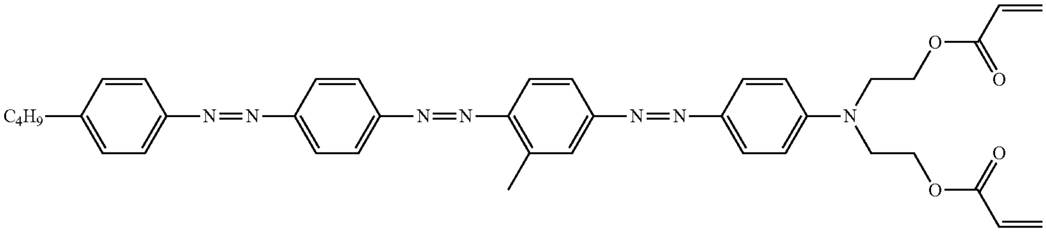
A-57
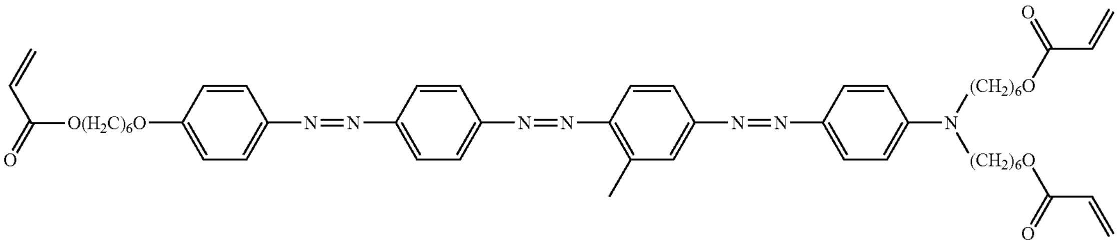
A-58
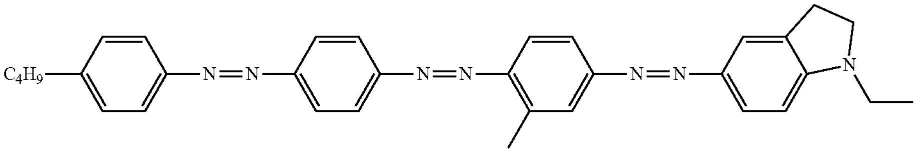

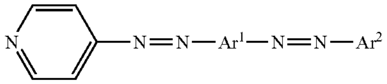
| Exemplified compound No. | $Ar^1$ | $Ar^2$ |
|---|---|---|
| B-1 | 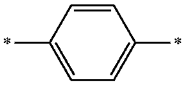 | 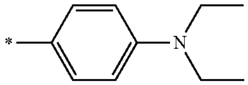 |
| B-2 | 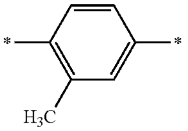 | 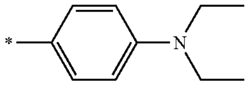 |
-continued
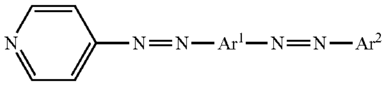
| Exemplified compound No. | $Ar^1$ | $Ar^2$ |
|---|---|---|
| B-3 | 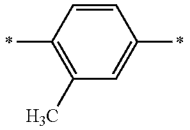 | 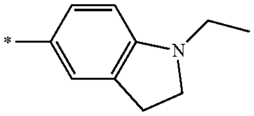 |
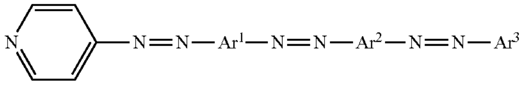
| Exemplified compound No. | $Ar^1$ | $Ar^2$ | $Ar^3$ |
|---|---|---|---|
| B-4 | 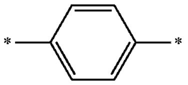 | 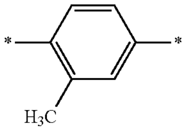 | 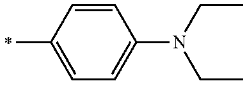 |
| B-5 | 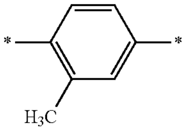 | 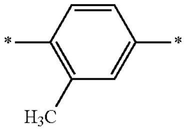 | 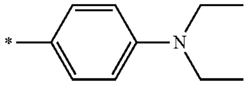 |
| B-6 | 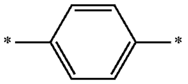 | 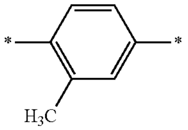 | 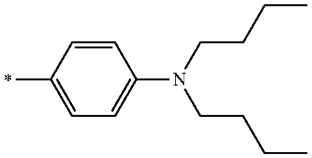 |
| B-7 | 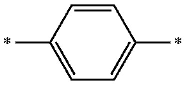 | 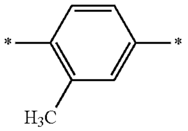 | 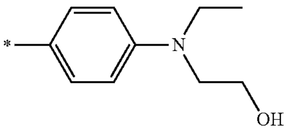 |
| B-8 |  | 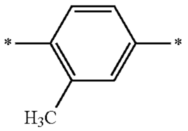 | 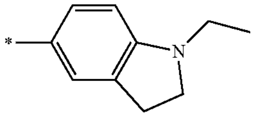 |
| B-9 | 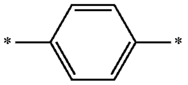 | 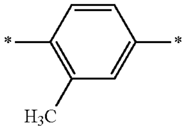 | 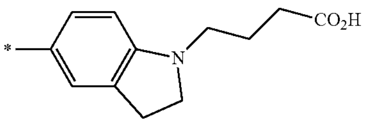 |

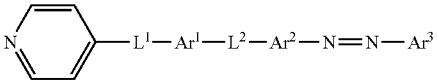
| Exemplified compound No. | $L^1$ | $Ar^1$ | $L^2$ | $Ar^2$ | $Ar^3$ |
|---|---|---|---|---|---|
| B-10 | *—N═N—* | 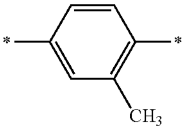 | 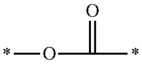 | 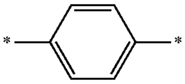 | 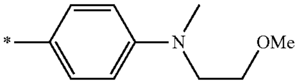 |
| B-11 | *—N═N—* | 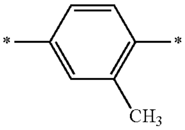 | 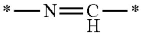 | 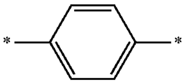 | 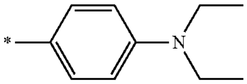 |
| B-12 | 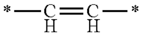 | 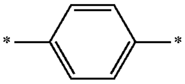 | 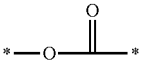 | 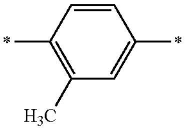 | 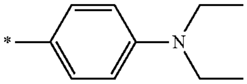 |
B-13
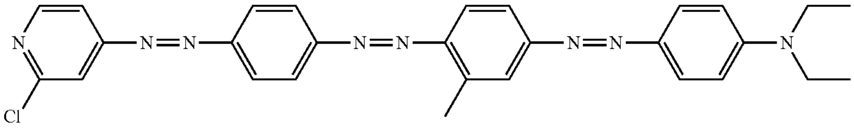
B-14
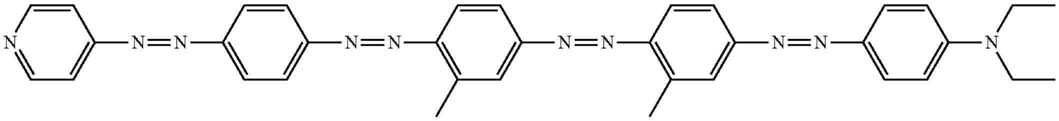
C-1
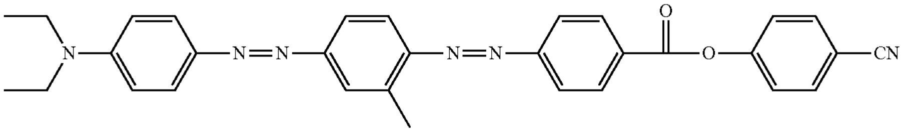
C-2
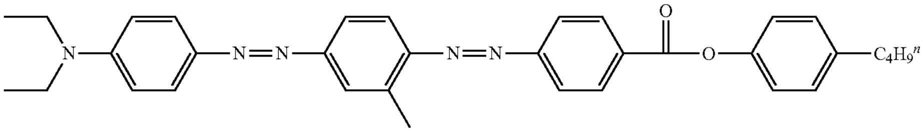
C-3
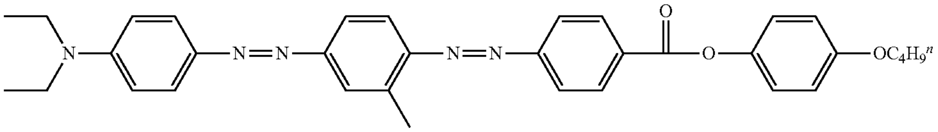
C-4
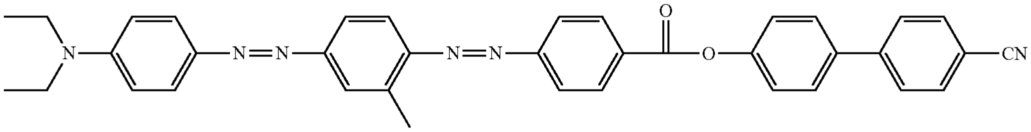

-continued
C-5
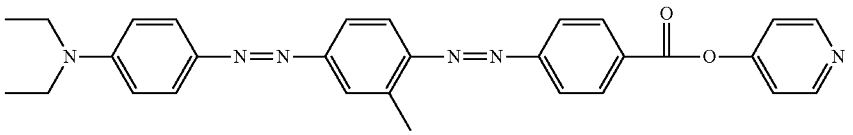
C-6
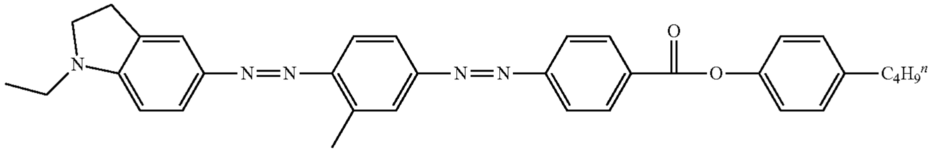
C-7
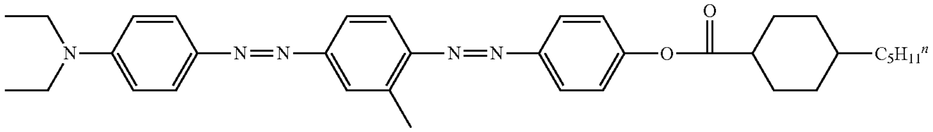
C-8
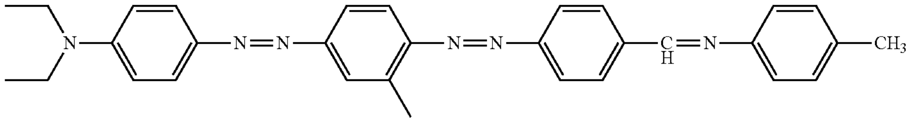
C-9
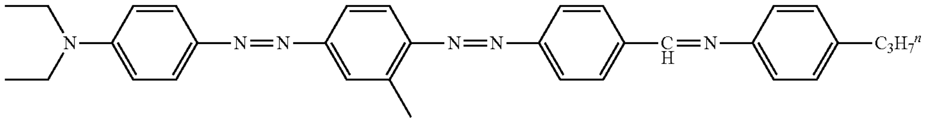
C-10
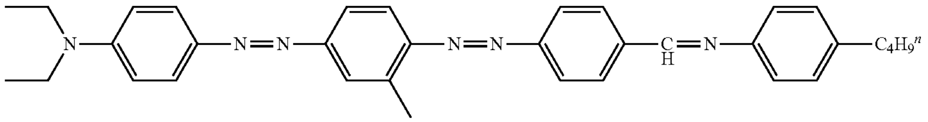
C-11
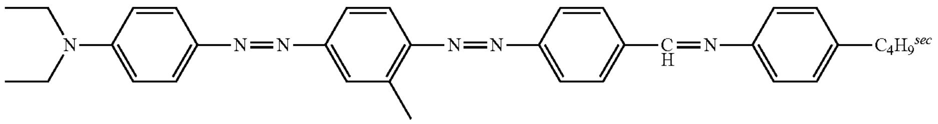
C-12
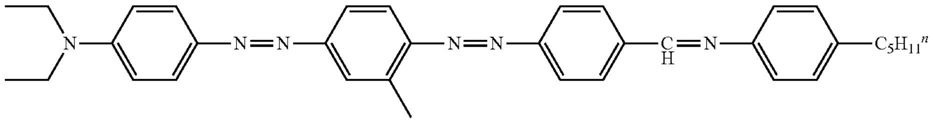
C-13
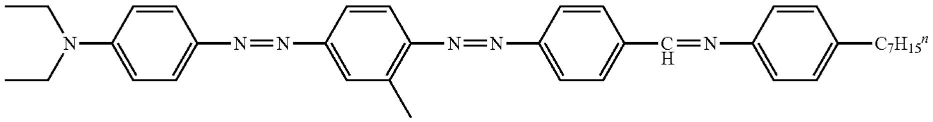
C-14
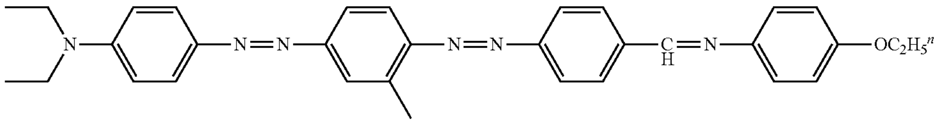
C-15
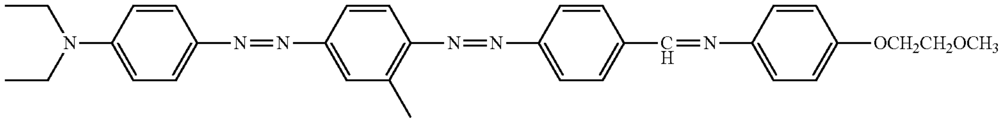

-continued
C-16
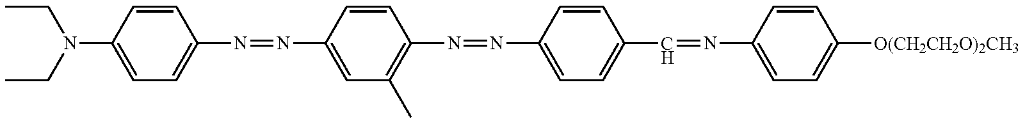
C-17
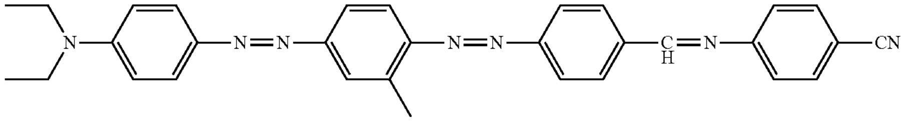
C-18
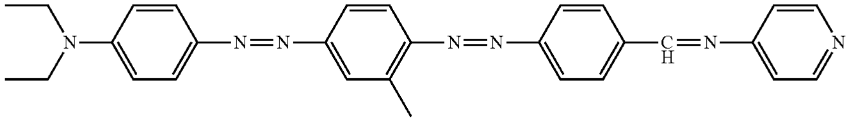
C-19
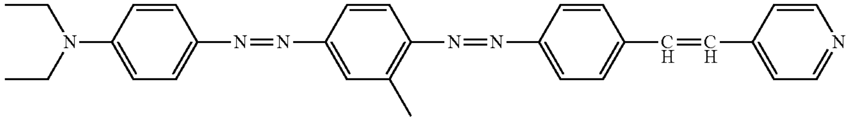
C-20
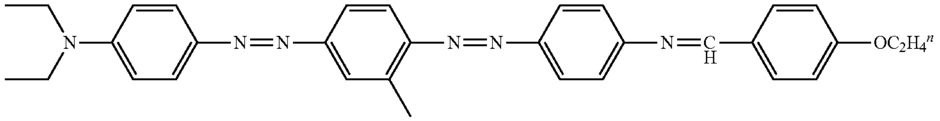
C-21
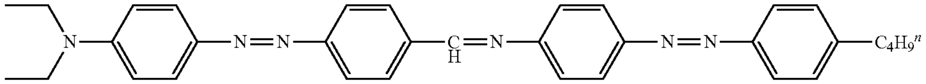
C-22
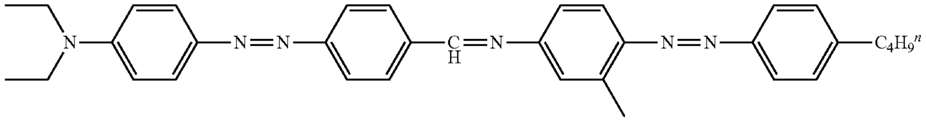
C-23
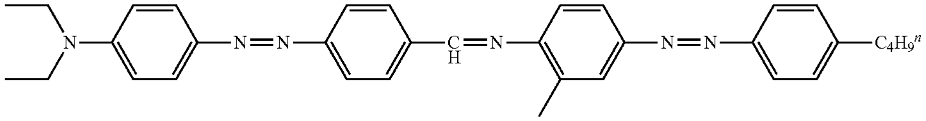
C-24
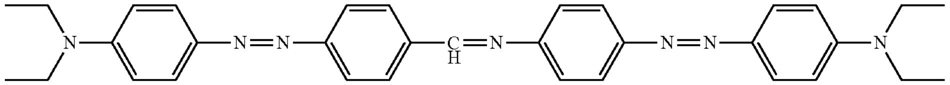
C-25
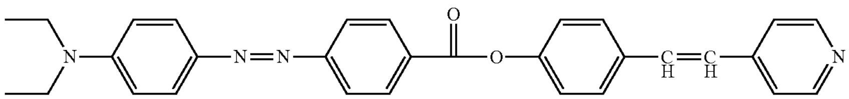
C-26
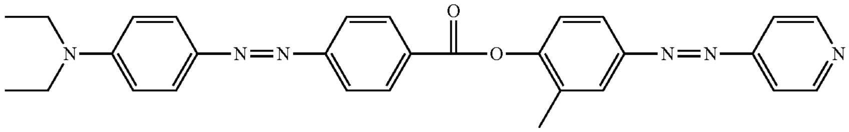
C-27
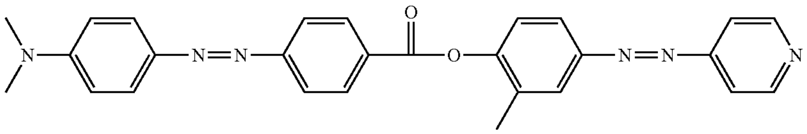

-continued

C-28

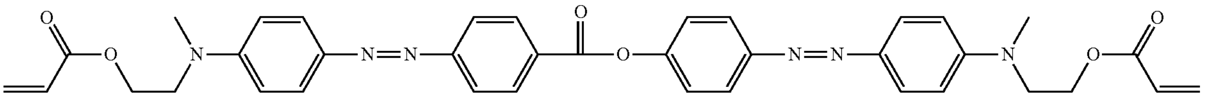

C-29

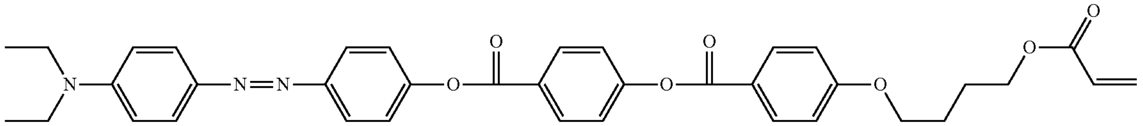

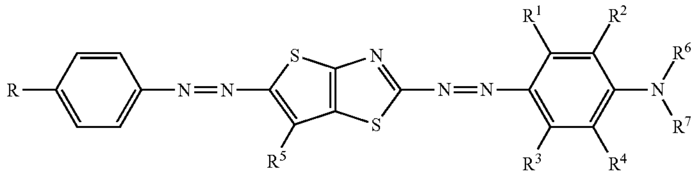

| No. | $R^1$ | $R^2$ | $R^3$ | $R^4$ | $R^5$ | $R^6$ | $R^7$ | R |
|---|---|---|---|---|---|---|---|---|
| D-1 | —H | —H | —H | —H | —H | $—C_2H_5$ | $—C_2H_5$ | $—C_4H_9$ |
| D-2 | —H | —H | —H | —H | —H | $—C_2H_5$ | $—C_2H_5$ | $—C_6H_{13}$ |
| D-3 | —H | —H | —H | —H | —H | $—C_2H_5$ | $—C_2H_5$ | $—OC_4H_9$ |
| D-4 | —H | —H | —H | —H | —H | $—C_2H_5$ | $—C_2H_5$ | $—CF_3$ |
| D-5 | —H | —H | —H | —H | —H | $—C_2H_5$ | $—C_2H_5$ | —OH |
| D-6 | —H | —H | —H | —H | —H | $—C_2H_5$ | $—C_2H_5$ | —CN |
| D-7 | —H | —H | —H | —H | —H | $—C_2H_5$ | $—C_2H_5$ | $—NO_2$ |
| D-8 | —H | —H | —H | —H | —H | $—C_2H_5$ | $—C_2H_5$ | —F |
| D-9 | —H | —H | —H | —H | —H | $—C_2H_5$ | $—C_2H_5$ | —Br |
| D-10 | —H | —H | —H | —H | —H | $—C_2H_5$ | $—C_2H_5$ | —I |
| D-11 | —H | —H | —H | —H | —H | $—CH_3$ | —H | $—C_4H_9$ |
| D-12 | —H | —H | —H | —H | —H | $—CH_3$ | $—CH_3$ | $—C_4H_9$ |
| D-13 | —H | —H | —H | —H | —H | $—CH_3$ | $—C_3H_{13}$ | $—C_4H_9$ |
| D-14 | —H | —H | —H | —H | —H | $—CH_3$ | $—CH_2CH_2OH$ | $—C_4H_9$ |
| D-15 | —H | —H | —H | —H | —H | $—CH_3$ | $—CH_2CH_2OCH_3$ | $—C_4H_9$ |
| D-16 | —H | —H | —H | —H | —H | $—CH_3$ | $—CH_2CH_2OCOCH{=}CH_2$ | $—C_4H_9$ |
| D-17 | —H | —H | —H | —H | —H | $—CH_3$ | $—CH_2CH_2CN$ | $—C_4H_9$ |
| D-18 | —H | —H | —H | —H | —H | $—CH_2CH_2OCOCH{=}CH_2$ | $—CH_2CH_2OCOCH{=}CH_2$ | $—C_4H_9$ |
| D-19 | $—CH_3$ | —H | —H | —H | —H | $—C_2H_5$ | $—C_2H_5$ | $—C_4H_9$ |
| D-20 | —F | —H | —H | —H | —H | $—C_2H_5$ | $—C_2H_5$ | $—C_4H_9$ |
| D-21 | —Cl | —H | —H | —H | —H | $—C_2H_5$ | $—C_2H_5$ | $—C_4H_9$ |
| D-22 | —OH | —H | —H | —H | —H | $—C_2H_5$ | $—C_2H_5$ | $—C_4H_9$ |
| D-23 | $—OCH_3$ | —H | —H | —H | —H | $—C_2H_5$ | $—C_2H_5$ | $—C_4H_9$ |
| D-24 | —H | $—OCH_3$ | $—OCH_3$ | —H | —H | $—C_2H_5$ | $—C_2H_5$ | $—C_4H_9$ |
| D-25 | —H | —H | —H | —H | $—CH_3$ | $—C_2H_5$ | $—C_2H_5$ | $—C_4H_9$ |

(D-26)

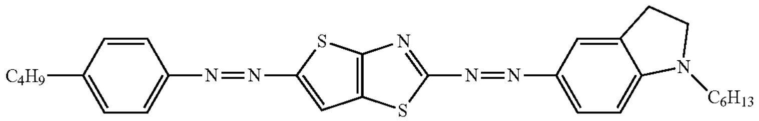

(D-27)

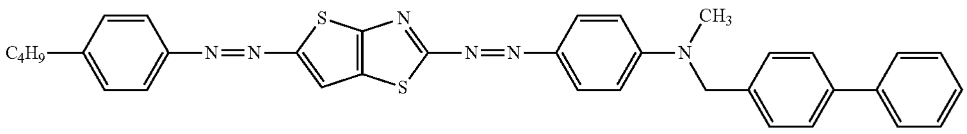

-continued
(D-28)
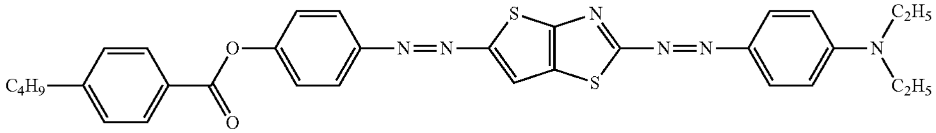
(D-29)
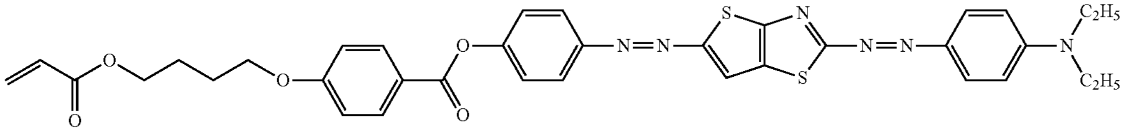
(D-30)
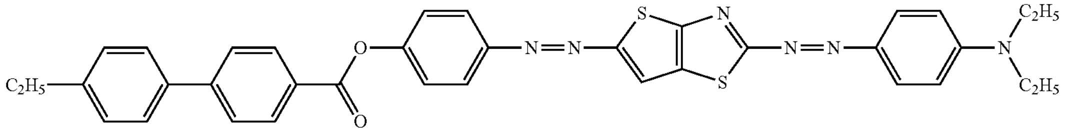
(D-31)
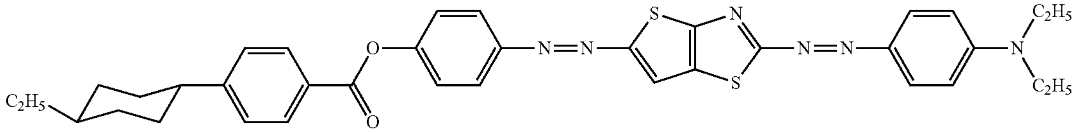
(D-32)
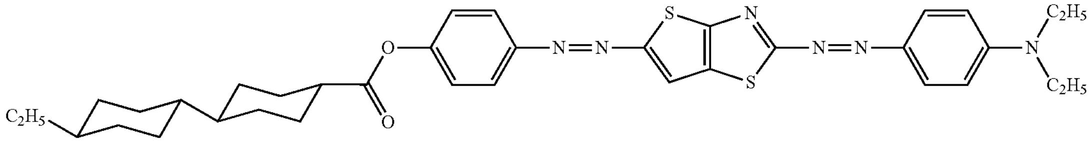
(D-33)
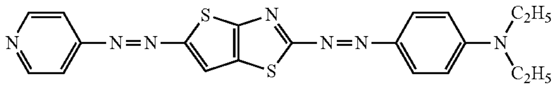
(D-34)
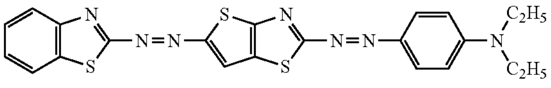
(D-35)
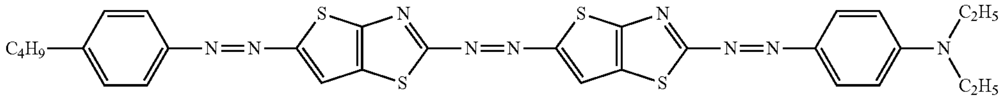
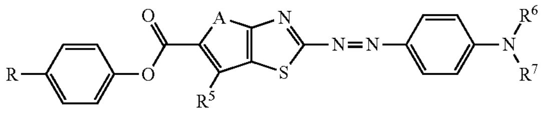
| No. | A | $R^5$ | $R^6$ | $R^7$ | R |
|---|---|---|---|---|---|
| D-36 | S | —H | $—C_2H_5$ | $—C_2H_5$ | $—C_4H_9$ |
| D-37 | S | —H | $—C_2H_5$ | $—C_2H_5$ | $—C_7H_{15}$ |
| D-38 | S | —H | $—C_2H_5$ | $—C_2H_5$ | —CN |
| D-39 | S | —H | $—C_2H_5$ | $—C_2H_5$ | —Br |
| D-40 | S | $—CH_3$ | $—C_2H_5$ | $—C_2H_5$ | $—C_4H_9$ |
-continued
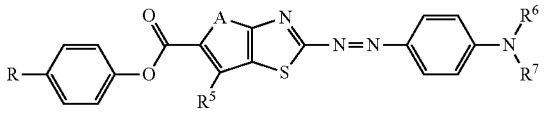
| No. | A | $R^5$ | $R^6$ | $R^7$ | R |
|---|---|---|---|---|---|
| D-41 | S | —H | $—CH_3$ | $—CH_3$ | $—C_4H_9$ |
| D-42 | O | —H | $—C_2H_5$ | $—C_2H_5$ | $—C_4H_9$ |

(D-43)

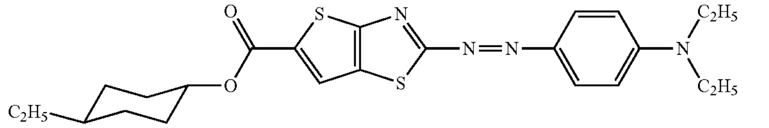

(D-44)

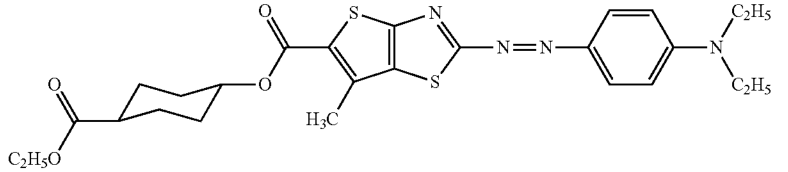

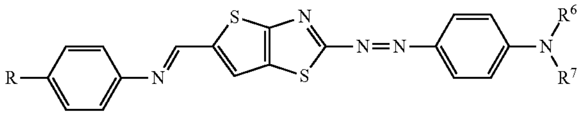

| No. | $R^6$ | $R^7$ | R |
|---|---|---|---|
| D-45 | $—C_2H_5$ | $—C_2H_5$ | $—C_4H_9$ |
| D-46 | $—C_2H_5$ | $—C_2H_5$ | $—OC_4H_9$ |
| D-47 | $—C_2H_5$ | $—C_2H_5$ | $—CF_3$ |
| D-48 | $—C_2H_5$ | $—C_2H_5$ | —F |
| D-49 | $—CH_3$ | $—CH_3$ | $—C_4H_9$ |

by formula (I) can be made to have mesomorphism, i.e. a property of a substrate to be a state of liquid crystal (in other words, liquid crystallinity).

Furthermore, since the azo dye represented by formula (I) is high in flatness of the molecule, a strong intermolecular interaction can act. Thus, the azo dye represented by formula (I) also has a property of easily forming an association state of the molecules each other.

The dichroic dye composition containing the azo dye represented by formula (I) of the present invention not only reveals the high absorbance in a wide visible wavelength region caused by association formation, but also specifically has a nematic liquid crystallinity. Accordingly, for example, (D-50)

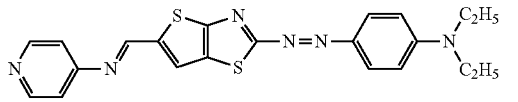

(D-51)

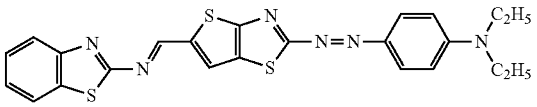

(D-52)

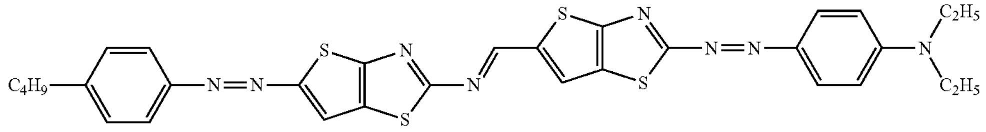

The compounds (azo dye) represented by formula (I) can be synthesized according to the methods described in "Dichroic Dyes for Liquid Crystal Display" (written by A. V. Ivashchenko, published by CRC, in 1994), "Sohsetsu Gohsei Senryou (Review of Synthesized Dyes)" (written by Hiroshi Horiguchi, published by SANKYO PUBLISHING Co., Ltd., in 1968) and literatures cited therein.

The azo dye represented by formula (I) of the present invention can be easily synthesized according to the method described in, for example, Journal of Materials Chemistry (1999), 9(11), pp. 2755-2763.

As apparent from its molecular structure, the azo dye represented by formula (I) has a planar molecular shape and a favorable linearity, and has a rigid and solid core part and a flexible side-chain part, and also has a polar amino group at its terminal of its molecular long axis of the azo dye. Thus, the azo dye represented by formula (I) itself has a characteristic easily revealing mesomorphism, especially nematic mesomorphism.

As in the above, in the present invention, the dichroic dye composition containing at least one dichroic dye represented due to passing through a lamination process such as coating over the surface of a polyvinyl alcohol alignment film (orientating film) after rubbing, a high level of molecular orientation state is realizable. Therefore, an employment of the dichroic dye composition containing the azo dye represented by formula (I) of the present invention as a light absorption anisotropic film enables to produce a polarizing element with high polarizing property.

The dichroic ratio (D) calculated by a method described in Examples described later can be raised to 15 or more by the dichroic dye composition of the present invention, and the dichroic ratio (D) is preferably 18 or more.

The azo dye represented by formula (I) exhibits a nematic liquid crystal phase preferably at 10 to 300° C. and more preferably 100 to 250° C.

The dichroic dye composition of the present invention contains one or more kinds of the azo dyes represented by formula (I). Though no particular limitation is imposed on the combination of these azo dyes, it is preferable to mix two or more dyes in such a combination that the mixture has a black color to attain production of a polarizer high in the degree of polarization.

In the present invention, the azo dye represented by formula (Ia) is a magenta azo dye, the azo dye represented by formula (Ib) is a yellow or magenta azo dye, and the azo dye represented by formula (Ic) is a cyan azo dye.

Among the above two or more azo dyes represented by formula (I) that can be contained in the dichroic dye composition, at least one azo dye is preferably an azo dye represented by formula (Ia).

Further, the dichroic dye composition preferably contains an azo dye represented by formula (Ib) or (Ic).

Further, the dichroic dye composition preferably contains at least one azo dye represented by formula (Ia) and at least one azo dye represented by formula (Ib) or (Ic).

Further, the dichroic dye composition more preferably contains at least one azo dye represented by formula (Ia), at least one compound represented by formula (Ib), and at least one azo dye represented by formula (Ic).

The dichroic dye composition may further contain a coloring material such as a dye other than the azo dyes represented by formula (I), to the extent that the effect of the present invention is not impaired. The dye(s) other than the azo dye represented by formula (I) is preferably selected from compounds exhibiting mesomorphism. As the dichroic dye which may be combined, for example, those described in "Dichroic Dyes for Liquid Crystal Display" (A. V. Ivashchenko, CRC, 1994) may be used.

The dichroic dye composition contains one or more kinds of the azo dyes represented by formula (I) as a main component. Specifically, the content of the azo dye represented by formula (I) is preferably 80 mass % or more, and more preferably 90 mass % or more, based on the total content of all dyes to be contained. The upper limit of the content of the azo dye represented by formula (I) is 100 mass %, and namely, all the dyes to be contained may be, of course, the azo dyes represented by formula (I).

The content of the azo dye represented by formula (I) based on the total solid matters excluding a solvent contained in the dichroic dye composition, is preferably 20 mass % or more and more preferably 30 mass % or more. Although the upper limit value is not particularly limited, in an embodiment containing other additives such as the surfactant mentioned below, the content of one or more kinds of the azo dyes represented by formula (I) based on the total solid matters excluding a solvent contained in the dichroic dye composition is preferably 95 mass % or less, more preferably 90 mass % or less, so as to obtain the effect thereof.

Surfactant:

The dichroic dye composition used in the present invention may contain a surfactant together with one or more kinds of the azo dyes. The surfactant would be added for the purpose of preventing unevenness by wind during coating when the composition is prepared as a coating liquid and coated. Fluorine based polymers can favorably be used in general as the surfactant. The fluorine based polymers to be used are not particularly limited so long as not remarkably obstruct a tilt angle change or alignment of the dye. JP-A-2004-198511, Japanese Patent No. 4190275, JP-A-2004-333852, JP-A-2005-206638 and Japanese Patent Application No. 2008-193565 describe the examples of the fluorine based polymer usable as the surfactant. Using the fluorine based polymer together with the dye enables to display images of high display quality without generating any unevenness. Further, coating properties such as a cissing can be also improved.

From the viewpoint of not disturbing the alignment of the azo dye, the addition amount of the surfactant used for the purpose of preventing the unevenness by wind is, in general, preferably within the range of approximately 0.1 to 10 mass % with respect to the azo dye; more preferably within the range of approximately 0.5 to 10 mass %, and furthermore preferably within the range of approximately 0.5 to 5 mass %.

Non-Liquid-Crystalline Polyfunctional Monomer Having a Radical Polymerizable Group:

The dichroic dye composition preferably contains a non-liquid-crystalline polyfunctional monomer having a radical polymerizable group.

In the present invention, the term "non-liquid-crystalline polyfunctional monomer having a radical polymerizable group" means a polyfunctional monomer with a growth activating species which radically undergoes a polymerization reaction, not showing the mesomorphism. This polyfunctional monomer is preferably one having two or more double bonds in its molecule, and the double bond is particularly preferably an ethylenically (aliphatic) unsaturated double bond. Examples of the polyfunctional monomer include polyfunctional monomers having functional groups such as alkene, dien, acrylate, methacrylate, diester of unsaturated polyvalent carboxylic acids, $\alpha,\beta$-unsaturated carboxylic acid amides, unsaturated nitrile, styrene and its derivatives, vinyl ester and vinyl ether. The number of double bonds in a molecule is preferably 2 to 20, more preferably 2 to 15, and even more preferably 2 to 6. The polyfunctional monomer is preferably esters of polyols having two or more hydroxyl groups in its molecule and unsaturated fatty acids. Examples of the unsaturated fatty acid include acrylic acids, methacrylic acids, maleic acid, and itaconic acid; and among these acids, acrylic acids and methacrylic acids are preferable. The polyols having four or more hydroxyl groups in its molecule are preferably tetravalent or higher-valent alcohols or oligomers of trivalent or higher-valent alcohols. The oligomer has a molecular structure in which polyvalent alcohols are connected by an ether bond, ester bond or urethane bond. Oligomers having a molecular structure in which polyvalent alcohols are connected by an ether bond are preferable.

The above polyfunctional monomers are particularly preferably those soluble in an organic solvent.

Examples of such a monomer may include compounds having a boiling point of 100° C. or more at normal pressure.

Examples of difunctional (meth)acrylate among the above polyfunctional monomers include ethylene glycol di(meth)acrylate, 1,6-hexanediol di(meth)acrylate, 1,9-nonanedioldi(meth)acrylate, polypropylene glycol di(meth)acrylate, tetraethylene glycol di(meth)acrylate and bisphenoxyethanolfluorenediacrylate. Examples of commercial products thereof include ARONIX M-210, ARONIX M-240, and ARONIX M-6200 (manufactured by TOAGOSEI CO., LTD), KAYARAD HDDA, KAYARAD HX-220 and KAYARAD R-604 (manufactured by Nippon Kayaku Co., Ltd.), and Viscote 260, Viscote 312 and Viscote 335HP (manufactured by Osaka Organic Chemical Industry, Ltd.) (all of them are trade names).

Examples of a tri- or more functional (meth)acrylate include trimethylolpropane tri(meth)acrylate, pentaerythritol tri(meth)acrylate, tri((meth)acryloyloxyethyl)phosphate, pentaerythritol tetra(meth)acrylate, dipentaerythritol penta(meth)acrylate, and dipentaerythritol hexa(meth)acrylate. Examples of commercial products thereof include ARONIX M-309, ARONIX M-400, ARONIX M-405, ARONIX M-450, ARONIX M-7100, ARONIX M-8030 and ARONIX M-8060 (trade names, manufactured by TOAGOSEI CO., LTD.), KAYARAD TMPTA, KAYARAD DPHA, KAYARAD DPCA-20, KAYARAD DPCA-30, KAYARAD DPCA-60 and KAYARAD DPCA-120 (trade names, manufactured by Nippon Kayaku Co., Ltd.), and Viscote 295, Viscote 300, Viscote 360, Viscote GPT, Viscote 3PA and Viscote 400 (trade names, manufactured by Osaka Organic Chemical Industry Ltd.).

Examples of two, tri- or more functional (meth)acrylates as another monomer or oligomer include: a polyethylene glycol di(meth)acrylate, polypropylene glycol di(meth)acrylate, trimethylolethane triacrylate, trimethylolpropane diacrylate, neopentyl glycol di(meth)acrylate, dipentaerythritol penta (meth)acrylate, hexanediol di(meth)acrylate, trimethylolpropane tri(acryloyloxypropyl)ether, tri(acryloyloxyethyl)isocyanurate, tri(acryloyloxyethyl)cyanurate, glycerin tri(meth) acrylate, tri((meth)acryloyloxyethyl)phosphate, dipentaerythritol penta(meth)acrylate, dipentaerythritol hexa (meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate; poly(meth)acrylates of a polyether-series polyol; poly(meth)acrylates of a polyester-series polyol; and poly(meth)acrylates of a polyurethane-series polyol.

The monomers composed of esters of polyols and acrylic acids are commercially available from Mitsubishi Rayon Co., Ltd., under the trade name of "Dia Beam UK-4154 and from Nippon Kayaku Co., Ltd., under the trade name of "KYARAD.DPHA, SR355".

These difunctional or tri- or more functional (meth)acrylates may be used either singly or in combinations thereof, and may be combined with a monofunctional (meth)acrylate.

Examples of the monofunctional (meth)acrylate include 2-hydroxyethyl(meth)acrylate, carbitol(meth)acrylate, isoboronyl(meth)acrylate, 3-methoxybutyl(meth)acrylate, 2-(meth)acryloyloxyethyl-2-hydroxypropyl phthalate, polyethylene glycol mono(meth)acrylate, polypropylene glycol mono(meth)acrylate, phenoxyethyl(meth)acrylate, and ethylene glycol(meth)acrylate. Examples of commercial products thereof include ARONIX M-101, ARONIX M-111, and ARONIX M-114 (trade names, manufactured by TOAGOSEI CO., LTD.), KAYARAD TC-110S and KAYARAD TC-120S (trade names, manufactured by Nippon Kayaku Co., Ltd.), and Viscote 158, and Viscote 2311 (trade names, manufactured by Osaka Organic Chemical Industry Ltd.).

As mentioned below, it is preferable to fix the state of alignment of a liquid-crystalline dye when a polarizing element is produced, and as to the fixing means, the alignment of the dye is fixed by utilizing a polymerization reaction. The polymerization reaction includes a thermal polymerization reaction using a thermal polymerization initiator and a photopolymerization reaction using a photopolymerization initiator.

In the dichroic dye composition, the total content of one or more kinds of the azo dyes and the non-liquid crystalline polymerizable multifunctional monomer based on the total solid matters excluding a solvent is preferably 50 mass % or more, particularly preferably 70 mass % or more.

Polymerization Initiator:

The composition containing the non-liquid crystalline multifunctional monomer having a radical polymerizable group preferably contains a polymerization initiator, so as to cause a curing reaction of the monomer.

As the polymerization initiator, an ordinary one may be preferably used corresponding to photopolymerization and thermal polymerization. Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850) and oxadiazol compounds (described in U.S. Pat. No. 4,212,970).

In the embodiment in which the dichroic dye composition is cured by photopolymerization, when a photoalignment film layer is positioned below, it is preferable to use a photopolymerization initiator having a light-absorption wavelength band that is different from the absorption band of the photoactive compound contained in the photoalignment film layer so as to avoid disturbance of the alignment of the photoalignment film layer.

In addition, a compound that induces a polymerization reaction by causing energy transfer to the polymerization initiator by absorbing light of a longer wavelength than the absorption band of an ordinary photopolymerization initiator may be mixed. As a result, polymerization of the dichroic dye composition can be carried out without disturbing the aligned state of the photoalignment film composition immobilized by the photoalignment procedure. On the other hand, in the case of radiating light from the same direction as that of the photoalignment procedure to initiate the polymerization of the dichroic dye composition, or if polarized light is radiated having a plane of polarization perpendicular to the absorption transition moment of the photoactive compound, light having an arbitrary wavelength can be used since there is no risk of disturbing the aligned state of the photoalignment film layer. Further, the range of the choice of the polymerization initiator is expanded.

For example, if a polymerization initiator is added to the composition in advance and light which may align the photoalignment material is radiated, photoalignment and photopolymerization can be simultaneously conducted. In addition, only the photoalignment is conducted in an atmosphere such as air, in which the polymerization is inhibited, and then the atmosphere is changed to an atmosphere such as nitrogen that does not inhibit the polymerization and the photopolymerization can be initiated. In this case, it is preferable not to consume all of the photopolymerization initiator during the photoalignment conducted in the polymerization-inhibiting atmosphere by adjusting light radiation dose during the photoalignment.

On the other hand, in the case of polymerizing by heat, polymerization is preferably conducted at a temperature of 80° C. to 200° C., and more preferably 80° C. to 160° C. In this case, it is preferable to add a thermopolymerization initiator.

A known, commonly used photopolymerization initiator can be used as the photopolymerization initiator used in the present invention.

Examples of photopolymerization initiators able to be used with ultraviolet light at a wavelength of 320 nm or less include 1-hydroxylcyclohexyl phenyl ketone (trade name: Irgacure 184, manufactured by Ciba Specialty Chemicals Corp.), 1-[4-(2-hydroxylethoxy)-phenyl]-2-hydroxyl 2-methyl-1-propan-1-one and 2-hydroxyl-2-methyl-1-phenylpropan-1-one (trade name: Darocure 1173, manufactured by Merck & Co., Inc.).

In addition, examples of photopolymerization initiators having a photoabsorption wavelength band different from the photoabsorption band of the azobenzene backbone include a combination of a near infrared-absorbing dye and organic boron described in Japanese Patent No. 3016606.

Other examples of photopolymerization initiators include 1-(4-isopropylphenyl)-2-hydroxyl-2-methylpropan-1-one (trade name: Darocure 1116, manufactured by Merck & Co., Inc.), 2-methyl-1-[(methylthio)phenyl]-2-morpholinopropane-1 (trade name: Irgacure 907, manufactured by Ciba Specialty Chemicals Corp.), benzyl methyl ketal (trade name: Irgacure 651, manufactured by Ciba Specialty Chemicals Corp.), mixtures of 2,4-diethylthioxanthone (trade name: Kayacure DETX, manufactured by Nippon Kayaku Co., Ltd.) and ethyl p-dimethylaminobenzoate (trade name: Kayacure EPA, manufactured by Nippon Kayaku Co., Ltd.), mixtures of isopropyl thioxanthone (trade name: Cantacure ITX, manufactured by Wordprekinsop Co.) and ethyl p-dimethylaminobenzoate, and acyl phosphion oxide (trade name: Lucirin TPO, manufactured by BASF Corp.).

In addition, a known, commonly used thermopolymerization initiator can be used for thermopolymerization. Examples thereof include organic peroxides such as methylacetoacetate peroxide, cumene hydroperoxide, benzoyl peroxide, bis(4-t-butylcyclohexyl)peroxydicarbonate, t-butylperoxybenzoate, methyl ethyl ketone peroxide, 1,1-bis(t-hexylperoxy) 3,3,5-trimethylcyclohexane, p-pentahydroperoxide, t-butylhydroperoxide, dicumylperoxide, isobutylperoxide, di(3-methyl-3-methoxybutyl)peroxydicarbonate or 1,1-bis(t-butylperoxy)cyclohexane; azonitrile compounds such as 2,2'-azobisisobutylnitrile or 2,2'-azobis (2,4-dimethylvaleronitrile); azoamidine compounds such as 2,2'-azobis(2-methyl-N-phenylpropion-amidine)dihydrochloride, azoamide compounds such as 2,2'-azobis {2-methyl-N-[1,1-bis(hydroxylmethyl)-2-hydroxylethyl]propionamide}, and alkylazo compounds such as 2,2'-azobis(2,4, 4-trimethylpentane).

The amount to be used of the photopolymerization initiator is preferably from 0.01 to 20 mass %, more preferably from 1 to 10 mass %, relative to the total solid matters excluding a solvent.

The descriptions from paragraph Nos. [0050] to [0051] in JP-A-2001-91741 are able to be adapted to the present invention, with respect to each values of the polymerization initiator such as examples of the polymerization initiator, the amount of the polymerization initiator to be used, and photo-irradiation energy for polymerization.

Other Additives:

In the dichroic dye composition used in the present invention, any additive can be blended and used in combination besides one or more kinds of the nematic liquid crystalline azo dyes, as well as the surfactant, the non-liquid crystalline multifunctional monomer having a radical polymerizable group, and the polymerization initiator that are added according to the necessity. Examples of the additive include an non-liquid-crystalline binder polymer, an anti-cissing agent, an additive to control the tilt angle of an alignment film (tilt angle of the liquid crystalline azo dye at the interface of the polarization layer/the alignment film), an additive to control the tilt angle of air interface (tilt angle of the liquid crystalline azo dye at the interface of the polarization layer/air), saccharides, and a chemical agent or so having at least any function of an antifungal activity, an antibacterial activity and a sterilization activity. Each of the additives is describe below.

Non-Liquid-Crystalline Binder Polymer:

A non-liquid-crystalline binder polymer may be added to the dichroic dye composition to be used in the present invention. Examples of the non-liquid-crystalline polymer include acryl type resins such as a polyacrylonitrile, polyacrylate and polyacrylamide; polystyrene resins; polyvinylacetal type resins such as a polyvinylacetoacetal and polyvinylbutyral; modified cellulose type resins such as ethyl cellulose, hydroxyethyl cellulose, ethyl hydroxycellulose, hydroxypropyl cellulose, ethyl hydroxyethyl cellulose, methyl cellulose, cellulose acetate, cellulose acetobutyrate, cellulose acetopropionate and cellulose nitrate; cellulose type resins such as ethylhydroxyethyl cellulose and ethyl cellulose; polyurethane resins; polyamide resins; polyester resins; polycarbonate resins; phenoxy resins; phenol resins; epoxy resins; and various elastomers. These compounds may be used either singly or in combinations of two or more thereof. Copolymers of these compounds may be used.

As the non-liquid-crystalline binder polymer, particularly, acryl type polymers (resins having an acryl type copolymer or styrene type copolymer as its principle chain) are preferable. These acryl polymers are particularly preferably soluble in an organic solvent.

For example, a method according to the ordinary radical polymerization method may be applied to the production of an acryl polymer. Polymerization conditions such as temperature, pressure, the type and amount of a radical initiator and the type of solvent in the production by a radical polymerization method can be easily designed by a person skilled in the art and can be experimentally determined.

Specific examples of the copolymer component of the above acryl type copolymer may include unsaturated carboxylic acids (for example, (meth)acrylic acid, crotonic acid, itaconic acid, maleic acid and fumaric acid), aromatic vinyl compounds (for example, styrene, α-methylstyrene, vinyltoluene, 2-vinylpyridine, 4-vinylpyridine and N-vinylimidazole), alkyl(meth)acrylates (for example, methyl(meth)acrylate, ethyl(meth)acrylate, n-butyl(meth)acrylate, i-butyl (meth)acrylate, hexyl(meth)acrylate, cyclohexyl(meth) acrylate and dodecyl(meth)acrylate), alkyl aryl(meth) acrylate (for example, benzyl(meth)acrylate), substituted alkyl(meth)acrylates (for example, glycidyl(meth)acrylate and 2-hydroxyethyl(meth)acrylate), vinyl carboxylates (for example, vinyl acetate and vinyl propionate), vinyl cyanide (for example, (meth)acrylonitrile and α-chloroacrylonitrile) and aliphatic conjugate dienes (for example, 1,3-butadiene and isoprene). Among these compounds, unsaturated carboxylic acids, aromatic vinyl compounds, alkyl(meth)acrylates, alkyl aryl(meth)acrylates and vinyl carboxylates are preferable. Herein, the (meth)acrylic acid is a generic name for acrylic acids and methacrylic acids, and similarly, (meth) acrylate is a generic name for acrylate and methacrylate as follows.

Further, acryl type polymers having a (meth)acryloyl group at its side chain and acryl type graft polymers containing, as a copolymer component, a macromonomer (for example, a polystyrene macromonomer, polymethylmethacrylate macromonomer, polyethylene glycol mono (meth)acrylate, polypropylene glycol mono(meth)acrylate and polyethylene glycol polypropylene glycol mono(meth) acrylate) are given as preferable examples.

These compounds may be used either singly or in combinations of two or more thereof.

Anti-Cissing Agent:

Polymers can be used as a material for preventing cissing while coating the dichroic dye composition used in the present invention. Any polymers used for this purpose are not particularly limited, as long as they have compatibility with the liquid crystalline azo dye and they do not remarkably change the tilt angle of the liquid crystalline azo dye or do not remarkably inhibit alignment of the liquid crystalline azo dye. Examples of the polymer, which can be used as an anti-cissing agent, include the polymers described in JP-A-8-95030, and especially preferred examples of the polymer include cellulose esters. Examples of the cellulose ester include cellulose acetate, cellulose acetate propionate, hydroxypropyl cellulose and cellulose acetate butyrate. For preventing the anti-cissing agent from inhibiting alignment of the azo dye, in general, the amount of the polymer as the anti-cissing agent is preferably from 0.1 to 10 mass %, more preferably from 0.1 to 8 mass % and furthermore preferably from 0.1 to 5 mass %, with respect to the liquid crystalline azo dye.

Agent for Controlling Tilt Angle of Alignment Film:

An additive that controls the tilt angle of the liquid crystalline azo dye molecules on the side of the alignment film may be added to the dichroic dye composition. Examples of the additive having such effect include a compound having both a polar group and a nonpolar group in a molecule. Examples of the compound having both of a polar group and a non-polar group include $P^O$—OH, $P^O$—COOH, $P^O$—O—$P^O$, $P^O$—$NH_2$, $P^O$—NH—$P^O$, $P^O$—SH, $P^O$—S—$P^O$, $P^O$—CO—$P^O$, $P^O$—COO—$P^O$, $P^O$—CONH—$P^O$, $P^O$—CONHCO—$P^O$, $P^O$—$SO_3H$, $P^O$—$SO_3$—$P^O$, $P^O$—$SO_2NH$—$P^O$, $P^O$—$SO_2NHSO_2$—$P^O$, $P^O$—C═N—$P^O$, HO—P(—$OP^O$)$_2$, (HO—)$_2$PO—$OP^O$, P(—$OP^O$)$_3$, HO—PO(—$OP^O$)$_2$, (HO—)$_2$PO—$OP^O$, PO(—$OP^O$)$_3$, $P^O$—$NO_2$ and $P^O$—CN; and organic salts thereof. Examples of the organic salts include organic salts of the above-described compound such as ammonium salts, carboxylates, sulfonates; and pyridinium salts. Among these, $P^O$—OH, $P^O$—COOH, $P^O$—O—$P^O$, $P^O$—$NH_2$, $P^O$—$SO_3H$, HO—PO(—$OP^O$)$_2$, (HO—)$_2$PO—$OP^O$, PO(—$OP^O$)$_3$ and organic salts thereof are preferred. Herein, $P^O$ represents a non-polar group. When there are plurality of $P^0$, each $P^0$ may be the same as or different from each other.

Examples of $P^O$ include an alkyl group (preferably a linear, branched or cyclic, substituted or unsubstituted alkyl group having 1 to 30 carbon atoms), an alkenyl group (preferably a linear, branched or cyclic, substituted or unsubstituted alkenyl group having 1 to 30 carbon atoms), an alkynyl group (preferably a linear, branched or cyclic, substituted or unsubstituted alkynyl group having 1 to 30 carbon atoms), an aryl group (preferably a substituted or unsubstituted aryl group having 6 to 30 carbon atoms) and a silyl group (preferably a substituted or unsubstituted silyl group having 3 to 30 carbon atoms). The non-polar groups may have a substituent such as a halogen atom, an alkyl group (whose meaning includes a cycloalkyl group such as a monocyclo or bicyclo alkyl group), an alkenyl group (whose meaning include a cycloalkenyl group such as monocyclo or bicyclo alkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (whose meaning includes an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group.

The addition amount of the agent for controlling the tilt angle of an alignment film is, in general, preferably from 0.0001 mass % to 30 mass %, more preferably from 0.001 mass % to 20 mass %, and further more preferably from 0.005 mass % to 10 mass %, with respect to the mass of the liquid crystalline azo dye.

In the present invention, an agent for controlling the tilt angle of an alignment film described in JP-A-2006-58801 can be used.

Agent for Controlling Tilt Angle of Air Interface (Horizontally Orientating Agent):

The dichroic dye composition used in the present invention preferably comprises a horizontally orientating agent as an air interface tilt angle-controlling agent. Since a photoalignment film layer is utilized in the present invention, a fine homogeneous alignment structure having a specifically low pretilt angle is realized on the interface with the photoalignment film layer. However, since the direction of the pretilt angle is not controlled, when a tilt angle is generated at an air interface, the direction thereof is not constant and a reverse tilt domain may be generated. By adding the air interface tilt angle-controlling agent, the alignment of the liquid crystalline azo dye molecule at the air interface can be adjusted to be a horizontal alignment, and generation of a reverse tilt domain can be suppressed.

The horizontally orientating used in the present invention is preferably: (1) a fluoro-aliphatic group-containing compound represented by formula (III); or (2) a fluoro-aliphatic group-containing copolymer comprising at least one selected from the group consisting of polymerization units of fluoro-aliphatic group-containing monomers represented by formula (IV) or (V) and polymerization units of amide group-containing monomers represented by formula (VI).

Hereinafter, they are explained respectively. First, (1) the fluoro-aliphatic group-containing compound represented by formula (III) is explained.

Formula (III)

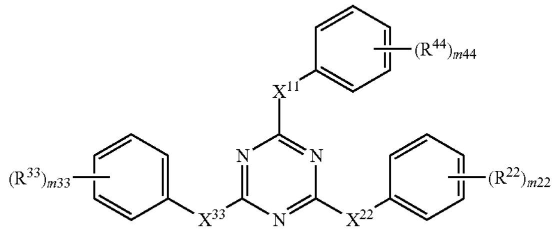

In formula (III), $R^{22}$, $R^{33}$ and $R^{44}$ each independently represent an alkoxy group having $CF_3$ group(s) or $CF_2H$ group(s) at its terminal; $X^{11}$, $X^{22}$ and $X^{33}$ each independently represent —NH—, —O— or —S—; and $m^{22}$, $m^{33}$ and $m^{44}$ each independently represent an integer of 1 to 3.

A substituent represented by $R^{22}$, $R^{33}$ or $R^{44}$ represents an alkoxy group having $CF_3$ group(s) or $CF_2H$ group(s) at its terminal. The alkoxy group may be a straight chain form or a branched chain form. The number of carbon atoms in the alkoxy group is preferably from 4 to 20, more preferably from 4 to 16, and particularly preferably from 6 to 16. The alkoxy group having $CF_3$ group(s) or $CF_2H$ group(s) at its terminal is an alkoxy group in which hydrogen atoms are partially or entirely replaced by fluorine atoms. The hydrogen atoms in the alkoxy group are preferably replaced by fluorine atoms in a ratio of 50% or more, more preferably 60% or more, and particularly preferably 70% or more. Specific examples of the alkoxy group having $CF_3$ group(s) or $CF_2H$ group(s) at its terminal represented by $R^{22}$, $R^{33}$ or $R^{44}$ are shown below.

R1: n-$C_8F_{17}$—O—

R2: n-$C_6F_{13}$—O—

R3: n-$C_4F_9$—O—

R4: n-$C_8F_{17}$—$(CH_2)_2$—O—$(CH_2)_2$—O—

R5: n-$C_6F_{13}$—$(CH_2)_2$—O—$(CH_2)_2$—O—

R6: n-$C_4F_9$—$(CH_2)_2$—O—$(CH_2)_2$—O—

R7: n-$C_8F_{17}$—$(CH_2)_3$—O—

R8: n-$C_6F_{13}$—$(CH_2)_3$—O—

R9: n-$C_4F_9$—$(CH_2)_3$—O—

R10: H—$(CF_2)_8$—O—

R11: H—$(CF_2)_6$—O—

R12: H—$(CF_2)_4$—O—

R13: H—$(CF_2)_8$—$(CH_2)$—O—

R14: H—$(CF_2)_6$—$(CH_2)$—O—

R15: H—$(CF_2)_4$—$(CH_2)$—O—

R16: H—$(CF_2)_8$—$(CH_2)$—O—$(CH_2)_2$—O—

R17: H—$(CF_2)_6$—$(CH_2)$—O—$(CH_2)_2$—O—

R18: H—$(CF_2)_4$—$(CH_2)$—O—$(CH_2)_2$—O—

In formula (III), $X^{11}$, $X^{22}$ and $X^{33}$ each preferably represent —NH— or —O—; most preferably —NH—. $m^{22}$, $m^{33}$ and $m^{44}$ each are preferably 2.

The specific examples of the compound represented by formula (III) are shown below. However, the present invention is not limited to these specific examples.

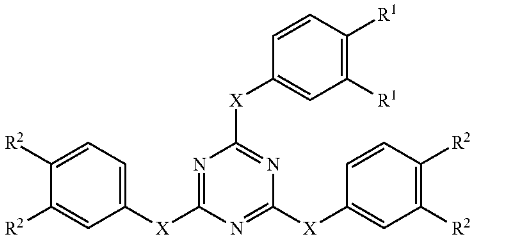

| Compound No. | $R^1$ | $R^2$ | X |
|---|---|---|---|
| I-1 | $O(CH_2)_3(CF_2)_4F$ | $O(CH_2)_3(CF_2)_4F$ | NH |
| I-2 | $O(CH_2)_3(CF_2)_6F$ | $O(CH_2)_3(CF_2)_6F$ | NH |
| I-3 | $O(CH_2)_3(CF_2)_8F$ | $O(CH_2)_3(CF_2)_8F$ | NH |
| I-4 | $OCH_2(CF_2)_6H$ | $OCH_2(CF_2)_6H$ | NH |
| I-5 | $OCH_2(CF_2)_8H$ | $OCH_2(CF_2)_8H$ | NH |
| I-6 | $O(CH_2)_2O(CH_2)_2(CF_2)_6F$ | $O(CH_2)_2O(CH_2)_2(CF_2)_6F$ | NH |
| I-7 | $O(CH_2)_2O(CH_2)_2(CF_2)_4F$ | $O(CH_2)_2O(CH_2)_2(CF_2)_4F$ | NH |
| I-8 | $O(CH_2)_3S(CH_2)_2(CF_2)_6F$ | $O(CH_2)_3S(CH_2)_2(CF_2)_6F$ | NH |
| I-9 | $O(CH_2)_3S(CH_2)_2(CF_2)_4F$ | $O(CH_2)_3S(CH_2)_2(CF_2)_4F$ | NH |
| I-10 | $O(CH_2)_6S(CH_2)_2(CF_2)_6F$ | $O(CH_2)_6S(CH_2)_2(CF_2)_6F$ | NH |
| I-11 | $O(CH_2)_6S(CH_2)_2(CF_2)_4F$ | $O(CH_2)_6S(CH_2)_2(CF_2)_4F$ | NH |
| I-12 | $O(CH_2)_2O(CH_2)(CF_2)_6H$ | $O(CH_2)_2O(CH_2)(CF_2)_6H$ | NH |
| I-13 | $O(CH_2)_3(CF_2)_6F$ | $O(CH_2)_3(CF_2)_6F$ | O |
| I-14 | $OCH_2(CF_2)_6H$ | $OCH_2(CF_2)_6H$ | O |
| I-15 | $O(CH_2)_2O(CH_2)_2(CF_2)_6F$ | $O(CH_2)_2O(CH_2)_2(CF_2)_6F$ | O |
| I-16 | $O(CH_2)_3S(CH_2)_2(CF_2)_6F$ | $O(CH_2)_3S(CH_2)_2(CF_2)_6F$ | O |
| I-17 | $O(CH_2)_2O(CH_2)(CF_2)_6H$ | $O(CH_2)_2O(CH_2)(CF_2)_6H$ | O |
| I-18 | $O(CH_2)_3(CF_2)_6F$ | $O(CH_2)_3(CF_2)_6F$ | S |
| I-19 | $OCH_2(CF_2)_6H$ | $OCH_2(CF_2)_6H$ | S |
| I-20 | $O(CH_2)_2O(CH_2)_2(CF_2)_6F$ | $O(CH_2)_2O(CH_2)_2(CF_2)_6F$ | S |
| I-21 | $O(CH_2)_3S(CH_2)_2(CF_2)_6F$ | $O(CH_2)_3S(CH_2)_2(CF_2)_6F$ | S |
| I-22 | $O(CH_2)_2O(CH_2)(CF_2)_6H$ | $O(CH_2)_2O(CH_2)(CF_2)_6H$ | S |

Next, (2) the fluoro-aliphatic group-containing copolymer comprising at least one selected from the group consisting of polymerization units of fluoro-aliphatic group-containing monomers represented by formula (IV) or (V) and polymerization units of amide group-containing monomers represented by formula (VI) is explained.

Formula (IV)

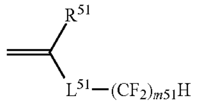

In formula (IV), $R^{51}$ represents a hydrogen atom, a halogen atom, or a methyl group; $L^{51}$ represents a divalent linking group; and m51 represents an integer of 1 to 18.

Formula (V)

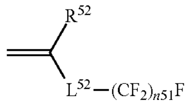

In formula (V), $R^{52}$ represents a hydrogen atom, a halogen atom, or a methyl group; $L^{52}$ represents a divalent linking group; and n51 represents an integer of 1 to 18.

Formula (VI)

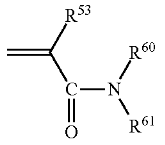

In formula (VI), $R^{53}$ represents a hydrogen atom, a halogen atom, or a methyl group; $R^{60}$ and $R^{61}$ each independently represent a hydrogen atom, an alkyl group having 1 to 18 carbon atoms, an aromatic group having 6 to 20 carbon atoms, or a heterocyclic group having 1 to 20 carbon atoms; and $R^{60}$ and $R^{61}$ may be bonded with each other to form a heterocyclic group.

In formula (IV), $R^{51}$ represents a hydrogen atom, a halogen atom, or a methyl group; $R^{51}$ is preferably a hydrogen atom or a methyl group. $L^{51}$ represents a divalent linking group. m51 represents an integer of 1 to 18. m51 is preferably an integer of 2 to 12, more preferably 4 to 8, and most preferably 4 or 6.

In formula (V), $R^{52}$ represents a hydrogen atom, a halogen atom, or a methyl group. $R^{52}$ is preferably a hydrogen atom or a methyl group. $L^{52}$ represents a divalent linking group. n51 represents an integer of 1 to 18. n51 is preferably an integer of 2 to 12, more preferably 4 to 8, and most preferably 4 or 6.

Although $L^{51}$ and $L^{52}$ are not restricted as far as they each independently represent a divalent substituent, it is preferable that they have a structure represented by formula (VII). In formula (VII), (a) illustrates a bonding position at the double bond side, and (b) illustrate a bonding position at the fluoro-aliphatic group side respectively.

$$(a)\text{-}X^{10}\text{—}R^{20}\text{-}(b) \qquad \text{Formula (VII)}$$

In formula (VII), $X^{10}$ represents a single bond or a divalent linking group expressed by *—COO—**, *—COS—**, *—OCO—**, *—CON($R^{21}$)—**, or *—O—**. Herein, * illustrates a bonding position the double bond side, and ** illustrates a bonding position at $R^{20}$.

$R^{20}$ represents a polymethylene group (for example, a methylene group, an ethylene group, or a trimethylene group) which may have a substituent, a phenylene group (for example, o-phenylene group, m-phenylene group, or p-phenylene group) which may have a substituent, and a group which can be arbitrarily formed by combination of those.

Among those, a polymethylene group is more preferable; a methylene group, an ethylene group, a trimethylene group, and a tetramethylene group are preferable among polymethylene groups, and a methylene group and an ethylene group are further preferable.

$R^{21}$ represents a hydrogen atom, a substituted or unsubstituted alkyl group having 1 to 8 carbon atoms, or a substituted or unsubstituted aryl group having 6 to 20 carbon atoms. $R^{21}$ is preferably a hydrogen atom or an alkyl group having 1 to 6 carbon atoms, more preferably a hydrogen atom or an alkyl group having 1 to 4 carbon atoms.

The fluoro-aliphatic group-containing monomer represented by formula (IV) is more preferably a monomer represented by formula (VIII).

Formula (VIII)

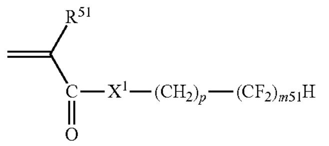

In formula (VIII), $X^1$ represents a divalent linking group selected from —O—, —S— and —N($R^{222}$)—. p represents an integer of 1 to 8. $X^1$ is preferably —O— or —N($R^{222}$)—, most preferably —O—, p is preferably an integer of 1 to 6, more preferably an integer of 1 to 3. $R^{51}$ and m51 have the same meanings as those in formula (IV), and the preferable ranges thereof are also the same as those in formula (IV). $R^{222}$ represents a hydrogen atom, a substituted or unsubstituted alkyl group having 1 to 8 carbon atoms, or a substituted or unsubstituted aryl group having 6 to 20 carbon atoms.

The fluoro-aliphatic group-containing monomer represented by formula (V) is more preferably a monomer represented by formula (IX).

Formula (IX)

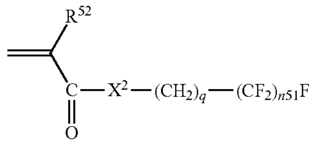

In formula (IX), $X^2$ represents a divalent linking group selected from —O—, —S— and —N($R^{222}$)—. q represents an integer of 1 to 8. $X^2$ is preferably —O— or —N($R^{222}$)—, most preferably —O—, q is preferably an integer of 1 to 6, more preferably an integer of 1 to 3. $R^{52}$ and n51 have the same meanings as those in formula (V), and the preferable ranges thereof are also the same as those in formula (V). $R^{222}$ has the same meaning as that in formula (VIII).

Next, the polymerization unit of the amide group-containing monomer represented by formula (VI) is explained.

In formula (VI), $R^{53}$ represents a hydrogen atom, a halogen atom, or a methyl group. $R^{53}$ is preferably a hydrogen atom or a methyl group. $R^{60}$ and $R^{61}$ each independently represent a hydrogen atom, an alkyl group having 1 to 18 carbon atoms, an aromatic group having 6 to 20 carbon atoms, or a heterocyclic group having 1 to 20 carbon atoms. These substituents may have a substituent. $R^{60}$ and $R^{61}$ each are preferably an alkyl group having 1 to 12 carbon atoms or an aromatic group having 6 to 15 carbon atoms; and further preferably an alkyl group having 1 to 6 carbon atoms or an aromatic group having 6 to 12 carbon atoms. $R^{60}$ and $R^{61}$ may be bonded with each other to form a heterocyclic group. Examples of the heterocycle to be formed include a pyrrolidine ring, a piperidine ring, and a morpholine ring.

The fluoro-aliphatic group-containing copolymer that is used as the horizontally orientating agent includes a fluoro-aliphatic group-containing monomer and an amide group-containing monomer, respectively, as a polymerization unit. Two or more kinds of each of the monomers may be contained as the polymerization units in the polymer. The polymer may be a copolymer containing one or more kinds of other copolymerizable monomer as a polymerization unit. For such other copolymerizable monomer, those described in J. Brandrup, Polymer Handbook 2nd ed., Chapter 2, pp. 1-483, Wiley Interscience (1975), can be used. Examples thereof include compounds having at least one addition-polymerizable unsaturated bond selected from acrylates, methacrylates, (meth)acrylamides, allyl compounds, vinyl ethers, vinyl esters, and the like.

The mass average molecular weight of the fluoro-aliphatic group-containing copolymer that is used as the horizontally orientating agent is preferably from 2,000 to 100,000, more preferably from 3,000 to 80,000, further preferably from 4,000 to 60,000. The mass average molecular weight as used herein means a molecular weight determined by differential refractometer detection with a solvent THF in a GPC analyzer using a column, "TSKgel GMHxL", "TSKgel G4000HxL" or "TSKgel G2000HxL" (trade names, manufactured by Tosoh Corp.), and expressed in terms of polystyrene.

Specific examples of the structure of the fluoro-aliphatic group-containing copolymer that can be used in the present invention as the horizontally orientating agent are shown below, however, the present invention is not limited thereto. In formulae, the numerical value indicates the molar ratio of each monomer component and Mw indicates mass average molecular weight.

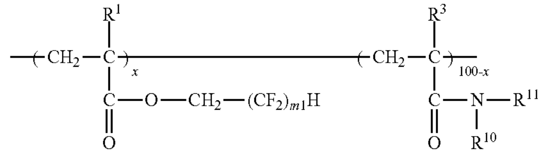

| | $m^1$ | $R^1$ | $R^3$ | $R^{11}$ | $R^{10}$ | x | Mw |
|---|---|---|---|---|---|---|---|
| P-1 | 4 | $CH_3$ | H | $CH_3$ | $CH_3$ | 60 | $1.9 \times 10^4$ |
| P-2 | 4 | H | H | $CH_3$ | $CH_3$ | 80 | $1.4 \times 10^4$ |
| P-3 | 6 | H | H | $CH_3$ | $CH_3$ | 70 | $2.8 \times 10^4$ |
| P-4 | 6 | H | H | $CH_3$ | $CH_3$ | 80 | $1.6 \times 10^4$ |
| P-5 | 6 | H | H | $CH_3$ | $CH_3$ | 90 | $1.8 \times 10^4$ |
| P-6 | 8 | H | H | $CH_3$ | $CH_3$ | 75 | $8.2 \times 10^3$ |
| P-7 | 8 | H | H | $CH_3$ | $CH_3$ | 95 | $4.6 \times 10^4$ |
| P-8 | 6 | H | H | $C_2H_5$ | $C_2H_5$ | 85 | $1.5 \times 10^4$ |
| P-9 | 6 | $CH_3$ | $CH_3$ | $C_4H_9$ (n) | $C_4H_9$ (n) | 80 | $1.9 \times 10^4$ |
| P-10 | 6 | H | H | $CH_2CH_3OCH_3$ | $CH_2CH_2OCH_3$ | 90 | $1.2 \times 10^4$ |

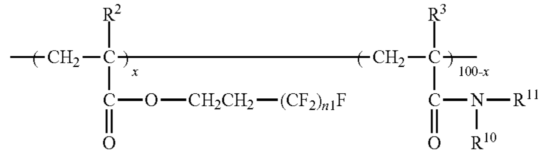

| | $n^1$ | $R^2$ | $R^3$ | $R^{11}$ | $R^{10}$ | x | Mw |
|---|---|---|---|---|---|---|---|
| P-11 | 4 | $CH_3$ | H | $CH_3$ | $CH_3$ | 55 | $8.8 \times 10^3$ |
| P-12 | 4 | H | H | $CH_3$ | $CH_3$ | 40 | $1.3 \times 10^4$ |
| P-13 | 6 | H | H | $CH_3$ | $CH_3$ | 40 | $1.7 \times 10^4$ |
| P-14 | 6 | H | H | $CH_3$ | $CH_3$ | 35 | $2.1 \times 10^4$ |
| P-15 | 6 | H | H | $CH_3$ | $CH_3$ | 45 | $9.0 \times 10^3$ |

-continued

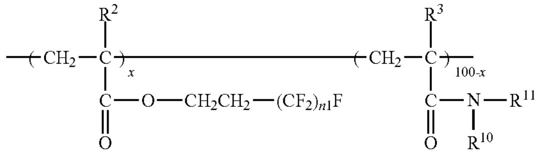

| | $n^1$ | $R^2$ | $R^3$ | $R^{11}$ | $R^{10}$ | x | Mw |
|---|---|---|---|---|---|---|---|
| P-16 | 8 | H | H | $CH_3$ | $CH_3$ | 30 | $1.5 \times 10^4$ |
| P-17 | 6 | H | H | $C_2H_5$ | $C_2H_5$ | 40 | $1.5 \times 10^4$ |
| P-18 | 6 | $CH_3$ | $CH_3$ | $C_4H_9$ (n) | $C_4H_9$ (n) | 40 | $1.9 \times 10^4$ |
| P-19 | 6 | H | H | $CH_2CH_2OCH_3$ | $CH_2CH_2OCH_3$ | 40 | $1.2 \times 10^4$ |
| P-20 | 6 | H | H | $CH_2CH_2OH$ | $CH_2CH_2OH$ | 40 | $1.1 \times 10^4$ |

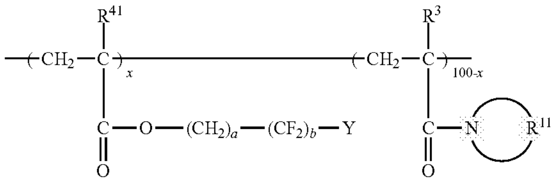

| | a | b | Y | $R^{41}$ | $R^3$ | $R^{11}$ | x | Mw |
|---|---|---|---|---|---|---|---|---|
| P-21 | 1 | 4 | H | H | $CH_3$ | $(CH_2)_4$ | 80 | $1.5 \times 10^4$ |
| P-22 | 1 | 6 | H | H | H | $(CH_2)_5$ | 85 | $1.3 \times 10^4$ |
| P-23 | 1 | 6 | H | H | H | $(CH_2)_2O(CH_2)_2$ | 80 | $1.8 \times 10^4$ |
| P-24 | 2 | 4 | F | H | $CH_3$ | $(CH_2)_4$ | 45 | $1.2 \times 10^4$ |
| P-25 | 2 | 6 | F | H | H | $(CH_2)_5$ | 36 | $1.5 \times 10^4$ |
| P-26 | 2 | 6 | F | H | H | $(CH_2)_2O(CH_2)_2$ | 40 | $2.3 \times 10^4$ |
| P-27 | 3 | 6 | F | H | H | $(CH_2)_5$ | 40 | $1.7 \times 10^4$ |
| P-28 | 6 | 6 | F | $CH_3$ | $CH_3$ | $(CH_2)_2O(CH_2)_2$ | 40 | $1.9 \times 10^4$ |

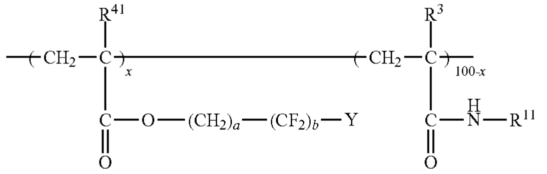

| | a | b | Y | $R^{41}$ | $R^3$ | $R^{11}$ | x | Mw |
|---|---|---|---|---|---|---|---|---|
| P-29 | 1 | 4 | H | H | $CH_3$ | $C_8H_{13}$ (n) | 90 | $2.0 \times 10^4$ |
| P-30 | 1 | 6 | H | H | H | $CH(CH_3)_2$ | 85 | $1.3 \times 10^4$ |
| P-31 | 1 | 6 | H | H | H | $CH_2CH_2Ph$ | 80 | $1.8 \times 10^4$ |
| P-32 | 2 | 4 | F | H | $CH_3$ | $C_4H_9$ (n) | 45 | $2.7 \times 10^4$ |
| P-33 | 2 | 6 | F | H | H | $CH(CH_3)_2$ | 40 | $1.8 \times 10^4$ |
| P-34 | 2 | 6 | F | H | H | $C(CH_3)_3CH_2COCH_3$ | 35 | $1.8 \times 10^4$ |

-continued

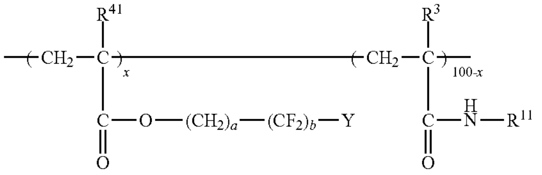

| | a | b | Y | $R^{41}$ | $R^3$ | $R^{11}$ | x | Mw |
|---|---|---|---|---|---|---|---|---|
| P-35 | 3 | 6 | F | H | H | $CH_2OC_4H_9$ (n) | 40 | $1.7 \times 10^4$ |
| P-36 | 6 | 6 | F | $CH_3$ | $CH_3$ | $C_4H_9$ (t) | 45 | $1.9 \times 10^4$ |

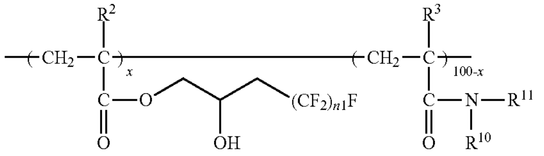

| | $n^1$ | $R^2$ | $R^3$ | $R^{11}$ | $R^{10}$ | x | Mw |
|---|---|---|---|---|---|---|---|
| P-37 | 4 | H | H | $CH_3$ | $CH_3$ | 45 | $1.1 \times 10^4$ |
| P-38 | 4 | H | H | H | $CH(CH_3)_2$ | 40 | $1.3 \times 10^4$ |
| P-39 | 6 | H | H | $CH_3$ | $CH_3$ | 40 | $1.8 \times 10^4$ |
| P-40 | 6 | $CH_3$ | H | $CH_3$ | $CH_3$ | 35 | $2.7 \times 10^4$ |
| P-41 | 6 | H | H | H | $CH(CH_3)_2$ | 40 | $1.4 \times 10^4$ |
| P-42 | 6 | H | H | H | $C(CH_3)_2CH_2COCH_3$ | 40 | $1.9 \times 10^4$ |
| P-43 | 6 | H | H | | $(CH_2)_2O(CH_2)_2$ | 40 | $1.7 \times 10^4$ |
| P-44 | 6 | $CH_3$ | $CH_3$ | | $(CH_2)_5$ | 45 | $1.8 \times 10^4$ |

Note)
P-43 and P-44 are examples, in which $R^{10}$ and $R^{11}$ are bonded to each other to form a ring.

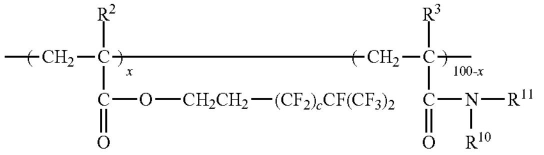

| | c | $R^2$ | $R^3$ | $R^{11}$ | $R^{10}$ | x | Mw |
|---|---|---|---|---|---|---|---|
| P-45 | 4 | H | H | $CH_3$ | $CH_3$ | 45 | $3.3 \times 10^4$ |
| P-46 | 4 | H | H | H | $CH(CH_3)_2$ | 40 | $1.5 \times 10^4$ |
| P-47 | 6 | H | H | $CH_3$ | $CH_3$ | 40 | $1.6 \times 10^4$ |
| P-48 | 6 | $CH_3$ | H | H | $CH(CH_3)_2$ | 40 | $2.4 \times 10^4$ |
| P-49 | 6 | H | H | | $(CH_3)_2O(CH_2)_2$ | 40 | $1.7 \times 10^4$ |

Note)
P-49 is an example, in which $R^{10}$ and $R^{11}$ are bonded to each other to form a ring.

| | Structure | Mw |
|---|---|---|
| P-50 | 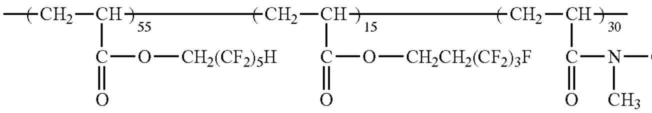 | $1.7 \times 10^4$ |
| P-51 | 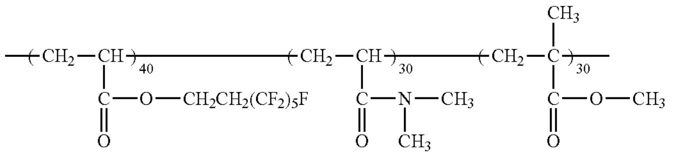 | $2.0 \times 10^4$ |

-continued

| | Structure | Mw |
|---|---|---|
| P-52 | 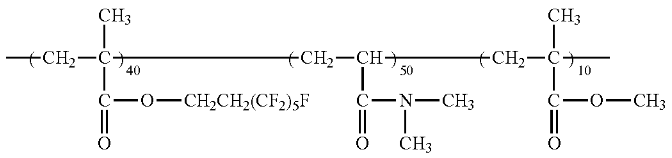 | $2.5 \times 10^4$ |

Alternatively, horizontally orientating agents described in JP-A-2005-99248, JP-A-2005-134884, JP-A-2006-126768 and JP-A-2006-267183 may be selected.

In the present invention, the horizontally orientating agents may be used by singly or in the combination of two or more kinds thereof. The addition amount of the horizontally orientating agent in the dichroic dye composition is preferably from 0.1 mass % to 10 mass %, more preferably from 0.5 mass % to 10 mass %, and particularly preferably from 0.5 mass % to 5 mass %, relative to the addition amount of the nematic liquid crystalline azo dye.

Saccharides:

Saccharides may be added into the dichroic dye composition used in the present invention. The addition of the saccharides can enhance the association degree of a dye association, and elevate a molecular orientation of the dye as a result.

Examples of the usable saccharides include monosaccharides, disaccharides, polysaccharides, and the derivatives of saccharides such as sugar alcohol. For the purpose of revealing the effect of the present invention, it is preferable that the number of hydroxy groups in the saccharides is generally 2 or more, preferably 3 or more and 18 or less, further preferably 12 or less, from the viewpoint of the molecular association property. When the hydroxy group is too many, it is not preferable because mutual action with the dye is so strong that the saccharides precipitate and the orientation of the dye film is deteriorated. When the hydroxy group is too few, it is also not preferable because the mutual action with the dyes is not enough to improve the orientation property.

The molecular weight of the saccharides to be used is preferably 1,000 or less, and more preferably 700 or less. When the molecular weight of the saccharides is too large, a phase separation from the dye may occur, and it is not preferable because there is a fear of deteriorating the orientation property of the dye film.

The number of carbon atoms in the saccharides to be used is generally 36 or less and preferably 24 or less. When the number of carbon atoms in the saccharides is too large, the molecular weight of the saccharides becomes large and the phase separation from the azo dye may occur and it is not preferable because there is a fear of deteriorating the orientation property of the dye film.

Among the saccharides used in the present invention, monosaccharides, oligosaccharides, and monosaccharide alcohol are preferable because they satisfy the above-mentioned optimum number of hydroxy groups and the optimum range of the molecular weight.

Examples of the monosaccharide include xylose, ribose, glucose, fructose, mannose, sorbose, and galactose.

Examples of the oligosaccharide include trehalose, kojibiose, nigerose, maltose, maltotriose, isomaltotriose, maltotetraose, isomaltose, sophorose, laminaribiose, cellobiose, gentiobiose, lactose, sucrose, melibiose, rutinose, primeverose, turanose, panose, isopanose, cellotriose, mannotriose, solatriose, melezitose, planteose, gentianose, umbelliferose, raffinose, and stachyose.

Examples of the sugar alcohol include compounds made by reducing the above-mentioned monosaccharides or oligosaccharides such as threitol, xylitol, ribitol, arabinitol, sorbitol, and mannitol.

Particularly preferable saccharides are xylose, mannose, maltose, maltotriose, and arabinitol.

There are optical isomers, respectively, in these saccharides and sugar alcohols. However, each of the optical isomers may be used singly in the composition of the present invention; or both of the isomers may be contained into the composition of the present invention. Further, only one kind of saccharide may be used in the composition of the present invention, or two or more kinds of saccharides may be used in combination.

It is preferable that the content of the saccharides in the composition of the present invention, to said at least one liquid crystalline azo dye, is within the range from 0.1 to 1 in mass ratio. The lower limit of the above content is more preferably 0.2, further preferably 0.3. The upper limit is more preferably 0.7, further preferably 0.6. When the content of the saccharide is within the range, the association degree of a dye association can be increased without decreasing the orientation degree of the association.

Antifungal Agent, Antibacterial Agent and Sterilizer:

A chemical agent having at least any of the functions among antifungal activity, antibacterial activity, and sterilization activity may be added into the dichroic dye composition used in the present invention. An addition of these additives enables to improve a storage stability of the composition.

In the present specification, the term "chemical agent having at least any of the function among the antifungal activity, the antibacterial activity, and the sterilization activity" means one having at least any of antifungal capability of suppressing development/growth/breeding of mold, sterilization capability of causing extinct of microorganism, and antibacterial capability of suppressing development/growth/breeding of microorganism. Ordinary antifungal agents, bactericides, and antibacterial agents can be used. However, it is preferable that they do not deteriorate optical performance of the polarizer prepared by using the composition. Examples of the chemical agent having at least any of the function among antifungal activity, antibacterial activity, and sterilization activity that can be used in the present invention include phenolic series such as conventional 2,4,4'-trichloro-2'-hydroxydiphenyl, chloride series such as chlorine dioxide, iodine series such as iodine, and quaternary ammonium salt series such as benzalkonium chloride.

Further, the examples include Proxel BDN, Proxel BD20, Proxel GXL, Proxel LV, Proxel XL, Proxel XL2 and Proxel Ultra10 (manufactured by Avecia Ltd., trade names) as the chemical agent containing, as an effective component, 1,2-benzisothiazoline-3-one; Proxel IB (manufactured by Avecia Ltd, trade name) as the chemical agent containing, as an effective component, polyhexametylene biguanide hydrochloride; and Densil P (manufactured by Avecia Ltd, trade name) as the chemical agent containing, as an effective component, dithio-2,2'-bis(benzmethylamide).

Also, the following compounds are more preferable because they have an antibacterial effect even in a very small amount.

| No. | Name of the Compound |
|---|---|
| 1. | 2-chloromethyl-5-chloro-3-isothiazolon |
| 2. | 2-cyanomethyl-5-chloro-3-isothiazolon |
| 3. | 2-hydroxymethyl-5-chloro-3-isothiazolon |
| 4. | 2-(3-methylcyclohexyl)-3-isothiazolon |
| 5. | 2-(4-chlorophenyl)-4,5-dichloro-3-isothiazolon |
| 6. | 2-(4-ethylphenyl)-3-isothiazolon |
| 7. | 2-(4-nitrophenyl)-5-chloro-3-isothiazolon |
| 8. | 2-chloromethyl-3-isothiazolon |
| 9. | 2-methoxyphenyl-4-methyl-5-chloro-3-isothiazolon |
| 10. | 2-morpholinomethyl-5-chloro-3-isothiazolon |

Those compounds can be synthesized with reference to, for example, JP-A-2-278. Alternatively, commercially available marketing products such as Tribactran (trade name; manufactured by Hoechst AG) are also utilizable.

In addition, the chemical agent having at least any of the function among the antifungal activity, antibacterial activity, and sterilization activity that can be used in the present invention may be used singly, or in combination of two or more kinds thereof.

Although the content of the chemical agent having at least any of the function among the antifungal activity, the antibacterial activity, and the sterilization activity contained in the composition is not particularly limited, it is generally 0.01 mass % or more, preferably 0.001 mass % or more and on the other hand, generally 0.5 mass % or less and preferably 0.3 mass % or less. When the content of the chemical agent having at least any of the function among the antifungal activity, the antibacterial activity, and the sterilization activity is within the range, sufficient antifungal, antibacterial, or sterilization effect can be obtained without causing precipitation of the chemical agent, phase separation during film formation and the like.

Electron-Deficient Disc-Shape Compound and Electron-Rich Compound:

Because a polarizer obtained by the method of the present invention has high degree of polarization, it is preferable that the composition contains Electron-Deficient disc-shape compound and Electron-Rich compound. For example, compounds described in JP-A-2006-323377 are usable as the Electron-Deficient disc shape compound and Electron-Rich compound.

When the total mass of the composition is settled to be 100 mass parts, the ratio of the Electron-Deficient disc-shape compound in the composition is generally 0.1 mass parts or more, preferably 0.2 mass parts or more, generally 50 mass parts or less, and preferably 40 mass parts or less. When the ratio of the compound is within this range, addition effect can be obtained without excessively increasing the viscosity of the composition as a solution.

When the total mass of the composition is settled to be 100 mass parts, the ratio of the Electron-rich compound in the composition is generally 50 mass parts or less, preferably 40 mass parts or less. When the ratio of the compound is within this range, addition effect can be obtained without excessively increasing the viscosity of the composition as a solution.

Solvent:

It is preferable that the dichroic dye composition is prepared as a coating liquid. The solvent which is used for preparing the coating liquid is desirably selected from organic solvents. Examples of the usable organic solvent include amides such as N,N-dimethylformamide, sulfoxides such as dimethylsulfoxide, heterocyclic compounds such as pyridine, hydrocarbons such as benzene, toluene, or hexane, alkyl halides such as chloroform or dichloromethane, esters such as methyl acetate or butyl acetate, ketones such as acetone or methyl ethyl ketone, and ethers such as tetrahydrofuran or 1,2-dimethoxyethane. Among these, hydrocarbon, alkyl halides, or ketones are preferred. Plural kinds of the organic solvents may be used in combination.

The method of preparing the coating liquid of the dichroic dye composition is not particularly limited. The coating liquid is prepared by dissolving one or more kinds of the nematic liquid crystalline azo dyes, and one or more kinds of the additives (for example, surfactant and horizontally orientating agent) that are added as necessary, in a solvent. The coating liquid may be in a state in which the components is completely dissolved, the components is dispersed, or the like.

It is preferable that the composition is prepared as a coating liquid having a concentration of the total solid matters of approximately 0.1 to 20 mass %, more preferably approximately 0.1 to 10 mass %, further preferably approximately 0.5 to 5 mass %. When a coating liquid is prepared as one having the concentration in this range, a polarization layer can be stably formed by the wet film-forming method.

(Formation of Light Absorption Anisotropic Film)

In the present invention, the coating liquid composed of the dichroic dye composition is coated on the surface of an alignment film to form a light absorption anisotropic film in a wet state, and the anisotropic film is subjected to a drying treatment to evaporate the organic solvent, whereby the final novel light absorption anisotropic film of the present invention can be formed. Accordingly, a light absorption anisotropic film having a high dichroic ratio that is characterized by a specific sharp diffraction peak can be constituted.

One of the applications of the light absorption anisotropic film is a polarizing element having an alignment film and the light absorption anisotropic film, and the polarizing element can be prepared by a method containing (1) a step of rubbing a substrate directly or an alignment film formed on the substrate, or irradiating the substrate or the alignment film with light, (2) a step of coating a dichroic dye composition on the substrate or the alignment film, and (3) a step of aligning the dichroic dye composition to give a polarizing element.

Each of the steps (1) to (3) is explained in this order.

(1) Aligning Treatment Step (Step of Rubbing a Substrate Directly or an Alignment Film Formed on the Substrate, or Irradiating the Substrate or the Alignment Film with Light)

The substrate described below is directly rubbed, or an alignment film formed on the substrate is rubbed or irradiated with anisotropic light. As described below, the rubbing treatment means an operation for performing alignment treatment in which the surface of the substrate or the like is rubbed with a buff such as cotton cloth or absorbent cotton in a fixed direction to form microgrooves parallel to that direction, and then a dichroic dye is applied to finally allow the dye to adsorb to the surface in an aligned state. The anisotropic light means polarized lights such as linear polarized light and elliptic polarized light, and non-polarized light that is irradiated on a coating surface in an oblique direction, and when the alignment film containing the photoactive compound mentioned below is irradiated with the polarized light, liquid crystal alignment ability is generated in a fixed direction, and by applying a dichroic dye thereon, the dye can be finally adsorbed on the surface in the alignment state.

[Substrate]

The substrate used in the present invention may be transparent, or may be a substrate opacified by coloring or the like, and can be selected according to the usage of a polarizer. Examples thereof include alkali-free glass, soda glass, Pyrex (registered trademark) glass and quartz glass that are used for liquid crystal display elements, OLED elements and the like; photoelectric conversion element substrates that are used for solid state image sensors; silicon substrates; plastic substrates; and substrates obtained by forming function layers such as a transparent electroconductive film, a color filter film, an electrode and TFT on these substrates. On these substrates, black matrices that isolate each pixels may be formed, or a transparent resin layer may be provided so as to accelerate adhesion and the like.

In order to improve coating property and adhesion property of the composition for an alignment film, these substrates may be subjected to a surface treatment. Examples of the surface treatment may include an ozone treatment, a plasma treatment and the like. Further, in order to adjust the transmittance and reflectance of light, an organic thin film, an inorganic oxide thin film, a metal thin film or the like may be provided with the surface of the substrate by a method such as deposition.

It is also preferable that a plastic substrate has a gas barrier layer and/or a solvent-resistant layer on its surface.

The substrate to be used for the present invention is preferably transparent support and preferably has a light transmission of 80% or more. The support is preferably selected from glasses or films formed of optically isotropic polymers. Examples of such polymers or preferred embodiments of the support are same as those described in paragraph No. [0013] in JP-A-2002-22942. The films formed of the polymers, which are commonly known as easy to develop birefringence, such as polycarbonates or polysulfones, may be also used after being modified by the process described in WO00/26705 thereby to reduce the development of birefringence.

As a polymer film, a cellulose acetate having an acetylation rate from 55.0% to 62.5% is preferably used, particularly preferably from 57.0% to 62.0%. The preferred scope of acetylation rates and the preferred chemical structures of cellulose acetates are same as those described in paragraph No. [0021] in JP-A-2002-196146. Cellulose acylate films produced by using chlorine-free solvents are described in detail in Journal of Technical Disclosure (Hatsumei Kyoukai Koukai Gihou) No. 2001-1745, published by Japan Institute of Invention and Innovation, and the cellulose acylate films described therein can be preferably employed in the present invention.

The preferred scopes of the depth-retardation value and the birefringence value of the cellulose acylate film to be used as a transparent support are described in paragraph Nos. [0018] to [0019] in JP-A-2002-139621.

In order to control the retardation of a polymer film used as the transparent support, especially a cellulose acylate film, aromatic compounds having at least two aromatic rings may be used as an agent for increasing retardation. The preferred scope and the preferred amount of the aromatic compound are same as those described in paragraph Nos. [0021] to [0023] in JP-A-2002-139621. Examples of such an agent for increasing retardation are described in WO01/88574A1, WO00/2619A1, JP-A-2000-111914, JP-A-2000-275434, JP-A-2002-363343 or the like.

The cellulose acylate film, produced by a solvent-casting method using a cellulose acylate solution (dope), is preferably used. The dope may further contain the agent for increasing retardation, and such a dope is preferred. Multilayered films can be produced by using the prepared cellulose acylate solution (dope). The production of the films can be carried out according to the descriptions in paragraph Nos. [0038] to [0040] in JP-A-2002-139621.

Stretching treatment of the cellulose acetate film may be carried out in order to control its retardations. The stretch ratio is preferably within the name from 3% to 100%. The cellulose acetate film is preferably stretched by tenter. For controlling the slow axis of the film to high accuracy, the deference in velocities, departure times and the like between of the left and right tenter clips are preferably as small as possible.

Plasticizes may be added to the cellulose ester films in order to improve the mechanical properties of the films and the drying speed. Examples of the plasticizer and the preferred scope of the plasticizers are same as those described in paragraph No. [0043] in JP-A-2002-139621.

Anti-degradation agents such as antioxidants, decomposers of peroxides, inhibitors of radicals, in-activators of metals, trapping agents of acids or amines, and UV ray protective agents, may be added to the cellulose acetate film. The anti-degradation agents are described in paragraph No. [0044] in JP-A-2002-139621. The particularly preferred example of the anti-degradation agent is butylated hydroxy toluene (BHT). The UV ray protective agents are described in JP-A-7-11056.

Surface treatment or measurement of solid-surface energy for the cellulose acylate film can be carried out according to the descriptions in paragraph Nos. [0051] to [0052] in JP-A-2002-196146.

The thickness of the cellulose acylate film may vary depending on the application of the film, and, in general, the thickness of the film is preferably from 5 to 500 μm, more preferably from 20 to 250 μm and most preferably from 30 to 180 μm. Especially, for being used in optical applications, the thickness of the cellulose acylate film is preferably from 30 to 110 μm.

[Alignment Film]

The alignment film which is formed on the above support may be any layer insofar as it can provide desired alignment to the dichroic dye of the light absorption anisotropic layer provided on the alignment film. There can be provided the alignment film formed of various materials by various methods such as subjecting a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film). Alignment films having an alignment effect under an electric or magnetic field or irradiation with anisotropic light are also known.

In the present invention, an alignment film formed by a rubbing treatment of a polymer and an alignment film formed by irradiation with anisotropic light are particularly preferable.

The thickness of the alignment film is preferably from 0.01 to 10 μm, and more preferably from 0.05 to 1 μm.

[Rubbing-Aligned Film]

The rubbing treatment can generally be performed by rubbing the surface of the polymer layer in a fixed direction several times with a paper or a cloth. And it is especially preferred that the rubbing treatment is carried out according to the method described in "Handbook of liquid Crystal (Ekisyo Binran)" published by MARUZEN CO., Ltd.

Various types of polymers which can be used for alignment films are described in various documents, and various polymers are commercially available. In the present invention, alignment films formed of polyvinyl alcohols or derivatives thereof are preferably used. Especially, alignment films formed of modified polyvinyl alcohols bonded with hydrophobic groups are preferable. Regarding various matters of the alignment film, it is possible to refer to the descriptions from line 24 of p. 43 to line 8 of p. 49 in WO01/88574A1.

[Rubbing-Density of Alignment Film]

It is possible to vary a rubbing-density of an alignment film by a method described in "Handbook of liquid Crystal (Ekisyo Binran)" published by MARUIZEN CO., Ltd. A rubbing-density (L) is quantified by a formula (A) below.

$$L=N1\{1+(2\pi rn/60v)\}\quad \text{Formula (A)}$$

In formula (A), N is a number of rubbing; 1 is a contact length of a rubbing-roller; r is a roller-radius; n is revolutions per minute (rpm); and v is moving velocity (per second).

The rubbing-density may be increased by increasing the number of rubbing, lengthening the contact length of the rubbing roller, increasing radius of the roller, increasing revolutions per minute of the roller and/or decreasing moving velocity. On the other hand, the rubbing-density may be decreased by doing the reverse thereof.

There is a relationship between a rubbing-density and a pre-tilt angle of the alignment film that the pre-tilt angle is decreased as the rubbing-density is higher, and the pre-tilt angle is increased as the rubbing-density is lower.

[Photoalignment Film]

The composition for a photoalignment film for forming a photoalignment film used in the present invention is a composition that generates liquid crystal alignment ability by irradiation with light, and the composition contains a photoactive compound. Hereinafter, various components that are used for the preparation of the composition for a photoalignment film are explained.

Photoactive Compound:

In the present specification, the term "photoactive compound" means a compound having a photoactive group that anisotropically causes a photoreaction such as photocrosslinking, photoisomerization or photodegradation by irradiation with anisotropic light.

There are many descriptions as to photoactive compound. Specific examples of the photoactive compounds include azo compounds described in JP-A-2006-285197, JP-A-2007-138138, JP-A-2007-94071, JP-A-2007-121721, JP-A-2007-140465, JP-A-2007-156439, JP-A-2007-133184, JP-A-2009-109831, Japanese Patent No. 3883848 and Japanese Patent No. 4151746; aromatic ester compounds described in JP-A-2002-229039; maleimide- and/or alkenyl-substituted nadiimide compound having a photo-alignment unit as described in JP-A-2002-265541 and JP-A-2002-317013; photo-crosslinking silane derivatives described in Japanese Patent No. 4205195 and Japanese Patent No. 4205198; and photo-crosslinking polyimides, polyamides or esters described in JP-T-2003-520878, JP-T-2004-529220 and Japanese Patent No. 4162850. More preferable examples include azo compounds, photo-crosslinking polyimide, polyamides, and esters; and particularly preferable examples include azo compounds.

The composition for forming a photoalignment film preferably contains the photoactive compound as a main component. More specifically, the ratio of the composition for forming a photoalignment film based on the total solid matters excluding a solvent is preferably 50 mass % or more, particularly preferably 70 mass % or more from the viewpoint of the retention of alignment to an azo dye. The upper limit value is 100 mass %, i.e., the total solid matters excluding a solvent of the composition for forming a photoalignment film may be entirely the photoactive compound.

The composition for forming a photoalignment film may contain one or more kinds of other additives other than the photoactive compound. For example, the additives are added for the purpose of uniformly coating the composition to give a photoalignment film having a uniform film thickness. Examples of the additives may include a leveling agent, a thixotropic agent, a surfactant, an ultraviolet absorbent, an infrared ray absorbent, an antioxidant, a surface treating agent and the like, and they can be added to the extent that the alignment ability of the nematic liquid crystalline azo dye that is used in combination is not significantly decreased.

It is preferable that the composition for forming a photoalignment film is prepared as a coating liquid. Although the solvent used for the preparation of the coating liquid is not particularly limited, a solvent in which the photoactive compound is dissolved is generally used. Examples thereof include alcohol-based solvents such as methanol and ethanol, diol-based solvents such as ethylene glycol, propylene glycol and 1,3-butanediol, ether-based solvents such as tetrahydrofuran, 2-methoxyethanol, 2-butoxyethanol, 2-(2-ethoxyethoxy)ethanol and 2-(2-butoxyethoxy)ethanol, amide-based solvents such as 2-pyrrolidone, N-methylpyrrolidone, dimethylformamide and dimethylacetamide, γ-butyrolactone, chlorobenzene, dimethylsulfoxide, and the like. These may be used singly or as a mixture of two or more kinds thereof.

The composition is prepared as a coating liquid having a concentration of the total solid matters of, preferably 0.2 mass % or more, more preferably approximately 0.5 to 10 mass %.

[Formation of Photoalignment Film]

The composition for forming a photoalignment film prepared as a coating liquid is coated on the surface of the substrate to form a coated film. As the coating method, known conventionally-used methods such as a spin coating method, a gravure printing method, a flexographic method, an inkjet method, a die-coating method, a cap-coating method, dipping and the like can be carried out. Since a solution dilited with an organic solvent is generally coated, the solution is dried after coating film to give a coating for a photoalignment film.

Next, the coated film for a photoalignment film is irradiated with light having anisotropy (hereinafter, abbreviated as a photoisomerization step) to generate liquid crystal alignment ability to give a photoalignment layer. The light having anisotropy used in the photoisomerization step includes polarized lights such as linear polarized light and elliptic polarized light. Alternatively, it may be non-polarized light and may be irradiated in an oblique direction relative to the coating surface.

Although the polarized light utilized for the photoisomerization step may be any of linear polarized light and elliptic polarized light, it is preferable to use linear polarized light having a high polarization degree so as to perform photoalignment efficiently. Further, linear polarized light can be obtained by passing light from a light source through a polarization filter, or a polarization prism such as a Glan-Thompson prism and a Glan-Taylor prism.

On the other hand, in an embodiment in which the film surface is irradiated with non-polarized light in an oblique direction against the surface of the film in the photoisomerization step, the incident angle of the non-polarized light is preferably within the range from 10° to 80° against the normal line of the substrate, and is more preferably within the range from 20° to 60°, most preferably 45°, from the viewpoint of uniformity of irradiation energy on the irradiated surface, an pretilt angle obtained, an alignment efficiency and the like.

The embodiment in which non-polarized light is irradiated in an oblique direction has advantages that a polarization filter and the like are not necessary for a light irradiation apparatus, a strong irradiation intensity can be obtained, and an irradiation time for photoalignment can be shorten.

It is preferable to adjust the wavelength of light to be irradiated to be within a wavelength region in which the photoactive group of the photoactive compound used has absorption. For example, in the case where the photoactive group has an azobenzene structure, ultraviolet rays having a wavelength within the range from 330 to 500 nm at which strong absorption due to $\pi \rightarrow \pi^*$ transition of the azobenzene is present is particularly preferable.

Examples of the light source for irradiation light include a xenon lamp, a high pressure mercury lamp, an ultra-high pressure mercury lamp, a metal halide lamp, UV lasers such as KrF and ArF, and the like. When the photoactive group is an azobenzene structure, an ultra-high pressure mercury lamp having a particularly large emitting intensity of UV rays at 365 nm can be effectively used.

Further, in the photoisomerization step, it is particularly preferable that light to be irradiated is approximately parallel light in the embodiment using either polarized light or non-polarized light. In addition, if a photomask is used when polarized light is irradiated, liquid crystal alignment ability can be generated on the photoalignment film in patterned forms in two or more different directions. Specifically, the composition for a photoalignment film is coated and dried, thereafter the substrate is covered with a photomask and the whole surface is irradiated with polarized light or non-polarized light to provide the exposed part with the liquid crystal alignment ability in patterned forms. By repeating the operations plural times, liquid crystal alignment ability can be generated in plural directions.

Further, the photoalignment film can be cooled after the photoisomerization step. The cooling method may be any one as long as the photoisomerized coated film for a photoalignment film is cooled, and the film is cooled together with the substrate in a known conventionally-used cooling apparatus such as a cold plate, a chamber, and a low-temperature thermostat.

The cooling condition is under a cooling temperature of 20° C. for 1 minute or more. However, when the cooling temperature is lower than 20° C., this does not apply. The cooling temperature may be at least the melting point of the solvent used, and is generally preferably within the range from −40° C. to 20° C. In order to obtain a more stable photoalignment film with improved liquid crystal alignment ability, the temperature is preferably 10° C. or less, and the cooling time is preferably 5 minutes or more. Further, in order to shorten the cooling time, the cooling temperature is preferably 5° C. or less.

Further, in order to prevent dew condensation, the cooling may be performed under dried air, nitrogen or argon atmosphere, or the cooling may be performed while dried air, nitrogen or the like is blown on the substrate.

By that means, the photoalignment film can be formed.

(2) Coating Step (Step of Coating a Coating Liquid Prepared by Dissolving a Dichroic Dye Composition in an Organic Solvent, on the Substrate or Alignment Film Subjected to the Alignment Treatment)

This is a step of coating a coating liquid obtained by dissolving a dichroic dye composition in an organic solvent (i.e., organic solvent solution of dichroic dye) on the above substrate or alignment film subjected to the alignment treatment.

[Solvent for Preparing Coating Liquid]

For example, the light absorption anisotropic film of the present invention can be formed by using the coating liquid containing the dichroic dye composition of the present invention. The solvent which is used for preparing the coating liquid is preferably selected from organic solvents. Examples of the organic solvent include amides such as N,N-dimethylformamide, sulfoxides such as dimethylsulfoxide, heterocyclic compounds such as pyridine, hydrocarbons such as benzene or hexane, alkyl halides such as chloroform or dichloromethane, esters such as methyl acetate or butyl acetate, ketones such as acetone or methyl ethyl ketone and ethers such as tetrahydrofuran or 1,2-dimethoxyethane. Among these, alkyl halides or ketones are preferred. Plural types of the organic solvents may be used in combination.

[Coating Manner]

The coating liquid may be coated by ordinary techniques (e.g., spin coating, wire bar coating, extrusion coating, direct gravure coating, reverse gravure coating, die coating, inkjet method, slit coating, cap coating, and dipping). The solid content of the coating liquid of the dichroic dye composition is preferably in an amount from 0.1 to 20 mass %, more preferably from 0.1 to 10 mass %, and further preferably from 0.5 to 5 mass %.

It is preferable for the light absorption anisotropic film of the present invention to be formed in accordance with the wet film-forming method. In the production of the light absorption anisotropic film in the present invention, after preparing a coating liquid composed of the dichroic dye composition of the present invention, publicly known methods of coating the coating liquid onto various substrates such as glass plate, so that the dye is orientated and laminated are adopted.

As the wet film-forming method, for example, a known method as described in "Coating Engineering", Yuji Harasaki (Asaku Shoten K. K., published on Mar. 20, 1971) pages 253-277 or "Creation and Applications of Harmonized Molecular Materials" supervised by Kunihiro Ichimura (CMC Publishing Co., Ltd., published on Mar. 3, 1998) pages 118-149, or a method of coating on a substrate preliminarily subjected to an alignment treatment by means of spin coating, spray coating, bar coating, roll coating, blade coating, free span coating, dye coating, or inkjet method may be mentioned.

The temperature at the time of coating is preferably from 0° C. to 80° C. Further, the humidity is preferably from approximately 10% RH to 80% RH.

Further, when the dye layer is coated by the wet film-forming method, the substrate such as the support may be warmed or cooled. The temperature of the substrate in this occasion is preferably from 10° C. to 60° C. When the temperature is more than the upper limit, there is a fear that the alignment is disturbed and the dye layer is dried before being dried under reduced pressure as described below in detail. When the temperature is less than the lower limit, there is a fear that water drop attaches onto the substrate and obstructs the coating. When the dye film coated in accordance with the wet film-forming method is dried under the reduced pressure, the substrate may be warmed. The temperature of the substrate in this occasion is preferably 60° C. or less. When the temperature is more than the upper limit, there is a fear that the alignment is disturbed and the dye layer is dried before being dried under reduced pressure.

Further, in a case where the light absorption anisotropic film of the present invention is used as e.g. a polarizing filter for various display devices such as LCD or OLED, the dye film may be directly formed on e.g. an electrode substrate constituting such display devices, or a substrate having the dye film formed thereon may be used as a constituting component of such display devices.

In the present invention, the light absorption anisotropic film is formed by coating the dichroic dye composition of the present invention on a substrate, orientated in one direction, at an angle not parallel with respect to the orientation treatment direction. Further, it is more preferable that the dichroic dye composition of the present invention is coated in the direction approximately the same as longitudinal or lateral direction of the substrate. By the above process, a light absorption anisotropic film without any optical defect and having high dichroic ratio can be provided. In addition, after coating the dichroic dye composition, cutting out the substrate for the purpose of providing a necessary polarization angle is not required, and accordingly, the productivity is high.

For example, JP-A-2007-127987 describes preferred coating methods of the dichroic dye composition of the present invention.

(3) Drying and Alignment Step (Step of Vaporizing the Above Organic Solvent to Thereby Align the Above Dichroic Dye Composition)

This is a step which is carried out in succession to the coating step for vaporizing the organic solvent from the coated film of the organic solvent solution to align the dichroic dye composition. As regards the drying temperature, in this case, the coated film is preferably spontaneously-dried at room temperature so as not to disorder (to avoid, for example, heat relaxation) the state of alignment of the dye formed by coating. It is more preferable to carry out treatment under reduced pressure to vaporize the solvent, thereby to dry at a lower temperature.

The term "treatment under reduced pressure" herein means an operation in which the substrate with the coated film (light absorption anisotropic layer) is placed under reduced pressure to remove the solvent by vaporization. At this moment, it is preferable that the substrate having the light absorption anisotropic film is maintained to be horizontal without moving from the higher position toward the lower position.

The shorter the time interval before starting the treatment under reduced pressure of the light absorption anisotropic film after coating, the better it is, and it is preferably with in the range from 1 second to 30 seconds.

The method of the treatment under reduced pressure includes, for example, the following method. Namely, the light absorption anisotropic film prepared by coating the coating liquid on the substrate is introduced into an apparatus for the treatment under reduced pressure and subjected to the treatment under reduced pressure. For example, apparatuses for the treatment under reduced pressure illustrated in FIG. 9 or FIG. 10 of JP-A-2006-201759 can be used. JP-A-2004-169975 describes the apparatuses for the treatment under reduced pressure in detail.

With regard to the condition of the treatment under reduced pressure, the pressure in the system in which the dye film exists is preferably $2\times10^4$ Pa or less, more preferably $1\times10^4$ Pa or less and particularly preferably $1\times10^3$ Pa or less. In addition, it is preferably 1 Pa or more, and more preferably $1\times10^1$ Pa or more. Generally, it is preferable that the pressure to which the system finally reaches is within the above-described range. When the pressure is more than the upper limit, there is a fear that the dye film cannot be dried and the orientation is disturbed. When the pressure is lower than the lower limit, the dye film is dried too rapidly and there is a fear of generating defects.

Further, the time period of the treatment under the reduced pressure is preferably from 5 seconds to 180 seconds. When the time period is more than the upper limit, there is a fear that the dye film cannot be dried before relaxation of the orientation and the orientation is disturbed. When the time is lower than the lower limit, there is a fear that the dye film cannot be dried and the orientation is disturbed.

Further, with regard to the temperature in the system during the treatment under the reduced pressure, it is preferably from 10° C. to 60° C. When the temperature is more than the upper limit, there is a fear that convection occurs during the drying and the coated film becomes uniform. When the temperature is lower than the lower limit, there is a fear that the dye film cannot be dried and the orientation is disturbed.

The thickness of the dried light absorption anisotropic film is preferably 0.01 to 30 μm, more preferably 0.01 to 10 μm and furthermore preferably 0.05 to 5 μm.

(Characteristics of the Light Absorption Anisotropic Film of the Present Invention)

The term "light absorption anisotropic film" used in the present invention means a dye film having anisotropy in electromagnetism properties in any two directions selected from total three directions of the thickness direction and any two orthogonal directions on the inner surface of the dye film in a solid coordinate system. Examples of the electromagnetism property include optical properties such as absorption and refraction, and electrical properties such as resistance and capacity. Examples of the film having optical anisotropy such as absorption and refraction include linear polarized films, circular polarized films, retardation films, resistivity anisotropic films and the like. Namely, the light absorption anisotropic film of the present invention can be used for the polarized films, the retardation films, or the resistivity anisotropic films. Particularly, since the light absorption anisotropic film of the present invention shows a high absorbance throughout a visible light region, it is useful for the polarized films.

The light absorption anisotropic film of the present invention is characterized by that the film shows a diffraction peak derived from a periodic structure in a direction in a plane of the film in the X-ray diffraction measurement and the diffraction peak has a half width of 1.0 Å or less.

Herein, the term "half width" means a value obtained by measuring the intensity of the top of the peak using a baseline as a reference in one diffraction peak in the X-ray diffraction measurement, taking two points showing a half intensity of the intensity that are positioned on the left and right of the peak top, respectively, and calculating the difference between the values of the periods shown by the respective two points.

It is presumed that such light absorption anisotropic film of the present invention, characterized by that the film shows the diffraction peak derived from the periodic structure in the direction in the plane of the film in the X-ray diffraction measurement and the diffraction peak has a half width of 1.0 Å or less, shows a high dichromatic ratio for the following reason.

Generally, a dichroic dye that forms a light absorption anisotropic film is a rod-shaped molecule having a large aspect ratio (=molecule longitudinal axis length/molecule short axis length), and has a transition moment that absorbs visible light in the direction that approximately agrees with the longitudinal axis direction of the molecule. Therefore, the smaller the angle between the molecular longitudinal axis and the alignment axis of the dichroic dye is on average, and the smaller the variation is, the higher the dichromatic ratio shown by the light absorption anisotropic film is.

Herein, the term "alignment axis" means a direction in which the light absorption anisotropic film shows the largest absorbance against linear polarized light, and is generally identical with the direction of the alignment treatment.

As previously mentioned in detail, specific examples of the alignment treatment include methods such as stretching of a resin film dyed with the dichroic dye, rubbing of the alignment film, irradiation with linear polarized light and the application of an electrical field and a magnetic field. However, the present invention is not limited by these methods as previously mentioned.

When the variation of angles between the molecule longitudinal axes and the alignment axes of dichroic dyes is large, the variation of the distance between molecules becomes also large. Thus, for a periodic structure existing, the values of the periods also vary, and a diffraction peak obtained by the X-ray diffraction measurement becomes broad and shows a large half width.

On the other hand, that the peaks are sharp peaks in which the half widths of the diffraction peaks are a certain value or less as characterized by the light absorption anisotropic film of the present invention means that the variation of the distances between molecules is small and that the angles between the molecular longitudinal axes and the alignment axes of the dichroic dye are small on average, i.e., highly-ordered alignment, and it is presumed that a high dichromatic ratio is exhibited.

In order to obtain a light absorption anisotropic film, a liquid crystalline dichroic dye compound or composition that exhibits a nematic phase is generally used. Generally, or in conventional technique, the dichromatic ratio thereof is low as approximately 10 or less, and only a broad diffraction peak was obtained in the X-ray diffraction measurement.

On the other hand, the present inventors have found that the light absorption anisotropic film composed of the novel composition containing the dichroic dye of the present invention is a novel light absorption anisotropic film having a half width of a diffraction peak of 1.0 Å or less and showing a high dichromatic ratio.

The half width of the diffraction peak shown by the light absorption anisotropic film of the present invention is at least 1.0 Å or less as described, and is preferably 0.90 Å or less, more preferably 0.70 Å or less, further preferably 0.50 Å or less, and preferably 0.1 Å or more. When the half width is more than the upper limit, it is not preferable since the distance between molecules in the dye is varied widely and highly-ordered alignment is impaired. Alternatively, when the half width is lower than the lower limit, it is not preferable since the distortion of alignment occurs easily and grain boundaries are generated with domains, and the generation of haze and the disturbance of alignment in each domain may be caused.

Further, the light absorption anisotropic film of the present invention has a period shown by the diffraction peak in the X-ray diffraction measurement of preferably from 3.5 to 10.0 Å, more preferably from 3.5 to 8.5 Å, further preferably from 4.0 to 7.0 Å, and most preferably from 4.5 to 6.0 Å. Herein, the term "period" shown by the diffraction peak is considered to correspond to the distance between molecules of dyes.

The period and half width of the diffraction peak of the light absorption anisotropic film are obtained from an X-ray profile that is measured by an X-ray diffractometer for evaluation of thin films (trade name: "ATX-G" In-plane optical system, manufactured by Rigaku) or an equivalent apparatus.

In the light absorption anisotropic film of the present invention, these are obtained by, for example, the following procedures.

Namely, at first, in-plane measurements in all directions are performed at 15° intervals for the light absorption anisotropic film. The direction in the plane of the substrate at which the peak strength is large is determined by so-called $\phi$ scanning in which a sample is measured by rotating it in the plane parallel to the substrate while the angle at which a peak has been observed is fixed. Using the peak of the in-plane measurement in the obtained direction, the period and half width were obtained.

As mentioned above, the dye film comprising the aligned dichroic dye of the present invention is a light absorption anisotropic dye film having anisotropy of light-absorbing, and can form an element (polarizing element) having high functions as a polarizing film that are characterized by the half width of the diffraction peak and the period.

In this case, the formed anisotropic dye film itself may be used as a polarizing element, and a protective layer, an adhesive layer, and an antireflection layer may be formed.

Further, in order to form a liquid crystal element by using the anisotropic dye film, a transparent electrode such as ITO may be formed on the support (substrate) in advance in the steps (1) to (3) and an anisotropic dye film (polarizing film) may be formed on the electrode. In this case, the steps for coating and the like may be performed after coating a polyimide, a polyvinyl alcohol, or the like on the transparent electrode to be contacted with the dye film and effecting parallel alignment by a rubbing treatment.

(Other Characteristics of the Light Absorption Anisotropic Layer)

When a coating liquid composed of the dichroic dye composition of the present invention is applied to the surface of the alignment film, the dichroic dye is aligned at the tilt angle of the alignment film at the dichroic dye-alignment film interface and at the tilt angle of the air at the dichroic dye-air interface. After the coating liquid composed of the dichroic dye composition of the present invention is applied to the surface of the alignment film, the dichroic dye can be uniformly aligned (monodomain alignment), thereby to attain horizontal alignment.

The light absorption anisotropic layer formed by aligning the dichroic dye horizontally and fixing the dye in that aligned state may be utilized as a polarizing element.

[Tilt Angle]

In the present invention, the term "tilt angle" means an angle between the long axis direction of a dichroic dye molecule and an interface (alignment film interface or an air interface). Narrowing the tilt angle at the alignment film side to an extent and horizontally orientating efficiently provide preferable optical performance as the polarizing element. Accordingly, from the viewpoint of the polarization performance, the tilt angle at the alignment film side is preferably from 0° to $10^0$, more preferably from 0° to 5°, particularly preferably from 0° to 2°, and most preferably from 0° to 1°. In addition, preferable tilt angle at the air interface side is from 0° to 10°, more preferably from 0 to 5°, particularly preferably from 0 to 2°.

Generally, the tilt angle of the dichroic dye at the air interface side can be adjusted by selecting another compound (for example, horizontally orientating agents described in JP-A-2005-99248, JP-A-2005-134884, JP-A-2006-126768 and JPA-2006-267183) to be optionally added, and the preferable horizontal orientated state can be realized as the polarizing element of a liquid crystal display device to which the light absorption anisotropic film of the present invention is applied.

In addition, the tilt angle of the dichroic dye at the alignment film side can be controlled by the above mentioned manner (for example, by using the agent for controlling a tilt angle at an alignment film).

(Usage of Light Absorption Anisotropic Film)

The thus-formed light absorption anisotropic film of the present invention functions as a polarizing film whereby linearly polarized light, circularly polarized light or elliptic polarized light can be obtained by utilizing the anisotropy in light absorption and further is capable of providing functions as various anisotropic films such as refractive anisotropy and conductivity anisotropy by selecting the film-forming process, the substrate, and the composition containing the dye, whereby it can be made various types of polarizing elements which can be used for various purposes.

In a case where the light absorption anisotropic film of the present invention is formed on a substrate to use as a polarizing element, the formed light absorption anisotropic film itself may be used, or not only the above-mentioned protective layer but also layers having various functions such as an adhesive layer and a reflection-preventing layer, an alignment film, and layers having optical functions such as a function as a retardation film, a function as a brightness-improving film, a function as a reflective film, a function as a semi-transmissive reflective film, a function as a diffusion film, and a function as an optical compensation film may be formed by lamination by the wet film-forming method or the like, so that it may be used in the form of a laminate.

Such layers having the optical functions may be formed, for example, by the following methods.

A layer having a function as a retardation film can be formed by applying a stretching treatment described, for example, in Japanese Patent No. 2841377 or Japanese Patent No. 3094113, or by applying a treatment described, for example, in Japanese Patent No. 3168850.

Further, the layer having a function as a brightness-improving film may be formed by forming ultrafine pores by a method described, for example, in JPA-2002-169025 or JP-A-2003-29030, or by superposing two or more cholesteric liquid crystal layers with different central wavelengths of the selective reflection.

The layer having a function as a reflective film or a semi-transmissive reflective film can be formed by using a metal thin film obtained by deposition or sputtering.

The layer having a function as a diffusion film can be formed by coating the above protective layer with a resin solution containing fine particles.

Further, the layer having a function as a retardation film or an optical compensation film can be formed by coating a liquid crystalline compound such as a discotic liquid crystalline compound and orienting it.

The liquid crystal display device of the present invention is not particularly limited as long as it has the light absorption anisotropic film produced by using the dichroic dye composition and the polarizing element and utilizes the liquid crystallinity thereof, and specific examples include displays for television sets, displays for PCs, displays mounted in vehicle, and displays for outdoor use.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

In the following examples, the measurements regarding with the optical performance of the light absorption anisotropic film were executed as described below.

<Dichroic Ratio>

A dichroic ratio was calculated using the following equation after measuring the absorbance of a light absorption anisotropic film with a spectral photometer arranging an iodine series polarizing element in an incident light optical system.

$$\text{Dichroic Ratio (D)}=Az/Ay$$

Az: Absorbance of a light absorption anisotropic film for a polarized light in the absorption axis direction Ay: Absorbance of a light absorption anisotropic film for a polarized light in the polarization axis direction In the following, a half width was obtained by an in-plane measurement profiling and a φ-scan profiling using an X-ray diffraction apparatus for evaluation of thin films (trade name: “ATX-G” in-plane optical system, manufactured by Rigaku). Both measurements were performed by using CuKα at an incident angle of 0.18°.

The relationship between a diffraction angle and a distance was converted by the following formula:

$$D=\lambda/(2*\sin\theta),\ (d\text{: distance, }\lambda\text{: incident X-ray wavelength (CuK}\alpha\text{: 1.54 Å)).}$$

Example 1

2 parts by mass of the exemplified dye (A-46) was dissolved in 98 parts by mass of chloroform with stirring, to obtain a dye solution for a light absorption anisotropic film (coating liquid). The dye solution was coated by spin coating on a glass substrate having a polyvinyl alcohol alignment film (trade name: PVA-103, manufactured by Nissan Chemical Industries, Ltd.) that had been subjected to a homogeneous alignment treatment by rubbing, followed by spontaneously drying and heating at 70° C. for 1 minute, to obtain a light absorption anisotropic film.

The thickness of the film was 0.2 μm.

The thus-obtained light absorption anisotropic film had a dichromatic ratio of 21. The X-ray diffraction pattern obtained from the direction vertical to the alignment axis (the direction in which the diffraction surface vertical to the transmission axis is observed) and the alignment axis direction (the direction in which the diffraction plane vertical to the absorption axis is observed) of the film is shown in FIG. 1. Two peaks were detected in the direction vertical to the alignment axis, and two peaks were detected in the alignment axis direction. The periods and half widths obtained from the respective peaks are shown in Table 1.

TABLE 1

| | Direction vertical to alignment axis | | Alignment axis direction | |
|---|---|---|---|---|
| | Peak 1 | Peak 2 | Peak 3 | Peak 4 |
| Period | 5.57 Å | 4.57 Å | 7.56 Å | 4.56 Å |
| Half width | 0.19 Å | 0.89 Å | 0.36 Å | 0.45 Å |

Example 2

2 parts by mass of the exemplified dye (A-58) was dissolved in 98 parts by mass of chloroform with stirring, to obtain a dye solution for a light absorption anisotropic film. The dye solution (coating liquid) was coated by spin coating on a glass substrate having a polyvinyl alcohol alignment film (trade name: PVA-103, manufactured by Nissan Chemical Industries, Ltd.) that had been subjected to a homogeneous alignment treatment by rubbing, followed by spontaneously drying and heating at 40° C. for 1 hour, to obtain a light absorption anisotropic film. The thickness of the film was 0.2 μm.

Figure 2:
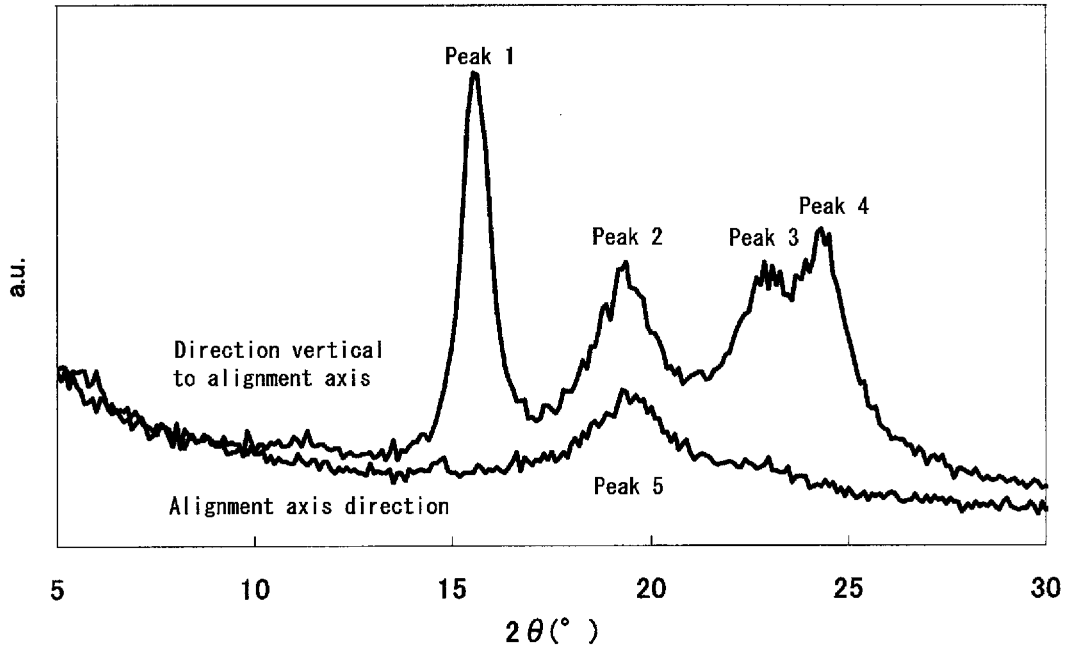
FIG. 2 is an X-ray diffraction pattern of the light absorption anisotropic film prepared in example 2.

The thus-obtained light absorption anisotropic film had a dichromatic ratio of 18. The X-ray diffraction pattern obtained from the direction vertical to the alignment axis and the alignment axis direction of the film is shown in FIG. 2. Four peaks were detected in the direction vertical to the alignment axis, and one peak was detected in the alignment axis direction. The periods and half widths obtained from the respective peaks are shown in Table 2.

TABLE 2

| | Direction vertical to alignment axis | | | | Alignment axis direction |
|---|---|---|---|---|---|
| | Peak 1 | Peak 2 | Peak 3 | Peak 4 | Peak 5 |
| Period | 5.69 Å | 4.57 Å | 3.85 Å | 3.63 Å | 4.58 Å |
| Half width | 0.30 Å | 0.37 Å | — | — | 0.48 Å |

Example 3

2 parts by mass of the exemplified dye (C-10) was dissolved in 98 parts by mass of chloroform with stirring, to obtain a dye solution for a light absorption anisotropic film. The dye solution (coating liquid) was coated by spin coating on a glass substrate having a polyvinyl alcohol alignment film (trade name: PVA-103, manufactured by Nissan Chemical Industries, Ltd.) that had been subjected to a homogeneous alignment treatment by rubbing, followed by spontaneously drying and heating at 40° C. for 1 hour, to obtain a light absorption anisotropic film. The thickness of the film was 0.2 μm.

Figure 3:
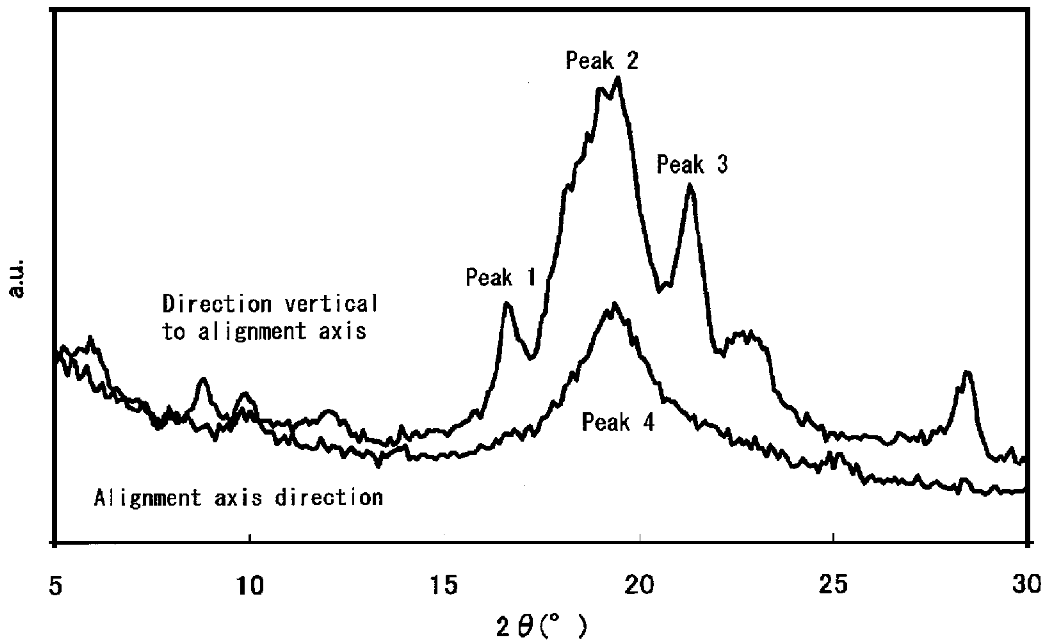
FIG. 3 is an X-ray diffraction pattern of the light absorption anisotropic film prepared in example 3.

The thus-obtained light absorption anisotropic film had a dichromatic ratio of 18. The X-ray diffraction pattern obtained from the direction vertical to the alignment axis and the alignment axis direction of the film is shown in FIG. 3. Two peaks were detected in the direction vertical to the alignment axis. The periods and half widths obtained from the respective peaks are shown in Table 3.

TABLE 3

| | Direction vertical to alignment axis | | | Alignment axis direction |
|---|---|---|---|---|
| | Peak 1 | Peak 2 | Peak 3 | Peak 4 |
| Period | 5.32 Å | 4.55 Å | 4.36 Å | 4.56 Å |
| Half width | 0.15 Å | 0.46 Å | 0.12 Å | 0.47 Å |

Example 4

2 parts by mass of the exemplified dye (D-2) was dissolved in 98 parts by mass of chloroform with stirring, to obtain a dye solution for a light absorption anisotropic film. The dye solution (coating liquid) was coated by spin coating on a glass substrate having a polyvinyl alcohol alignment film (trade name: PVA-103, manufactured by Nissan Chemical Industries, Ltd.) that had been subjected to a homogeneous alignment treatment by rubbing, followed by spontaneously drying and heating at 40° C. for 1 hour, to obtain a light absorption anisotropic film. The thickness of the film was 0.2 μm.

Figure 4:
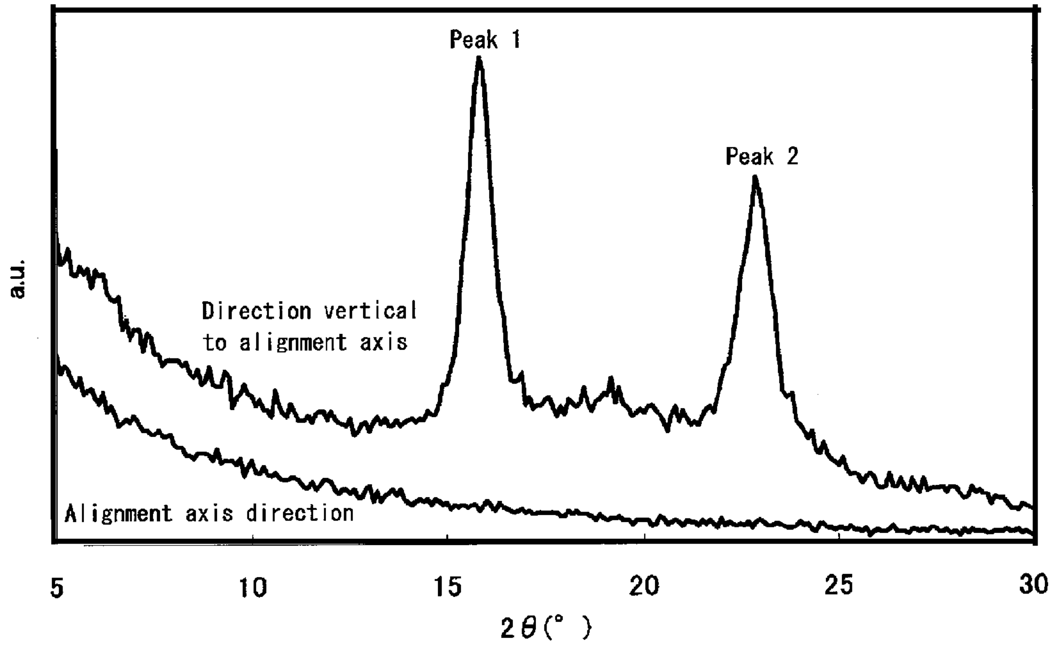
FIG. 4 is an X-ray diffraction pattern of the light absorption anisotropic film prepared in example 4.

The thus-obtained light absorption anisotropic film had a dichromatic ratio of 19. The X-ray diffraction pattern obtained from the direction vertical to the alignment axis and the alignment axis direction of the film is shown in FIG. 4. Two peaks were detected in the direction vertical to the alignment axis. The periods and half widths obtained from the respective peaks are shown in Table 4.

TABLE 4

| | Direction vertical to alignment axis | |
|---|---|---|
| | Peak 1 | Peak 2 |
| Period | 5.60 Å | 3.88 Å |
| Half width | 0.27 Å | 0.15 Å |

Comparative Example 1

(B)

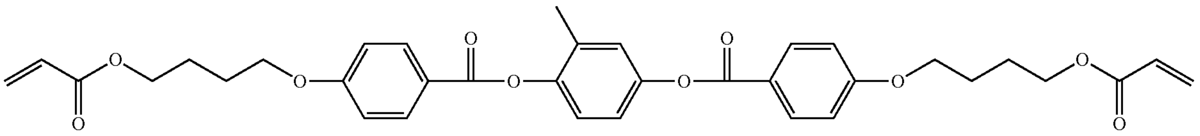

Rod-shaped liquid crystal 20 parts by mass of the rod-shaped liquid crystal (B) was dissolved in 80 parts by mass of chloroform under stirring to obtain a solution for a light absorption anisotropic film. The solution was coated by spin coating on a glass substrate having a polyvinyl alcohol alignment film (trade name: PVA-103, manufactured by Nissan Chemical Industries, Ltd.) that had been subjected to a homogeneous alignment treatment by rubbing, followed by spontaneously drying, to obtain a light absorption anisotropic film.

Figure 5:
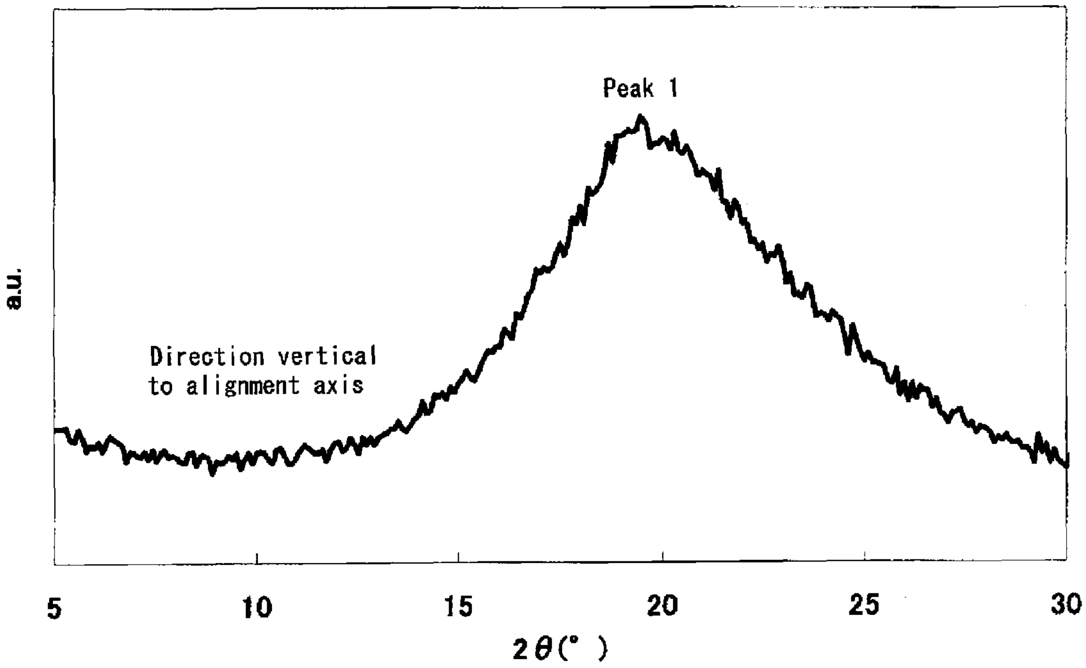
FIG. 5 is an X-ray diffraction pattern of the light absorption anisotropic film prepared in comparative example 1.

The thus-obtained light absorption anisotropic film had a dichromatic ratio of 6. The X-ray diffraction pattern obtained from the direction vertical to the alignment axis of the film is shown in FIG. 5. One peak was detected in the direction vertical to the alignment axis. The period and half width obtained from the peak are shown in Table 5.

TABLE 5

| | Direction vertical to alignment axis Peak 1 |
|---|---|
| Period | 4.55 Å |
| Half width | 1.46 Å |

As mentioned above, it was confirmed that each of the light absorption anisotropic films of the examples within the scope of the present invention had a molecular alignment that is suitable for exhibiting a dichromatic ratio and showed a high dichromatic ratio.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-254575 filed in Japan on Sep. 30, 2008, which is entirely herein incorporated by reference.

The invention claimed is:

1. A light absorption anisotropic film formed from dichroic dye composition containing, based on total solids and excluding a solvent, 20 mass % or more of at least one azo dye, wherein the light absorption anisotropic film shows a diffraction peak derived from a periodic structure in a direction in a plane of the light absorption anisotropic film in X-ray diffraction measurement and the diffraction peak has a half width of 1.0 Å or less, wherein the at least one azo dye is represented by formula (Ib) or (Ic):

Formula (Ib)

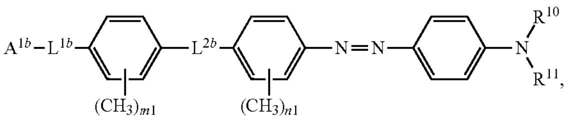

wherein $R^{10}$ and $R^{11}$ each independently represents a hydrogen atom, a methyl group, or an ethyl group; $L^{1b}$ represents —N═N— or —C(═O)O—; $L^{2b}$ represents —CH═N—, —N═CH—, —C(═O)O—, or —OC(═O)—; $A^{1b}$ represents a group represented by formula (IIa) or (IIIa); and m1 and n1 each independently represents an integer of 0 to 2;

(IIa)

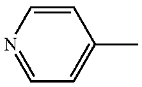

(IIIa)

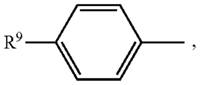

wherein $R^9$ represents an alkyl group which may have a substituent, an aryl group which may have a substituent, an alkoxy group which may have a substituent, an oxycarbonyl group which may have a substituent, or an acyloxy group which may have a substituent;

Formula (Ic)

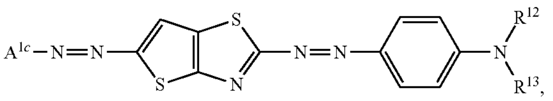

wherein $R^{12}$ and $R^{13}$ each independently represents a hydrogen atom, a methyl group, or an ethyl group; and $A^{1c}$ represents a group represented by formula (IIa) or (IIIa); and (IIa)

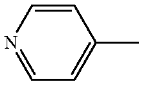

(IIIa)

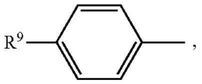

wherein $R^9$ represents an alkyl group which may have a substituent, an aryl group which may have a substituent, an alkoxy group which may have a substituent, an oxycarbonyl group which may have a substituent, or an acyloxy group which may have a substituent.

2. The light absorption anisotropic film according to claim 1, wherein the diffraction peak is derived from a periodic structure in a direction vertical to an alignment axis.

3. The light absorption anisotropic film according to claim 1, wherein the diffraction peak shows a period from 3.5 to 10.0 Å.

4. The light absorption anisotropic film according to claim 1, having a film thickness from 0.01 to 30 μm.

5. The light absorption anisotropic film according to claim 1, wherein the light absorption anisotropic film is formed on an alignment film.

6. A polarizing element, comprising the light absorption anisotropic film according to claim 1.

7. A display device, comprising the polarizing element according to claim 6.

8. A light absorption anisotropic film, comprising at least one dichroic dye represented by formula (I), wherein the light absorption anisotropic film shows a diffraction peak derived from a periodic structure in a direction in a plane of the light absorption anisotropic film in X-ray diffraction measurement and the diffraction peak has a half width of 1.0 Å or less, Formula (I)

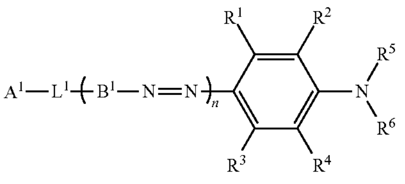

wherein $R^1$ to $R^4$ each independently represents a hydrogen atom or a substituent; $R^5$ and $R^6$ each independently represents a hydrogen atom or an alkyl group which may have a substituent; $L^1$ represents —CH═N—, —N═CH—, —C(═O)O—, —OC(═O)—, or —CH═CH—; $A^1$ represents a phenyl group which may have a substituent, a naphthyl group which may have a substituent, or an aromatic heterocyclic group which may have a substituent; $B^1$ represents a divalent aromatic hydrocarbon group which may have a substituent; n represents an integer of 1 to 5; and when n is 2 or more, $B^1$'s may be the same as or different from each other.

9. The light absorption anisotropic film according to claim 1, wherein the dichroic dye shows liquid crystallinity.

10. The light absorption anisotropic film according to claim 1, wherein the dichroic dye shows nematic mesomorphism.

* * * * *

UNITED STATES PATENT AND TRADEMARK OFFICE

CERTIFICATE OF CORRECTION

PATENT NO. : 8,927,070 B2
APPLICATION NO. : 13/121803
DATED : January 6, 2015
INVENTOR(S) : Nobutaka Iwahashi, Masashi Ogiyama and Shinichi Morishima It is certified that error appears in the above-identified patent and that said Letters Patent is hereby corrected as shown below:

On the title page, left column:

“(22) PCT Filed: Sep. 3, 2009”

should be replaced with

--(22) PCT Filed: Sep. 30, 2009--

Signed and Sealed this
Eighth Day of December, 2015

Michelle K. Lee
*Director of the United States Patent and Trademark Office*